(12) United States Patent
Kinoshita et al.

(10) Patent No.: US 8,153,278 B2
(45) Date of Patent: Apr. 10, 2012

(54) ORGANIC ELECTROLUMINESCENCE DEVICE

(75) Inventors: Ikuo Kinoshita, Kanagawa (JP); Eiji Fukuzaki, Kanagawa (JP); Takeshi Murakami, Ashigara (JP); Kazunari Yagi, Ashigara (JP); Akira Takeda, Kanagawa (JP); Toshihiro Ise, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 420 days.

(21) Appl. No.: 12/428,682

(22) Filed: Apr. 23, 2009

(65) Prior Publication Data

US 2009/0267500 A1    Oct. 29, 2009

(30) Foreign Application Priority Data

Apr. 24, 2008   (JP) ................ 2008-114442
Mar. 26, 2009   (JP) ................ 2009-077628

(51) Int. Cl.
*H01L 51/54* (2006.01)
*C09K 11/06* (2006.01)

(52) U.S. Cl. ........ 428/690; 428/917; 313/504; 313/506; 257/E51.044

(58) Field of Classification Search .................. None
See application file for complete search history.

(56) References Cited

U.S. PATENT DOCUMENTS

| | | | |
|---|---|---|---|
| 6,303,231 B1 | 10/2001 | Sawada et al. | |
| 6,303,238 B1 | 10/2001 | Thompson et al. | |
| 6,653,654 B1 | 11/2003 | Che | |
| 7,569,692 B2 | 8/2009 | Nii et al. | |
| 2002/0008233 A1 | 1/2002 | Forrest et al. | |
| 2002/0013306 A1 | 1/2002 | Lowe | |
| 2002/0068190 A1 | 6/2002 | Tsuboyama et al. | |
| 2002/0076576 A1* | 6/2002 | Li et al. ........... | 428/690 |
| 2003/0205707 A1 | 11/2003 | Chi-Ming | |
| 2005/0158578 A1* | 7/2005 | Iwakuma et al. ....... | 428/690 |
| 2005/0170209 A1 | 8/2005 | Lee et al. | |
| 2006/0073359 A1 | 4/2006 | Ise et al. | |
| 2006/0134460 A1 | 6/2006 | Kondakova et al. | |
| 2006/0134461 A1 | 6/2006 | Huo et al. | |
| 2006/0182992 A1 | 8/2006 | Nii et al. | |
| 2006/0202197 A1 | 9/2006 | Nakayama et al. | |
| 2006/0204787 A1 | 9/2006 | Sano et al. | |
| 2006/0263635 A1 | 11/2006 | Ise | |
| 2006/0264625 A1 | 11/2006 | Nakayama et al. | |
| 2006/0286406 A1 | 12/2006 | Igarashi et al. | |
| 2007/0082284 A1 | 4/2007 | Stoessel et al. | |
| 2007/0103060 A1 | 5/2007 | Itoh et al. | |
| 2008/0001530 A1 | 1/2008 | Ise et al. | |
| 2008/0036373 A1 | 2/2008 | Itoh et al. | |
| 2009/0072726 A1 | 3/2009 | Murakami et al. | |
| 2009/0128008 A1 | 5/2009 | Ise et al. | |
| 2009/0174324 A1 | 7/2009 | Nii et al. | |
| 2009/0261721 A1 | 10/2009 | Murakami et al. | |
| 2009/0267500 A1 | 10/2009 | Kinoshita et al. | |
| 2009/0309490 A1 | 12/2009 | Ise et al. | |

FOREIGN PATENT DOCUMENTS

| | | |
|---|---|---|
| EP | 0969532 A2 | 1/2000 |
| JP | 05-009470 A | 1/1993 |
| JP | 2000-048960 A | 2/2000 |
| JP | 2000-503982 A | 4/2000 |
| JP | 2001-338768 A | 12/2001 |
| JP | 2002-175884 A | 6/2002 |
| JP | 2002-305083 A | 10/2002 |
| JP | 2002-363552 A | 12/2002 |
| JP | 2003-123976 A | 4/2003 |
| JP | 2003-123981 A | 4/2003 |
| JP | 2003-520391 A | 7/2003 |
| JP | 2004-331508 A | 11/2004 |
| JP | 2004/108857 A1 | 12/2004 |
| JP | 2005-220136 A | 8/2005 |
| JP | 2005-310733 A | 11/2005 |
| JP | 2006-093542 A | 4/2006 |
| JP | 2006-120811 A | 5/2006 |
| JP | 2006-232784 A | 9/2006 |
| JP | 2006-256999 A | 9/2006 |
| JP | 2006-261623 A | 9/2006 |
| JP | 2006-332620 A | 12/2006 |
| JP | 2007-019462 A | 1/2007 |
| JP | 2007-073845 | 3/2007 |

(Continued)

OTHER PUBLICATIONS

Yong-Yue Lin, et al.; "Structural, Photophysical, and Electrophosphorescent Properties of Platinum(II) Complexes Supported by Tetradentate N2O2 Chelates" Chemistry: A European Journal vol. 9, No. 6; 2003 Wiley-VCH; pp. 1263-1272.

M. A. Baldo, et al.; "Highly efficient phosphorescent emission from organic electroluminescent devices"; Letters to Nature, vol. 395; Sep. 1998; pp. 151-154.

Japanese Office Action issued in JP2009-077628, dated Nov. 17, 2009.

Extended European Search Report dated Jun. 30, 2009 (for 09005699.5).

Primary Examiner — Marie R. Yamnitzky
(74) Attorney, Agent, or Firm — Sughrue Mion, PLLC

(57) ABSTRACT

An organic electroluminescence device, includes: a pair of electrodes; and at least one organic layer including a light emitting layer, the light emitting layer being provided between the pair of electrodes, wherein at least one layer of the at least one organic layer contains a compound represented by formula (I) as defined in the specification.

Formula (I)

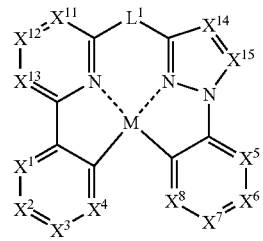

5 Claims, No Drawings

FOREIGN PATENT DOCUMENTS

| | | |
|---|---|---|
| JP | 2007-519614 A | 7/2007 |
| JP | 2008-37848 A | 2/2008 |
| JP | 2008-103535 | 5/2008 |
| JP | 2008-524848 A | 7/2008 |
| JP | 2009-231801 A | 10/2009 |
| WO | 00/57676 A1 | 9/2000 |
| WO | 03-093283 A1 | 11/2003 |
| WO | 2004-039914 A1 | 5/2004 |
| WO | 2005-042444 A2 | 5/2005 |
| WO | 2006/033440 A1 | 3/2006 |
| WO | WO 2008/117889 A1 * | 10/2008 |

* cited by examiner

ORGANIC ELECTROLUMINESCENCE DEVICE

BACKGROUND OF THE INVENTION

1. Field of the Invention

The present invention relates to an organic electroluminescence device (hereinafter also referred to as "organic EL device"). In particular, the invention relates to an organic electroluminescence device with excellent light emitting characteristics.

2. Description of the Related Art

In recent years, organic electroluminescence devices are being actively researched and developed because light emission with high brightness is obtained by low-voltage driving. In general, organic EL devices are configured of organic layers including a light emitting layer and a pair of electrodes interposing the foregoing layers therebetween and are one in which an electron injected from a cathode and a hole injected from an anode recombine with each other in the light emitting layer, and energy of a formed exciton is utilized.

In recent years, high efficiency of the device is being advanced by using a phosphorescent material. Iridium complexes, platinum complexes and so on are known as the phosphorescent light emitting material (see, for example, U.S. Pat. No. 6,303,238 and WO 00/57676). However, devices capable of satisfying both high efficiency and high durability have not been developed yet, and it is the present situation that it is eagerly desired to develop a phosphorescent material capable of satisfying the both.

There is disclosed an organic electroluminescence device containing, in a light emitting layer, a material of a tetradentate-coordinated platinum complex which is composed of a tetradentate ligand having one azine ring, one azole ring and two aromatic hydrocarbon rings and in which a nitrogen atom of the azine ring and a nitrogen atom of the azole ring form a coordinate bond together with a platinum atom (see, for example, JP-A-2006-261623 and JP-A-2008-37848). However, it may not be said that such an organic electroluminescence device is sufficient from the standpoints of luminous quantum efficiency, driving voltage and durability, and further improvements have been desired.

SUMMARY OF THE INVENTION

An object of the invention is to provide an organic electroluminescence device with excellent light emitting characteristics (luminous quantum efficiency, driving voltage and durability).

In order to solve the foregoing problems, the present inventors made intensive investigations. As a result, it has been found that by adding a compound represented by the formula (I) in an organic layer, the luminous quantum efficiency of an organic EL device is enhanced, the driving voltage is lowered, and the durability is excellent, leading to accomplishment of the invention. That is, the foregoing problems could be solved by the following means.

[1] An organic electroluminescence device, comprising:
a pair of electrodes; and
at least one organic layer including a light emitting layer, the light emitting layer being provided between the pair of electrodes,
wherein at least one layer of the at least one organic layer contains a compound represented by formula (I):

Formula (I)

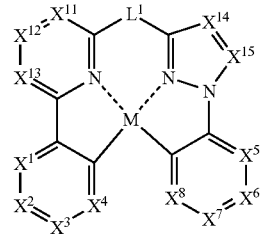

wherein each of $X^1$, $X^2$, $X^3$, $X^4$, $X^5$, $X^6$, $X^7$, $X^8$, $X^{11}$, $X^{12}$, $X^{13}$, $X^{14}$ and $X^{15}$ independently represents an atom selected from the group consisting of carbon and nitrogen;

one or more of $X^1$, $X^2$, $X^3$, $X^4$, $X^5$, $X^6$, $X^7$ and $X^8$ represents a nitrogen atom;

when each of $X^1$, $X^2$, $X^3$, $X^4$, $X^5$, $X^6$, $X^7$, $X^8$, $X^{11}$, $X^{12}$, $X^{13}$, $X^{14}$ and $X^{15}$ can be further substituted, each of $X^1$, $X^2$, $X^3$, $X^4$, $X^5$, $X^6$, $X^7$, $X^8$, $X^{11}$, $X^{12}$, $X^{13}$, $X^{14}$ and $X^{15}$ may independently have a substituent;

M represents a divalent metal;

$L^1$ represents a divalent connecting group;

a broken line expressing a bond between the metal and a nitrogen atom represents a coordinate bond; and a solid line expressing a bond between the metal and a carbon atom represents a covalent bond.

[2] The organic electroluminescence device as described in [1] above, wherein the compound represented by formula (I) is a compound represented by formula (II):

Formula (II)

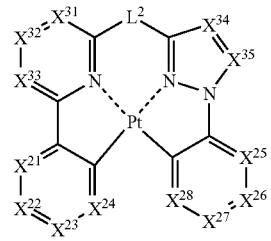

wherein each of $X^{21}$, $X^{22}$, $X^{23}$, $X^{24}$, $X^{25}$, $X^{26}$, $X^{27}$, $X^{28}$, $X^{31}$, $X^{32}$, $X^{33}$, $X^{34}$ and $X^{35}$ independently represents an atom selected from the group consisting of carbon and nitrogen;

one or more of $X^{21}$, $X^{22}$, $X^{23}$, $X^{24}$, $X^{25}$, $X^{26}$, $X^{27}$ and $X^{28}$ represents a nitrogen atom;

when each of $X^{21}$, $X^{22}$, $X^{23}$, $X^{24}$, $X^{25}$, $X^{26}$, $X^{27}$, $X^{28}$, $X^{31}$, $X^{32}$, $X^{33}$, $X^{34}$ and $X^{35}$ can be further substituted, each of $X^{21}$, $X^{22}$, $X^{23}$, $X^{24}$, $X^{25}$, $X^{26}$, $X^{27}$, $X^{28}$, $X^{31}$, $X^{32}$, $X^{33}$, $X^{34}$ and $X^{35}$ may independently have a substituent;

$L^2$ represents a divalent connecting group;

a broken line expressing a bond between the platinum atom and a nitrogen atom represents a coordinate bond; and a solid line expressing a bond between the platinum atom and a carbon atom represents a covalent bond.

[3] The organic electroluminescence device as described in [2] above, wherein the compound represented by formula (II) is a compound represented by formula (III):

Formula (III)

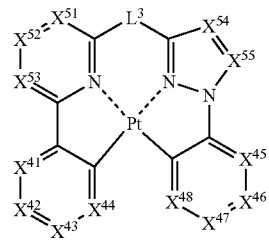

wherein each of $X^{41}$, $X^{42}$, $X^{43}$, $X^{44}$, $X^{45}$, $X^{46}$, $X^{47}$, $X^{48}$, $X^{51}$, $X^{52}$, $X^{53}$, $X^{54}$ and $X^{55}$ independently represents an atom selected from the group consisting of carbon and nitrogen;

one or more of $X^{41}$, $X^{42}$, $X^{43}$ and $X^{44}$ represents a nitrogen atom;

when each of $X^{41}$, $X^{42}$, $X^{43}$, $X^{44}$, $X^{45}$, $X^{46}$, $X^{47}$, $X^{48}$, $X^{51}$, $X^{52}$, $X^{53}$, $X^{54}$ and $X^{55}$ can be further substituted, each of $X^{41}$, $X^{42}$, $X^{43}$, $X^{44}$, $X^{45}$, $X^{46}$, $X^{47}$, $X^{48}$, $X^{51}$, $X^{52}$, $X^{53}$, $X^{54}$ and $X^{55}$ may independently have a substituent;

$L^3$ represents a divalent connecting group;

a broken line expressing a bond between the platinum atom and a nitrogen atom represents a coordinate bond; and a solid line expressing a bond between the platinum atom and a carbon atom represents a covalent bond.

[4] The organic electroluminescence device as described in [3] above, wherein the compound represented by formula (III) is a compound represented by formula (IV):

Formula (IV)

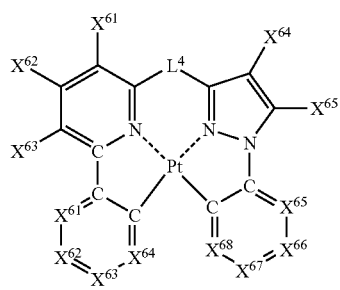

wherein each of $X^{61}$, $X^{62}$, $X^{63}$, $X^{64}$, $X^{65}$, $X^{66}$, $X^{67}$ and $X^{68}$ independently represents an atom selected from the group consisting of carbon and nitrogen;

one or more of $X^{61}$, $X^{62}$, $X^{63}$ and $X^{64}$ represents a nitrogen atom;

when each of $X^{61}$, $X^{62}$, $X^{63}$, $X^{64}$, $X^{65}$, $X^{66}$, $X^{67}$ and $X^{68}$ can be further substituted, each of $X^{61}$, $X^{62}$, $X^{63}$, $X^{64}$, $X^{65}$, $X^{66}$, $X^{67}$ and $X^{68}$ may independently have a substituent;

each of $R^{61}$, $R^{62}$, $R^{63}$, $R^{64}$ and $R^{65}$ independently represents a hydrogen atom or a substituent;

$L^4$ represents a divalent connecting group;

a broken line expressing a bond between the platinum atom and a nitrogen atom represents a coordinate bond; and a solid line expressing a bond between the platinum atom and a carbon atom represents a covalent bond.

[5] The organic electroluminescence device as described in [4] above, wherein the compound represented by formula (IV) is a compound represented by formula (V):

Formula (V)

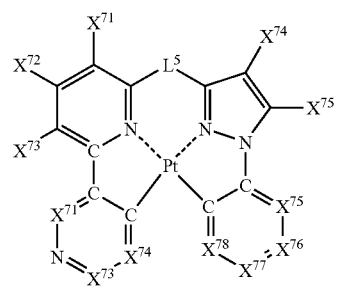

wherein each of $X^{71}$, $X^{73}$, $X^{74}$, $X^{75}$, $X^{76}$, $X^{77}$ and $X^{78}$ independently represents an atom selected from the group consisting of carbon and nitrogen;

when each of $X^{71}$, $X^{73}$, $X^{74}$, $X^{75}$, $X^{76}$, $X^{77}$ and $X^{78}$ can be further substituted, each of $X^{71}$, $X^{73}$, $X^{74}$, $X^{75}$, $X^{76}$, $X^{77}$ and $X^{78}$ may independently have a substituent;

each of $R^{71}$, $R^{72}$, $R^{73}$, $R^{74}$ and $R^{75}$ independently represents a hydrogen atom or a substituent;

$L^5$ represents a divalent connecting group;

a broken line expressing a bond between the platinum atom and a nitrogen atom represents a coordinate bond; and a solid line expressing a bond between the platinum atom and a carbon atom represents a covalent bond.

[6] The organic electroluminescence device as described in any one of [1] to [5] above, wherein at least one layer of the at least one organic layer contains a material having at least one deuterium atom.

[7] The organic electroluminescence device as described in any one of [1] to [6] above, wherein the light emitting layer contains a material having at least one deuterium atom.

[8] The organic electroluminescence device as described in [6] or [7] above, wherein the material having at least one deuterium atom is a material containing any one of a carbazole structure and an indole structure each having at least one deuterium atom.

[9] The organic electroluminescence device as described in any one of [1] to [8] above, wherein the light emitting layer contains at least one member of a compound represented by formula (a):

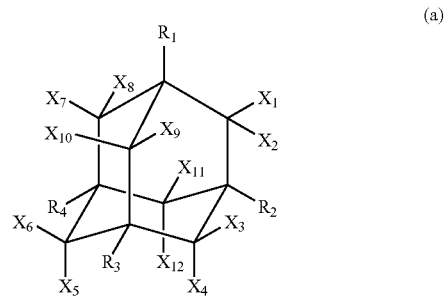

(a)

wherein each of $R_1$ to $R_4$ independently represents a hydrogen atom, an alkyl group, an alkenyl group, an alkynyl group, an aryl group, a heteroaryl group, an alkoxy group, an acyl group, an acyloxy group, an amino group, a nitro group, a cyano group, an ester group, an amide group, a halogen atom, a perfluoroalkyl group or a silyl group;

at least one of $R_1$ to $R_4$ is a group having a double bond or a triple bond; and each of $X_1$ to $X_{12}$ independently represents a hydrogen group, an alkyl group, an alkenyl group, an alkynyl group, an aryl group, a heteroaryl group, an alkoxy group, an acyl group, an acyloxy group, an amino group, a nitro group, a cyano group, an ester group, an amide group, a halogen group, a perfluoroalkyl group or a silyl group.

DETAILED DESCRIPTION OF THE INVENTION

In this specification, the compounds represented by the formulae (I), (II), (III), (IV) and (V) (synonymous with the formulae (I) to (V)) are used synonymously with the "compound of the invention" or the "complex of the invention". Also, the organic electroluminescence device having an organic layer containing the compound of the invention is used synonymously with the device of the invention. In this specification, the substituent group A is defined as follows.
(Substituent Group A)

Examples of the substituent group A include an alkyl group (preferably an alkyl group having from 1 to 30 carbon atoms, more preferably an alkyl group having from 1 to 20 carbon atoms, and especially preferably an alkyl group having from 1 to 10 carbon atoms; for example, methyl, ethyl, isopropyl, tert-butyl, n-octyl, n-decyl, n-hexadecyl, trifluoromethyl, pentafluoroethyl, etc.), a cycloalkyl group (preferably a cycloalkyl group having from 3 to 30 carbon atoms, more preferably from 1 to 20 carbon atoms, and especially preferably from 3 to 10 carbon atoms; for example, cyclopropyl, cyclopentyl, cyclohexyl, etc.), an alkenyl group (preferably an alkenyl group having from 2 to 30 carbon atoms, more preferably an alkenyl group having from 2 to 20 carbon atoms, and especially preferably an alkenyl group having from 2 to 10 carbon atoms; for example, vinyl, allyl, 2-butenyl, 3-pentenyl, etc.) and an alkynyl group (preferably an alkynyl group having from 2 to 30 carbon atoms, more preferably an alkynyl group having from 2 to 20 carbon atoms, and especially preferably an alkynyl group having from 2 to 10 carbon atoms; for example, propargyl, 3-pentynyl, etc.), an aryl group (preferably an aryl group having from 6 to 30 carbon atoms, more preferably an aryl group having from 6 to 20 carbon atoms, and especially preferably from 6 to 12 carbon atoms; for example, phenyl, p-methylphenyl, naphthyl, anthranyl, etc.), an amino group (preferably an amino group having from 0 to 30 carbon atoms, more preferably an amino group having from 0 to 20 carbon atoms, and especially preferably an amino group having from 0 to 10 carbon atoms; for example, amino, methylamino, dimethylamino, diethylamino, dibenzylamino, diphenylamino, ditolylamino, etc.); an alkoxy group (preferably an alkoxy group having from 1 to 30 carbon atoms, more preferably an alkoxy group having from 1 to 20 carbon atoms, and especially preferably an alkoxy group having from 1 to 10 carbon atoms; for example, methoxy, ethoxy, butoxy, 2-ethylhexyloxy, etc.), an aryloxy group (preferably an aryloxy group having from 6 to 30 carbon atoms, an aryloxy group having from 6 to 20 carbon atoms, and especially preferably an aryloxy group having from 6 to 12 carbon atoms; for example, phenoxy, 1-naphthoxy, 2-naphthoxy, etc.), a heterocyclic oxy group (preferably a heterocyclic oxy group having from 1 to 30 carbon atoms, more preferably a heterocyclic oxy group having from 1 to 20 carbon atoms, and especially preferably a heterocyclic oxy group having from 1 to 12 carbon atoms; for example, pyridyloxy, pyrazyloxy, pyrimidyloxy, quinolyloxy, etc.), an acyl group (preferably an acyl group having from 1 to 30 carbon atoms, more preferably an acyl group having from 1 to 20 carbon atoms, and especially preferably an acyl group having from 1 to 12 carbon atoms; for example, acetyl, benzoyl, formyl, pivaloyl, etc.), an alkoxycarbonyl group (preferably an alkoxycarbonyl group having from 2 to 30 carbon atoms, more preferably an alkoxycarbonyl group having from 2 to 20 carbon atoms, and especially preferably an alkoxycarbonyl group having from 2 to 12 carbon atoms; for example, methoxycarbonyl, ethoxycarbonyl, etc.), an aryloxycarbonyl group (preferably an aryloxycarbonyl group having from 7 to 30 carbon atoms, more preferably an aryloxycarbonyl group having from 7 to 20 carbon atoms, and especially preferably an aryloxycarbonyl group having from 7 to 12 carbon atoms; for example, phenyloxycarbonyl, etc.), an acyloxy group (preferably an acyloxy group having from 2 to 30 carbon atoms, more preferably an acyloxy group having from 2 to 20 carbon atoms, and especially preferably an acyloxy group having from 2 to 10 carbon atoms; for example, acetoxy, benzoyloxy, etc.), an acylamino group (preferably an acylamino group having from 2 to 30 carbon atoms, more preferably an acylamino group having from 2 to 20 carbon atoms, and especially preferably an acylamino group having from 2 to 10 carbon atoms; for example, acetylamino, benzoylamino, etc.),
an alkoxycarbonylamino group (preferably an alkoxycarbonylamino group having from 2 to 30 carbon atoms, more preferably an alkoxycarbonylamino group having from 2 to 20 carbon atoms, and especially preferably an alkoxycarbonylamino group having from 2 to 12 carbon atoms; for example, methoxycarbonylamino, etc.), an aryloxycarbonylamino group (preferably an aryloxycarbonylamino group having from 7 to 30 carbon atoms, more preferably an aryloxycarbonylamino group having from 7 to 20 carbon atoms, and especially preferably an aryloxycarbonylamino group having from 7 to 12 carbon atoms; for example, phenyloxycarbonylamino, etc.), a sulfonylamino group (preferably a sulfonylamino group having from 1 to 30 carbon atoms, more preferably a sulfonylamino group having from 1 to 20 carbon atoms, and especially preferably a sulfonylamino group having from 1 to 12 carbon atoms; for example, methanesulfonylamino, benzenesulfonylamino, etc.), a sulfamoyl group (preferably a sulfamoyl group having from 0 to 30 carbon atoms, more preferably a sulfamoyl group having from 0 to 20 carbon atoms, and especially preferably a sulfamoyl group having from 0 to 12 carbon atoms; for example, sulfamoyl, methylsulfamoyl, dimethylsulfamoyl, phenylsulfamoyl, etc.),
a carbamoyl group (preferably a carbamoyl group having from 1 to 30 carbon atoms, more preferably a carbamoyl group having from 1 to 20 carbon atoms, and especially preferably a carbamoyl group having from 1 to 12 carbon atoms; for example, carbamoyl, methylcarbamoyl, diethylcarbamoyl, phenylcarbamoyl, etc.), an alkylthio group (preferably an alkylthio group having from 1 to 30 carbon atoms, more preferably an alkylthio group having from 1 to 20 carbon atoms, and especially preferably an alkylthio group having from 1 to 12 carbon atoms; for example, methylthio, ethylthio, etc.), an arylthio group (preferably an arylthio group having from 6 to 30 carbon atoms, more preferably an arylthio group having from 6 to 20 carbon atoms, and especially preferably an arylthio group having from 6 to 12 carbon atoms; for example, phenylthio, etc.), a heterocyclic thio group (preferably a heterocyclic thio group having from 1 to 30 carbon atoms, more preferably a heterocyclic thio group having from 1 to 20 carbon atoms, and especially preferably a heterocyclic thio group having from 1 to 12 carbon atoms; for example, pyridylthio, 2-benzimizolylthio, 2-benzoxazoylthio, 2-benzthiazoylthio, etc.), a sulfonyl group (preferably a sulfonyl group having from 1 to 30 carbon atoms, more preferably a sulfonyl group having from 1 to 20 carbon atoms, and especially preferably a sulfonyl group having from 1 to 12 carbon atoms; for example, mesyl, tosyl, etc.), a sulfinyl group (preferably a sulfinyl group having from 1 to 30 carbon atoms, more preferably a sulfinyl group having from 1 to 20 carbon atoms, and especially preferably a sulfinyl group having from 1 to 12 carbon atoms; for example, methanesulfinyl, benzenesulfinyl, etc.), a ureido group (preferably a ureido group having from 1 to 30 carbon atoms, more preferably a ureido group having from 1 to 20 carbon atoms, and especially preferably a ureido group having from 1 to 12 carbon atoms; for example, ureido, methylureido, phenylureido, etc.), a phosphoric acid amide group (preferably a phosphoric acid amide group having from 1 to 30 carbon atoms, more preferably a phosphoric acid amide group having from 1 to 20 carbon atoms, and especially preferably a phosphoric acid amide group having from 1 to 12 carbon atoms; for example, diethylphosphoric acid amide, phenylphosphoric acid amide, etc.), a hydroxyl group, a mercapto group, a halogen atom (for example, a fluorine atom, a chlorine atom, a bromine atom, an iodine atom, and more preferably a fluorine atom), a cyano group, a sulfo group, a carboxyl group, a nitro group, a hydroxamic acid group, a sulfino group, a hydrazino group, an imino group, a heterocyclic group (preferably a heterocyclic group having from 1 to 30 carbon atoms, and more preferably a heterocyclic group having from 1 to 12 carbon atoms; examples of the hetero atom include a nitrogen atom, an oxygen atom and a sulfur atom; and specific examples of the heterocyclic group include imidazolyl, pyridyl, quinolyl, furyl, thienyl, piperidyl, morpholino, benzoxazolyl, benzimidazolyl, benzthiazolyl, carbazolyl and azepinyl), a silyl group (preferably a silyl group having from 3 to 40 carbon atoms, more preferably a silyl group having from 3 to 30 carbon atoms, and especially preferably a silyl group having from 3 to 24 carbon atoms; for example, trimethylsilyl, triphenylsilyl, etc.) and a silyloxy group (preferably a silyloxy group having from 3 to 40 carbon atoms, more preferably a silyloxy group having from 3 to 30 carbon atoms, and especially preferably a silyloxy group having from 3 to 24 carbon atoms; for example, trimethylsilyloxy, triphenylsilyloxy, etc.). These substituents may be further substituted. As the further substituent, the groups selected among those in the foregoing substituent group A can be exemplified.

The hydrogen atom in the description of the formula (I) to (V) also includes isotopes (for example, a deuterium atom, etc.). Also, the atoms constituting the substituents also include isotopes thereof.

The coordinate bond in the description of the formula (I) to (V) is a bond formed between a neutral ligand and a metal, and the covalent bond is a bond formed between an anionic ligand and a metal cation.

[Organic Electroluminescence Device]

The organic electroluminescence device of the invention is an organic electroluminescence device comprising a pair of electrodes having therebetween at least one organic layer including a light emitting layer, wherein at least one compound represented by the following general formula (I) is contained in the at least one organic layer.

The formula (I) is hereunder described.

Formula (I)

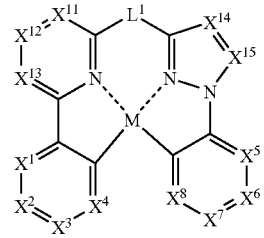

In the formula (I), each of $X^1$, $X^2$, $X^3$, $X^4$, $X^5$, $X^6$, $X^7$, $X^8$, $X^{11}$, $X^{12}$, $X^{13}$, $X^{14}$ and $X^{15}$ independently represents an atom selected from the group consisting of carbon and nitrogen; one or more of $X^1$, $X^2$, $X^3$, $X^4$, $X^5$, $X^6$, $X^7$ and $X^8$ represents a nitrogen atom; when each of $X^1$, $X^2$, $X^3$, $X^4$, $X^5$, $X^6$, $X^7$, $X^8$, $X^{11}$, $X^{12}$, $X^{13}$, $X^{14}$ and $X^{15}$ can be further substituted, each of them may independently have a substituent; M represents a divalent metal; $L^1$ represents a divalent connecting group; a broken line expressing a bond between the metal and the nitrogen atom represents a coordinate bond; and a solid line expressing a bond between the metal and the carbon atom represents a covalent bond.

When each of $X^1$, $X^2$, $X^3$, $X^4$, $X^5$, $X^6$, $X^7$, $X^8$, $X^{11}$, $X^{12}$, $X^{13}$, $X^{14}$ and $X^{15}$ can be further substituted, each of them may independently have a substituent selected among substituents including the following substituent group A. As the substituent, an alkyl group, a cycloalkyl group, an aryl group, an amino group, an alkoxy group, an aryloxy group, an acyl group, an alkoxycarbonyl group, an aryloxycarbonyl group, an acyloxy group, a sulfonylamino group, a sulfamoyl group, a carbamoyl group, an alkylthio group, an arylthio group, a heterocyclic thio group, a sulfonyl group, a sulfinyl group, a ureido group, a phosphoric acid amide group, a hydroxyl group, a mercapto group, a halogen atom, a sulfo group, a carboxyl group, a nitro group, a sulfino group, a heterocyclic group and a silyl group are preferable; a substituted or unsubstituted alkyl group, a cycloalkyl group, an aryl group, an amino group, an alkoxy group, an aryloxy group, a cyano group, a fluorine atom and a heterocyclic group are more preferable; and a methyl group, a trifluoromethyl group, a fluorine atom, a methoxy group, an aryl group and a cyano group are further preferable.

M represents a divalent metal. As the metal species, platinum, palladium, nickel, zinc and copper are preferable; platinum, palladium and nickel are more preferable; and platinum is the most preferable.

In the formula (I), $L^1$ represents a divalent connecting group. Though the connecting group is not particularly limited, in particular, divalent connecting groups composed of a single bond, a carbon atom, a nitrogen atom, an oxygen atom, a sulfur atom, a silicon atom or a germanium atom are preferable; and groups selected from the following connecting group group A are especially preferable.

Connecting group group A

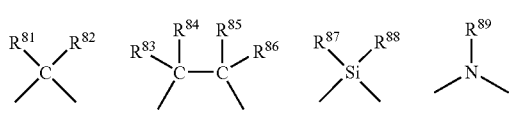

9

-continued

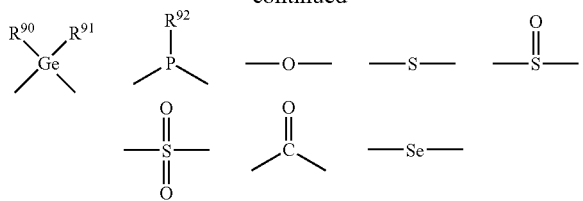

In the connecting group group A, each of $R^{81}$, $R^{82}$, $R^{83}$, $R^{84}$, $R^{85}$, $R^{86}$, $R^{87}$, $R^{88}$, $R^{89}$, $R^{90}$, $R^{91}$ and $R^{92}$ ($R^{81}$ to $R^{92}$) independently represents a hydrogen atom or a substituent selected among substituents including the substituent group A. When each of $R^{81}$ to $R^{92}$ represents a substituent, the subject substituent is preferably a substituent selected from the substituent group A. When each of $R^{81}$ to $R^{92}$ can be substituted, each of them may further have a substituent. $R^{81}$ and $R^{82}$, $R^{83}$ and $R^{84}$, $R^{85}$ and $R^{86}$, $R^{83}$ and $R^{85}$, $R^{83}$ and $R^{86}$, $R^{84}$ and $R^{86}$, or $R^{90}$ and $R^{91}$ may be bonded to each other to form a ring, respectively.

$L^1$ is preferably a substituent selected from the connecting group group A. Above all, —C($R^{81}$)($R^{82}$)—, —C($R^{83}$)($R^{84}$)C($R^{85}$)($R^{86}$)—, —Si($R^{87}$)($R^{88}$)—, —N($R^{89}$)—, —O—, —S—, —SO—, —SO$_2$— or —CO— is preferable; —C($R^{81}$)($R^{82}$)—, —C($R^{83}$)($R^{84}$)C($R^{85}$)($R^{86}$)—, —Si($R^{87}$)($R^{88}$)—, —O— or —S— is more preferable; and —C($R^{81}$)($R^{82}$)— or —C($R^{83}$)($R^{84}$)C($R^{85}$)($R^{86}$)— is further preferable.

In the foregoing —C($R^{81}$)($R^{82}$)—, $R^{81}$ and $R^{82}$ are each preferably a hydrogen atom or a substituent selected from the following substituent group B.

(Substituent Group B)

As the substituent, an alkyl group, a cycloalkyl group, an aryl group, a halogen atom, an amino group, an alkylthio group, an arylthio group, an alkyloxy group, an aryloxy group, a hydroxyl group, a mercapto group and a halogen atom are preferable; an alkyl group, a cycloalkyl group, an aryl group, a halogen atom, an alkylthio group, an arylthio group, an alkyloxy group, an aryloxy group and a halogen atom are more preferable; and an alkyl group and an aryl group are further preferable.

In the foregoing —C($R^{83}$)($R^{84}$)C($R^{85}$)($R^{86}$)—, each of $R^{83}$, $R^{84}$, $R^{85}$ and $R^{86}$ is preferably a hydrogen atom or a substituent selected from the substituent group B.

In the foregoing —Si($R^{87}$)($R^{88}$)—, each of $R^{87}$ and $R^{88}$ is preferably a hydrogen atom or a substituent selected from the substituent group B.

In the foregoing —Ge($R^{90}$)($R^{91}$)—, each of $R^{90}$ and $R^{91}$ is preferably a hydrogen atom or a substituent selected from the substituent group B.

In the foregoing —N($R^{89}$)—, $R^{89}$ is preferably a hydrogen atom, an alkyl group, a cycloalkyl group or an aryl group, more preferably an alkyl group or an aryl group, and further preferably an aryl group.

In the foregoing —P($R^{92}$)—, $R^{92}$ is synonymous with the preferred range of $R^{89}$.

In the invention, the compound represented by the formula (I) is preferably a compound represented by the following formula (II).

10

The formula (II) is hereunder described.

Formula (II)

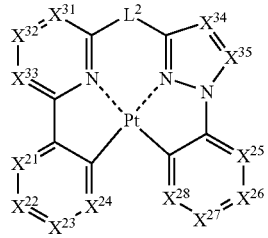

In the formula (II), each of $X^{21}$, $X^{22}$, $X^{23}$, $X^{24}$, $X^{25}$, $X^{26}$, $X^{27}$, $X^{28}$, $X^{31}$, $X^{32}$, $X^{33}$, $X^{34}$ and $X^{35}$ independently represents an atom selected from the group consisting of carbon and nitrogen; one or more of $X^{21}$, $X^{22}$, $X^{23}$, $X^{24}$, $X^{25}$, $X^{26}$, $X^{27}$ and $X^{28}$ represents a nitrogen atom; when each of $X^{21}$, $X^{22}$, $X^{23}$, $X^{24}$, $X^{25}$, $X^{26}$, $X^{27}$, $X^{28}$, $X^{31}$, $X^{32}$, $X^{33}$, $X^{34}$ and $X^{35}$ can be further substituted, each of them may independently have a substituent; $L^2$ represents a divalent connecting group; a broken line expressing a bond between the platinum atom and the nitrogen atom represents a coordinate bond; and a solid line expressing a bond between the platinum atom and the carbon atom represents a covalent bond.

In the formula (II), $X^{21}$, $X^{22}$, $X^{23}$, $X^{24}$, $X^{25}$, $X^{26}$, $X^{27}$, $X^{28}$, $X^{31}$, $X^{32}$, $X^{33}$, $X^{34}$, $X^{35}$ and $L^2$ are synonymous with $X^1$, $X^2$, $X^3$, $X^4$, $X^5$, $X^6$, $X^7$, $X^8$, $X^{11}$, $X^{12}$, $X^{13}$, $X^{14}$, $X^{15}$ and $L^1$ in the formula (I), and preferred ranges thereof are also the same.

In the invention, the compound represented by the formula (II) is preferably a compound represented by the following formula (III).

The formula (III) is hereunder described.

Formula (III)

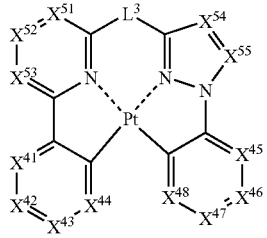

In the formula (III), each of $X^{41}$, $X^{42}$, $X^{43}$, $X^{44}$, $X^{45}$, $X^{46}$, $X^{47}$, $X^{48}$, $X^{51}$, $X^{52}$, $X^{53}$, $X^{54}$ and $X^{55}$ independently represents an atom selected from the group consisting of carbon and nitrogen; one or more of $X^{41}$, $X^{42}$, $X^{43}$ and $X^{44}$ represents a nitrogen atom; when each of $X^{41}$, $X^{42}$, $X^{43}$, $X^{44}$, $X^{45}$, $X^{46}$, $X^{47}$, $X^{48}$, $X^{51}$, $X^{52}$, $X^{53}$, $X^{54}$ and $X^{55}$ can be further substituted, each of them may independently have a substituent; $L^3$ represents a divalent connecting group; a broken line expressing a bond between the platinum atom and the nitrogen atom represents a coordinate bond; and a solid line expressing a bond between the platinum atom and the carbon atom represents a covalent bond.

In the formula (III), $X^{51}$, $X^{52}$, $X^{53}$, $X^{54}$, $X^{55}$ and $L^3$ are synonymous with $X^{31}$, $X^{32}$, $X^{33}$, $X^{34}$, $X^{35}$ and $L^2$ in the formula (II), and preferred ranges thereof are also the same. Each of $X^{41}$, $X^{42}$, $X^{43}$, $X^{44}$, $X^{45}$, $X^{46}$, $X^{47}$ and $X^{48}$ independently represents an atom selected from the group consisting of carbon and nitrogen; and one or more of $X^{41}$, $X^{42}$, $X^{43}$ and $X^{44}$ represents a nitrogen atom.

When each of $X^{41}$, $X^{42}$, $X^{43}$, $X^{44}$, $X^{45}$, $X^{46}$, $X^{47}$ and $X^{48}$ can be further substituted, each of them may independently have a substituent selected among substituents including the substituent group A. As the substituent, an alkyl group, a cycloalkyl group, an aryl group, an amino group, an alkoxy group, an aryloxy group, an acyl group, an alkoxycarbonyl group, an aryloxycarbonyl group, an acyloxy group, a sulfonylamino group, a sulfamoyl group, a carbamoyl group, an alkylthio group, an arylthio group, a heterocyclic thio group, a sulfonyl group, a sulfinyl group, a ureido group, a phosphoric acid amide group, a hydroxyl group, a mercapto group, a halogen atom, a sulfo group, a carboxyl group, a nitro group, a sulfino group, a heterocyclic group and a silyl group are preferable; a substituted or unsubstituted alkyl group, a cycloalkyl group, an aryl group, an amino group, an alkoxy group, an aryloxy group, a cyano group, a fluorine atom and a heterocyclic group are more preferable; and a methyl group, a trifluoromethyl group, a fluorine atom, a methoxy group, an aryl group and a cyano group are further preferable.

In the invention, the compound represented by the formula (III) is preferably a compound represented by the following formula (IV).

The formula (IV) is hereunder described.

Formula (IV)

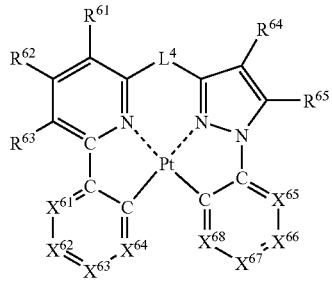

In the formula (IV), each of $X^{61}$, $X^{62}$, $X^{63}$, $X^{64}$, $X^{65}$, $X^{66}$, $X^{67}$ and $X^{68}$ independently represents an atom selected from the group consisting of carbon and nitrogen; one or more of $X^{61}$, $X^{62}$, $X^{63}$ and $X^{64}$ represents a nitrogen atom; when each of $X^{61}$, $X^{62}$, $X^{63}$, $X^{64}$, $X^{65}$, $X^{66}$, $X^{67}$ and $X^{68}$ can be further substituted, each of them may independently have a substituent; each of $R^{61}$, $R^{62}$, $R^{63}$, $R^{64}$ and $R^{65}$ independently represents a hydrogen atom or a substituent; $L^4$ represents a divalent connecting group; a broken line expressing a bond between the platinum atom and the nitrogen atom represents a coordinate bond; and a solid line expressing a bond between the platinum atom and the carbon atom represents a covalent bond.

In the formula (IV), $X^{61}$, $X^{62}$, $X^{63}$, $X^{64}$, $X^{65}$, $X^{66}$, $X^{67}$, $X^{68}$ and $L^4$ are synonymous with $X^{41}$, $X^{42}$, $X^{43}$, $X^{44}$, $X^{45}$, $X^{46}$, $X^{47}$, $X^{48}$ and $L^3$ in the formula (III), and preferred ranges thereof are also the same. Each of $R^{61}$, $R^{62}$, $R^{63}$, $R^{64}$ and $R^{65}$ may independently have a hydrogen atom or a substituent selected among substituents including the substituent group A. As the substituent, an alkyl group, a cycloalkyl group, an aryl group, an amino group, an alkoxy group, an aryloxy group, an acyl group, an alkoxycarbonyl group, an aryloxycarbonyl group, an acyloxy group, a sulfonylamino group, a sulfamoyl group, a carbamoyl group, an alkylthio group, an arylthio group, a heterocyclic thio group, a sulfonyl group, a sulfinyl group, a ureido group, a phosphoric acid amide group, a hydroxyl group, a mercapto group, a halogen atom, a sulfo group, a carboxyl group, a nitro group, a sulfino group, a heterocyclic group and a silyl group are preferable; a substituted or unsubstituted alkyl group, a cycloalkyl group, an aryl group, an amino group, an alkoxy group, an aryloxy group, a cyano group, a fluorine atom and a heterocyclic group are more preferable; and a methyl group, a trifluoromethyl group, a fluorine atom, a methoxy group, an aryl group and a cyano group are further preferable.

In the invention, the compound represented by the formula (IV) is preferably a compound represented by the following formula (V).

The formula (V) is hereunder described.

Formula (V)

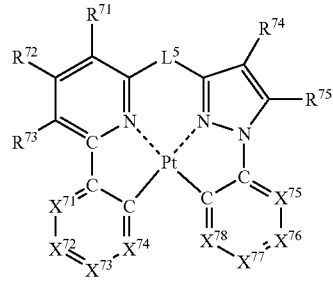

In the formula (V), each of $X^{71}$, $X^{73}$, $X^{74}$, $X^{75}$, $X^{76}$, $X^{77}$ and $X^{78}$ independently represents an atom selected from the group consisting of carbon and nitrogen; when each of $X^{71}$, $X^{73}$, $X^{74}$, $X^{75}$, $X^{76}$, $X^{77}$ and $X^{78}$ can be further substituted, each of them may independently have a substituent; each of $R^{71}$, $R^{72}$, $R^{73}$, $R^{74}$ and $R^{75}$ independently represents a hydrogen atom or a substituent; $L^5$ represents a divalent connecting group; a broken line expressing a bond between the platinum atom and the nitrogen atom represents a coordinate bond; and a solid line expressing a bond between the platinum atom and the carbon atom represents a covalent bond.

In the formula (V), $R^{71}$, $R^{72}$, $R^{73}$, $R^{74}$, $R^{75}$ and $L^5$ are synonymous with $R^{61}$, $R^{62}$, $R^{63}$, $R^{64}$, $R^{65}$ and $L^4$ in the formula (IV), and preferred ranges thereof are also the same. Each of $x^{71}$, $X^{73}$, $X^{74}$, $X^{75}$, $X^{76}$, $X^{77}$ and $X^{78}$ independently represents an atom selected from the group consisting of carbon and nitrogen; and $X^{71}$, $X^{73}$ and $X^{74}$ are each preferably a carbon atom. When each of $X^{71}$, $X^{73}$, $X^{74}$, $X^{75}$, $X^{76}$, $X^{77}$ and $X^{78}$ can be further substituted, each of them may independently have a hydrogen atom or a substituent selected among substituents including the substituent group A. As the substituent, an alkyl group, a cycloalkyl group, an aryl group, an amino group, an alkoxy group, an aryloxy group, an acyl group, an alkoxycarbonyl group, an aryloxycarbonyl group, an acyloxy group, a sulfonylamino group, a sulfamoyl group, a carbamoyl group, an alkylthio group, an arylthio group, a heterocyclic thio group, a sulfonyl group, a sulfinyl group, a ureido group, a phosphoric acid amide group, a hydroxyl group, a mercapto group, a halogen atom, a sulfo group, a carboxyl group, a nitro group, a sulfino group, a heterocyclic group and a silyl group are preferable; a substituted or unsubstituted alkyl group, a cycloalkyl group, an aryl group, an amino group, an alkoxy group, an aryloxy group, a cyano group, a fluorine atom and a heterocyclic group are more preferable; and a methyl group, a trifluoromethyl group, a fluorine atom, a methoxy group, an aryl group and a cyano group are further preferable.

One of preferred embodiments of the compound represented by the formula (V) is a compound represented by the following formula (VI). The formula (VI) is hereunder described.

Formula (VI)

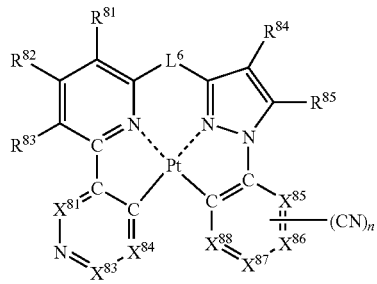

(VI)

Formula (VII)

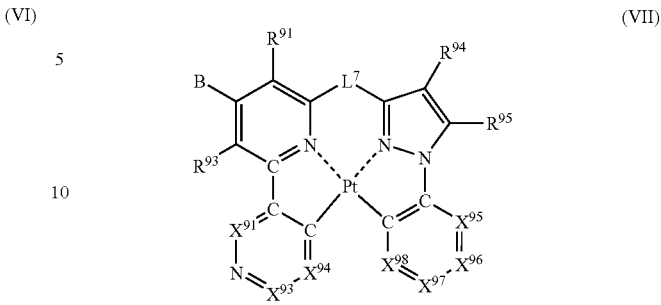

(VII)

In the formula (VI), each of $X^{81}$, $X^{83}$, $X^{84}$, $X^{85}$, $X^{86}$, $X^{87}$ and $X^{88}$ independently represents an atom selected from the group consisting of carbon and nitrogen. When each of $X^{81}$, $X^{83}$, $X^{84}$, $X^{85}$, $X^{86}$, $X^{87}$ and $X^{88}$ can be further substituted, each of them may independently have a substituent. Each of $R^{81}$, $R^{82}$, $R^{83}$, $R^{84}$ and $R^{85}$ independently represents a hydrogen atom or a substituent. n represents an integer of from 1 to 4. The cyano group is connected to the C atom in $X^{85}$ to $X^{88}$. $L^6$ represents a divalent connecting group. A broken line expressing a bond between the platinum atom and the nitrogen atom represents a coordinate bond; and a solid line expressing a bond between the platinum atom and the carbon atom represents a covalent bond.

In the formula (VI), $R^{81}$, $R^{82}$, $R^{83}$, $R^{84}$, $R^{85}$ and $L^6$ are synonymous with $R^{71}$, $R^{72}$, $R^{73}$, $R^{74}$, $R^{75}$ and $L^5$ in the formula (V), and preferred ranges thereof are also the same. Each of $X^{81}$, $X^{83}$, $X^{84}$, $X^{85}$, $X^{86}$, $X^{87}$ and $X^{88}$ independently represents an atom selected from the group consisting of carbon and nitrogen; and $X^{81}$, $X^{83}$ and $X^{84}$ are each preferably a carbon atom. When each of $X^{81}$, $X^{83}$, $X^{84}$, $X^{85}$, $X^{86}$, $X^{87}$ and $X^{88}$ can be further substituted, each of them may independently have a hydrogen atom or a substituent selected among substituents including the substituent group A. As the substituent, an alkyl group, a cycloalkyl group, an aryl group, an amino group, an alkoxy group, an aryloxy group, an acyl group, an alkoxycarbonyl group, an aryloxycarbonyl group, an acyloxy group, a sulfonylamino group, a sulfamoyl group, a carbamoyl group, an alkylthio group, an arylthio group, a heterocyclic thio group, a sulfonyl group, a sulfinyl group, a ureido group, a phosphoric acid amide group, a hydroxyl group, a mercapto group, a halogen atom, a sulfo group, a carboxyl group, a nitro group, a sulfino group, a heterocyclic group and a silyl group are preferable; a substituted or unsubstituted alkyl group, a cycloalkyl group, an aryl group, an amino group, an alkoxy group, an aryloxy group, a cyano group, a fluorine atom and a heterocyclic group are more preferable; and a methyl group, a trifluoromethyl group, a fluorine atom, a methoxy group, an aryl group and a cyano group are further preferable.

n represents an integer of from 1 to 4, and preferably from 1 to 2.

In the formula (VI), by substituting the carbon atom of at least one of $X^{85}$ to $X^{88}$ with a cyano group, the injection of electron into the organic layer containing the compound represented by the formula (VI) is easy so that an organic electroluminescence device with excellent external quantum efficiency can be formed. Also, it is possible to prolong the life of the organic electroluminescence device.

One of preferred embodiments of the compound represented by the formula (V) is a compound represented by the following formula (VII). The formula (VII) is hereunder described.

In the formula (VII), each of $X^{91}$, $X^{93}$, $X^{94}$, $X^{95}$, $X^{96}$, $X^{97}$ and $X^{98}$ independently represents an atom selected from the group consisting of carbon and nitrogen; when each of $X^{91}$, $X^{93}$, $X^{94}$, $X^{95}$, $X^{96}$, $X^{97}$ and $X^{98}$ can be further substituted, each of them may independently have a substituent; each of $R^{91}$, $R^{93}$, $R^{94}$ and $R^{95}$ independently represents a hydrogen atom or a substituent; B represents an electron-donating substituent selected among an alkyl group, a cycloalkyl group, an amino group, an alkoxy group, an aryloxy group and a fluorine atom; $L^7$ represents a divalent connecting group, a broken line expressing a bond between the platinum atom and the nitrogen atom represents a coordinate bond; and a solid line expressing a bond between the platinum atom and the carbon atom represents a covalent bond.

In the formula (VII), $R^{91}$, $R^{93}$, $R^{94}$, $R^{95}$ and $L^7$ are synonymous with $R^{71}$, $R^{73}$, $R^{74}$, $R^{75}$ and $L^5$ in the formula (V), and preferred ranges thereof are also the same. Each of $X^{91}$, $X^{93}$, $X^{94}$, $X^{95}$, $X^{96}$, $X^{97}$ and $X^{98}$ independently represents an atom selected from the group consisting of carbon and nitrogen; and $X^{91}$, $X^{93}$ and $X^{94}$ are each preferably a carbon atom. When each of $X^{91}$, $X^{93}$, $X^{94}$, $X^{95}$, $X^{96}$, $X^{97}$ and $X^{98}$ can be further substituted, each of them may independently have a hydrogen atom or a substituent selected among substituents including the substituent group A. As the substituent, an alkyl group, a cycloalkyl group, an aryl group, an amino group, an alkoxy group, an aryloxy group, an acyl group, an alkoxycarbonyl group, an aryloxycarbonyl group, an acyloxy group, a sulfonylamino group, a sulfamoyl group, a carbamoyl group, an alkylthio group, an arylthio group, a heterocyclic thio group, a sulfonyl group, a sulfinyl group, a ureido group, a phosphoric acid amide group, a hydroxyl group, a mercapto group, a halogen atom, a sulfo group, a carboxyl group, a nitro group, a sulfino group, a heterocyclic group and a silyl group are preferable; a substituted or unsubstituted alkyl group, a cycloalkyl group, an aryl group, an amino group, an alkoxy group, an aryloxy group, a cyano group, a fluorine atom and a heterocyclic group are more preferable; and a methyl group, a trifluoromethyl group, a fluorine atom, a methoxy group, an aryl group and a cyano group are further preferable.

B represents an electron-donating substituent selected among an alkyl group, a cycloalkyl group, an amino group, an alkoxy group, an aryloxy group and a fluorine atom. As the substituent, an alkyl group, a cycloalkyl group, an amino group and a fluorine atom are preferable; an alkyl group, a cycloalkyl group and a fluorine atom are more preferable; and an alkyl group is further preferable.

In the formula (VII), when the substituent B is the foregoing electron-donating group, the minimum excitation triplet energy level of the compound represented by the formula (VII) increases, whereby the emission wavelength can be shortened.

Each of the compounds represented by the formulae (I) to (VII) may be a polymer compound having such a compound on a main chain or side chain thereof.

In the case of a polymer compound, the compound may be a homopolymer compound or may be a copolymer. The copolymer may be any of a random copolymer, an alternating copolymer or a block copolymer. In the case of a copolymer, other monomer is preferably a monomer having a charge transport function segment. Examples of the monomer having a charge transport function include monomers having, in a partial structure thereof, a compound exemplified as a host material, a material to be contained in a hole transport or a material to be contained in an electron transport layer as described later. Of these, monomers having, in a partial structure thereof, a compound exemplified as a host material are preferable.

In the case of a polymer compound, its molecular weight is preferably 2,000 or more and less than 1,000,000, more preferably 10,000 or more and less than 500,000, and further preferably 10,000 or more and less than 100,000.

Specific examples of the compound represented by the formula (I) in the invention will be given below, but it should not be construed that the invention is limited thereto.

When the compound of the invention is expressed by the following formula (VIII), partial structures which can be used for $Q^A$, $Q^B$, $Q^C$, $Q^D$ and L are hereunder described. M and L in the partial structures $Q^A$, $Q^B$, $Q^C$, $Q^D$ and L are corresponding to M and L in the formula (VIII), respectively. When the partial structure is $Q^A$, then Q represents $Q^B$; when the partial structure is $Q^B$, then Q represents $Q^A$; when the partial structure is $Q^C$, then Q represents $Q^D$; and when the partial structure is $Q^D$, then Q represents $Q^C$, respectively.

Formula (VIII)

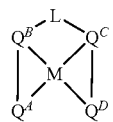

A partial structure which can be used for $Q^A$ is a partial structure group represented by [QB61CC].

A partial structure which can be used for $Q^B$ is a partial structure group represented by [QT60CN].

A partial structure which can be used for $Q^C$ is a partial structure group represented by [QT50CN].

A partial structure which can be used for $Q^D$ is a partial structure group represented by [QB61CC].

A partial structure which can be used for L is a partial structure group represented by [L].

As to two Qs in the partial structure [L], Q on the left-hand side represents $Q^B$, and Q on the right-hand side represents $Q^C$.

For example, a compound which is shown below as the compound represented by the formula (I) means that in the foregoing formula (VIII), $Q^A$ represents QB61CC-151, $Q^B$ represents QT60CN-1, $Q^C$ represents QT50NN-4, $Q^D$ represents QB61CC-1, L represents L-1, and M represents a platinum atom.

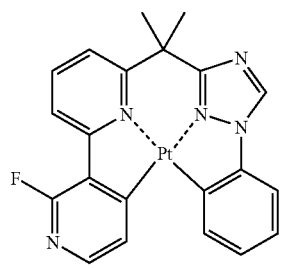

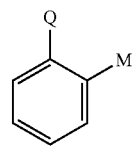

QB61CC-1

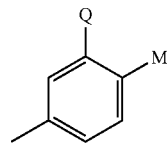

QB61CC-2

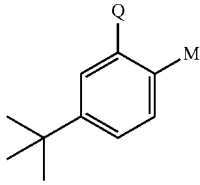

QB61CC-3

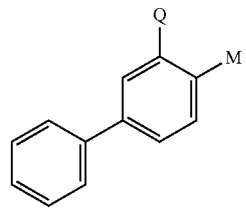

QB61CC-4

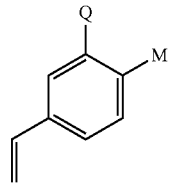

QB61CC-5

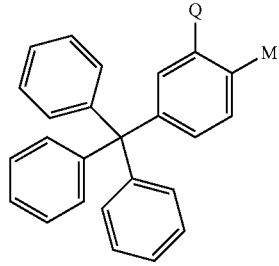

QB61CC-6

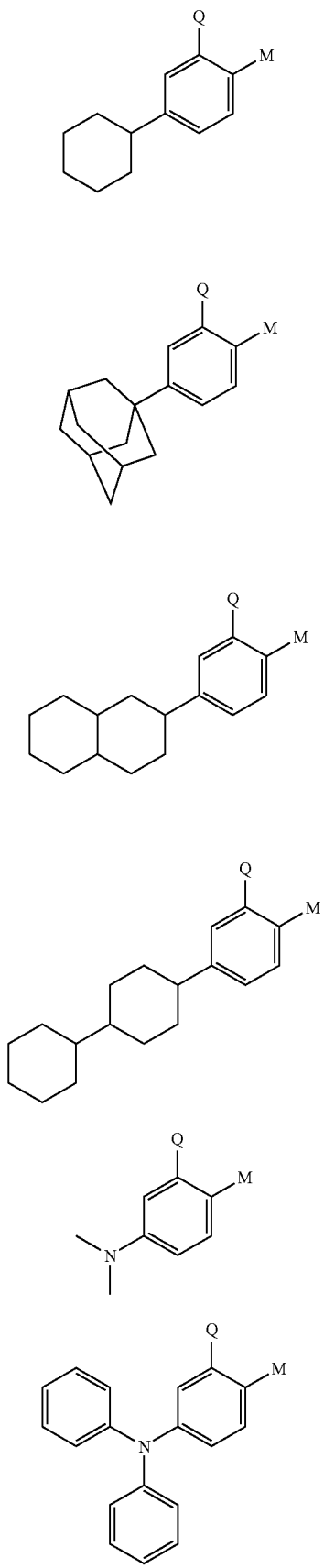

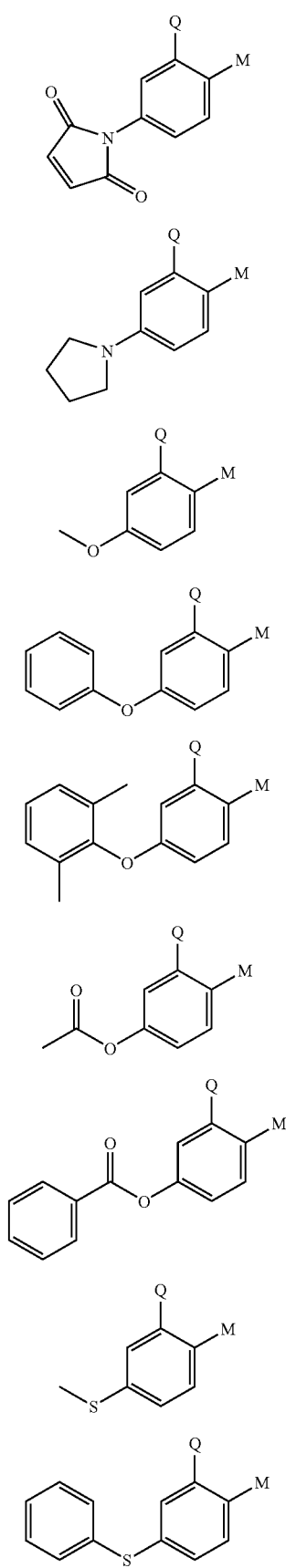
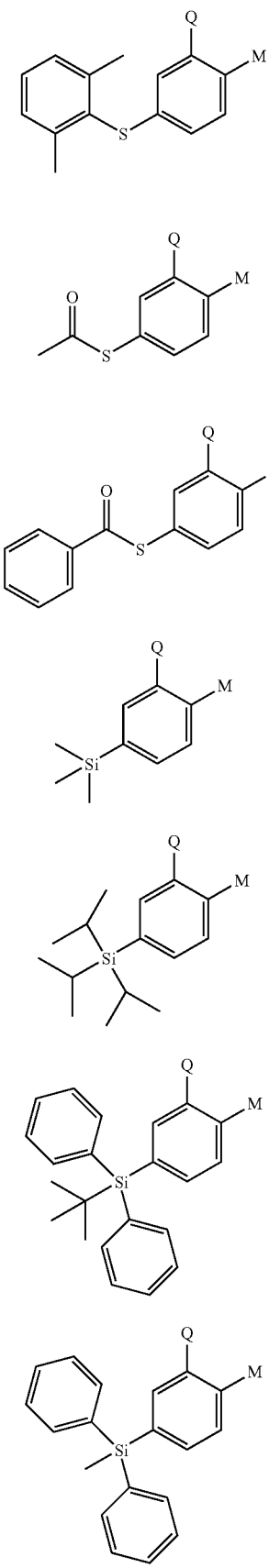

-continued
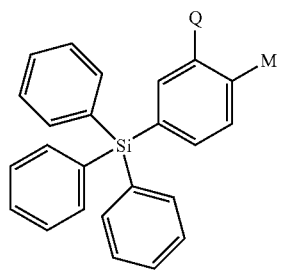 QB61CC-35
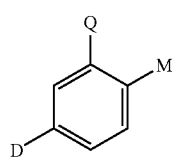 QB61CC-36
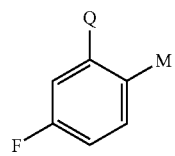 QB61CC-37
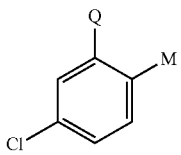 QB61CC-38
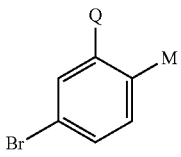 QB61CC-39
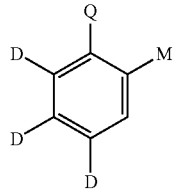 QB61CC-40
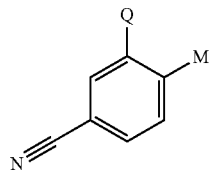 QB61CC-41
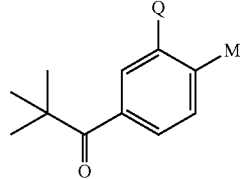 QB61CC-42
-continued
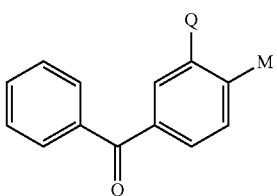 QB61CC-43
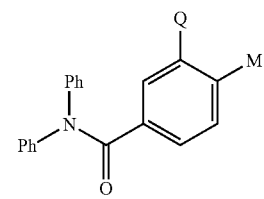 QB61CC-44
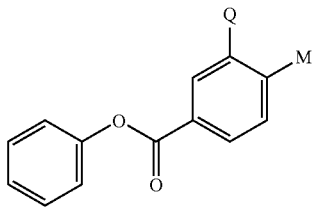 QB61CC-45
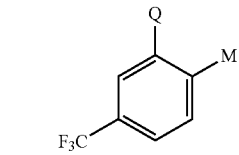 QB61CC-46
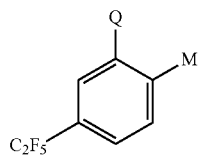 QB61CC-47
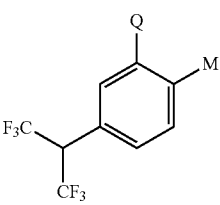 QB61CC-48
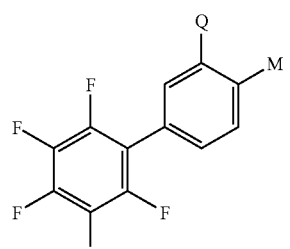 QB61CC-49
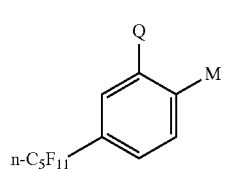 QB61CC-50

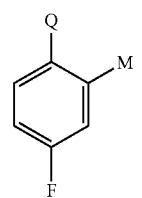 QB61CC-51
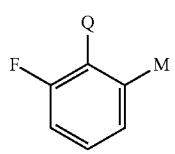 QB61CC-52
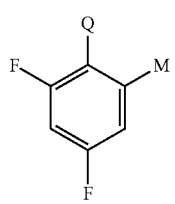 QB61CC-53
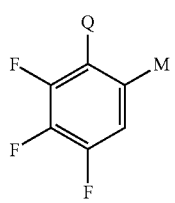 QB61CC-54
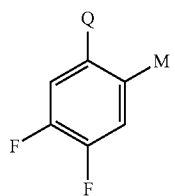 QB61CC-55
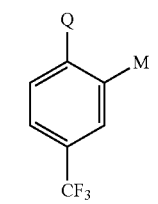 QB61CC-56
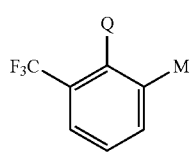 QB61CC-57
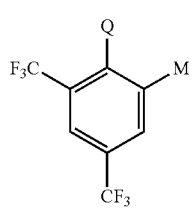 QB61CC-58
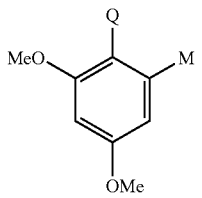 QB61CC-59
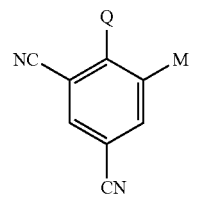 QB61CC-60
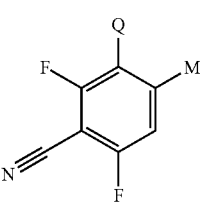 QB61CC-61
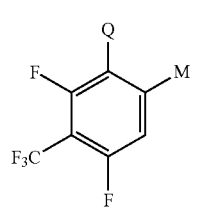 QB61CC-62
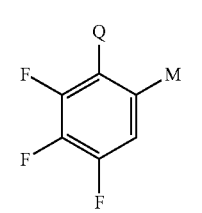 QB61CC-63
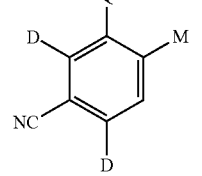 QB61CC-64
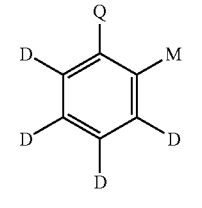 QB61CC-65
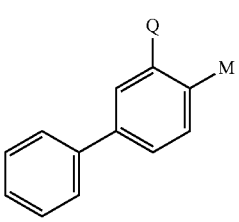 QB61CC-66

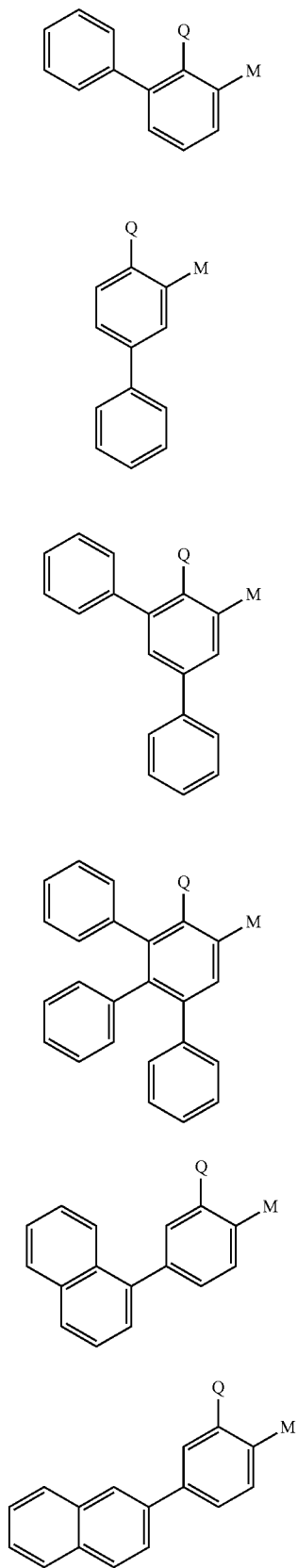
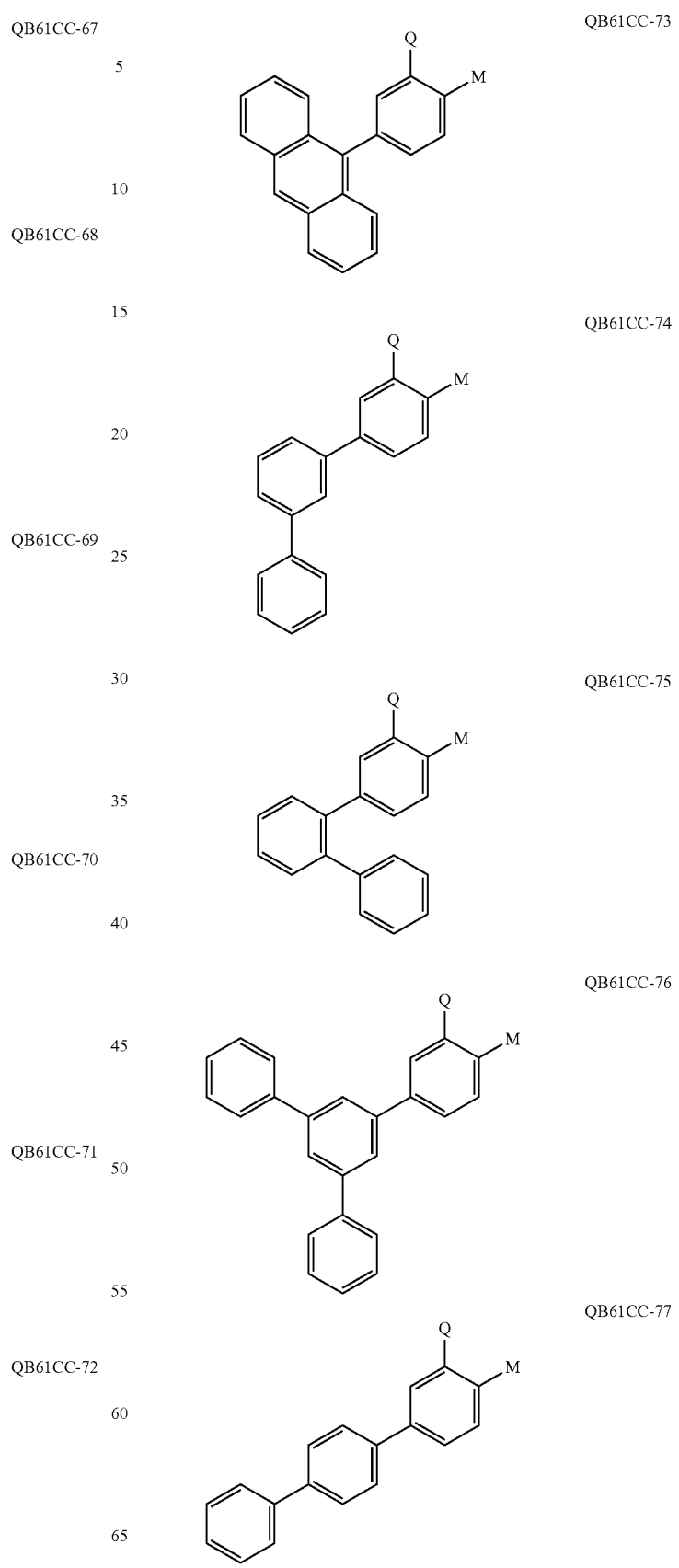

QB61CC-78
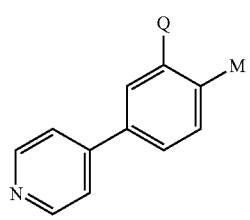
QB61CC-79
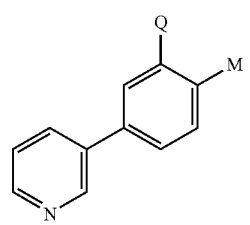
QB61CC-80
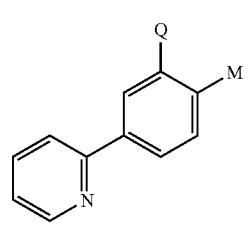
QB61CC-81
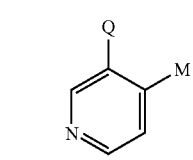
QB61CC-82
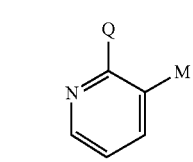
QB61CC-83
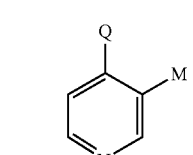
QB61CC-84
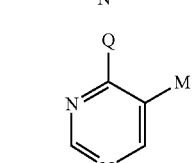
QB61CC-85
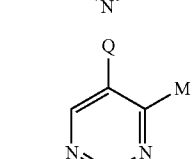
QB61CC-86
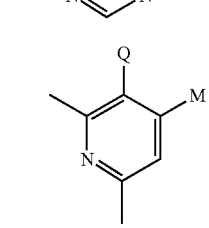
QB61CC-87
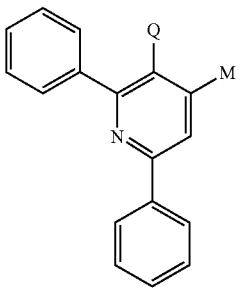
QB61CC-88
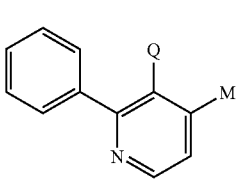
QB61CC-89
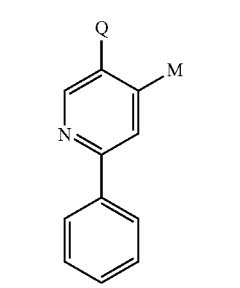
QB61CC-90
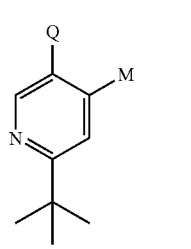
QB61CC-91
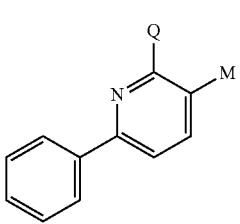
QB61CC-92
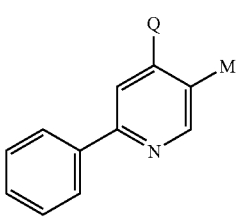
QB61CC-93
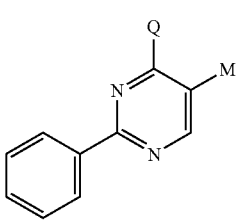

-continued
QB61CC-94
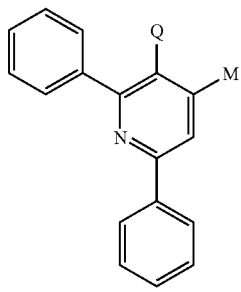
QB61CC-95
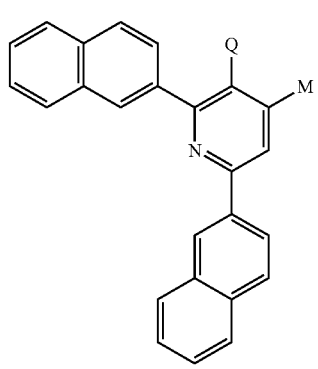
QB61CC-96
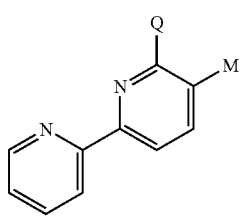
QB61CC-97
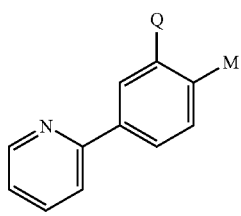
QB61CC-98
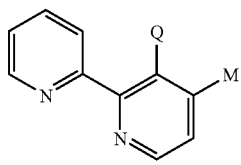
QB61CC-99
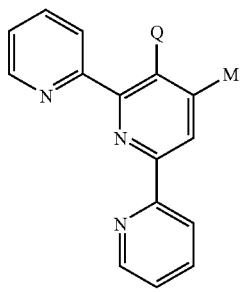
-continued
QB61CC-100
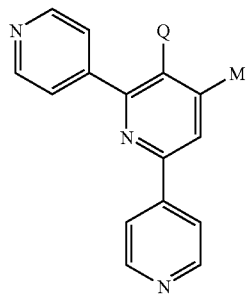
QB61CC-101
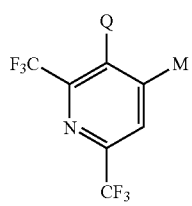
QB61CC-102
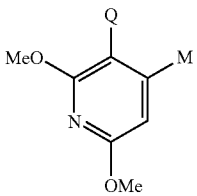
QB61CC-103
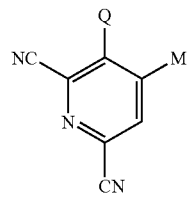
QB61CC-104
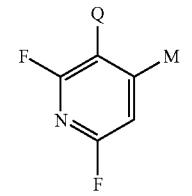
QB61CC-105
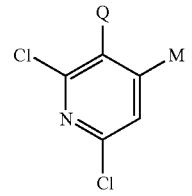
QB61CC-106
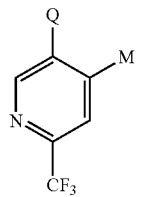

QB61CC-107
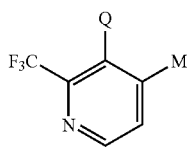
QB61CC-108
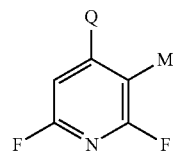
QB61CC-109
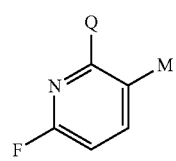
QB61CC-110
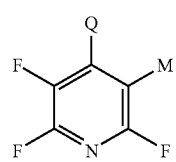
QB61CC-111
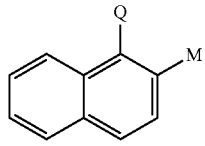
QB61CC-112
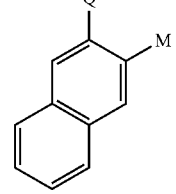
QB61CC-113
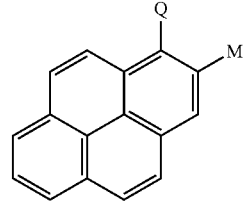
QB61CC-114
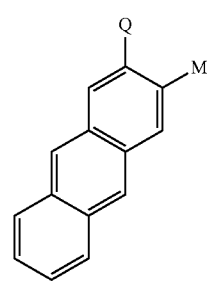
QB61CC-115
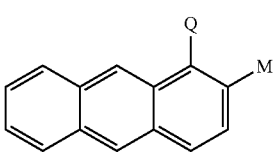
QB61CC-116
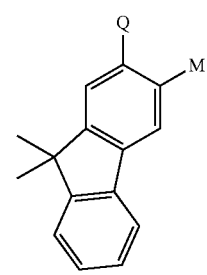
QB61CC-117
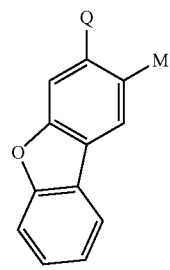
QB61CC-118
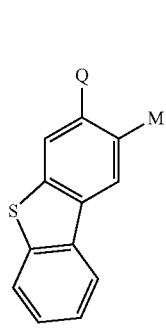
QB61CC-119
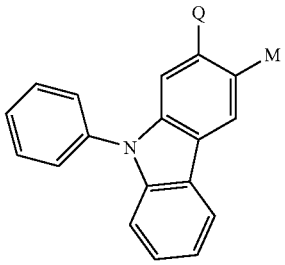
QB61CC-120
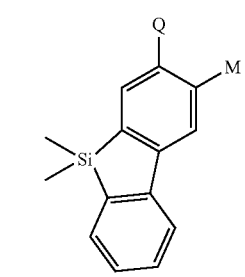

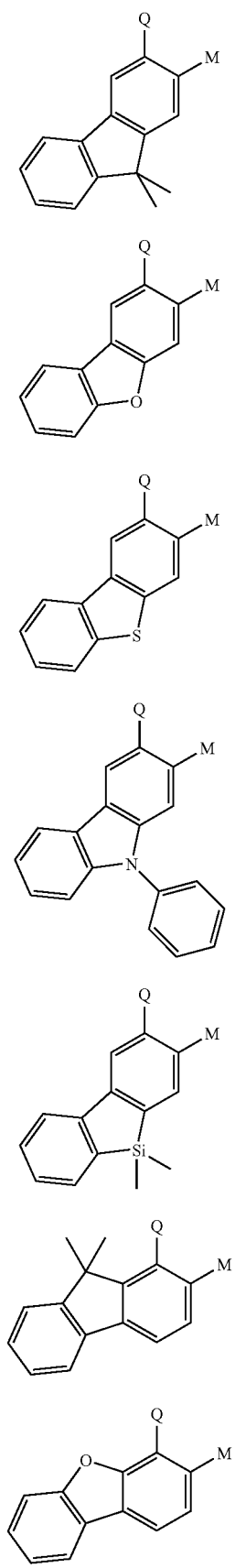
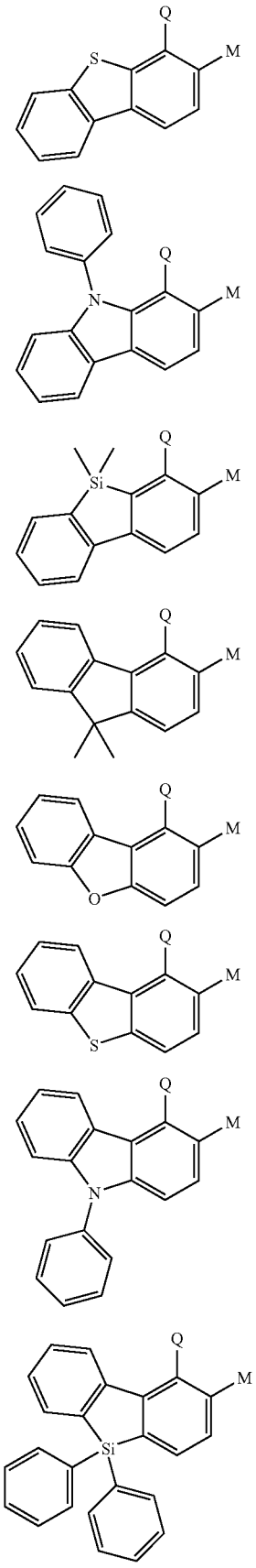

QB61CC-136
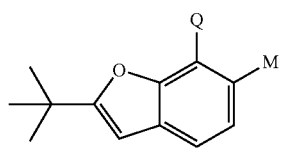
QB61CC-137
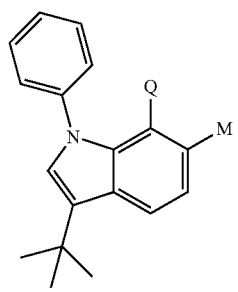
QB61CC-138
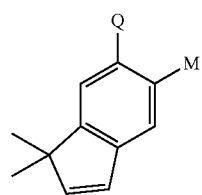
QB61CC-139
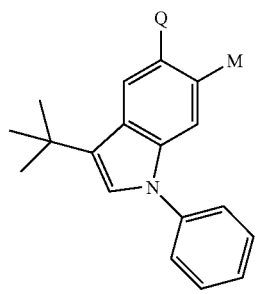
QB61CC-140
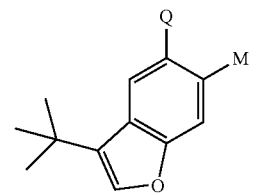
QB61CC-141
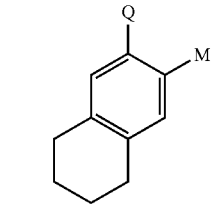
QB61CC-142
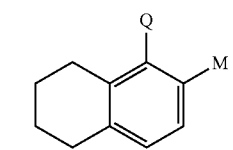
QB61CC-143
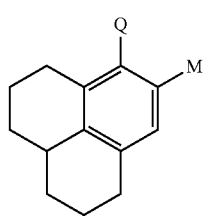
QC61CC-144
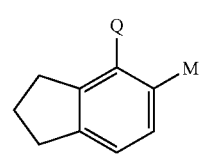
QB61CC-145
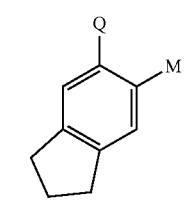
QB61CC-146
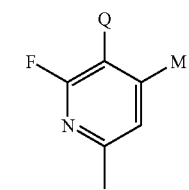
QB61CC-147
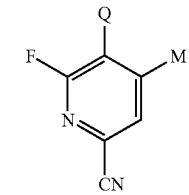
QB61CC-148
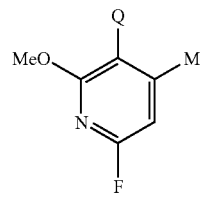
QB61CC-149
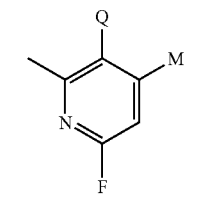
QB61CC-150
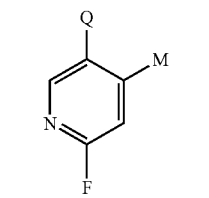

-continued
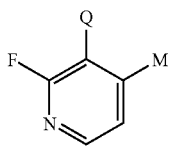 QB61CC-151
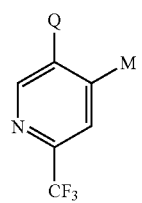 QB61CC-152
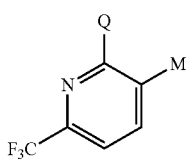 QB61CC-153
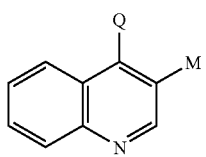 QB61CC-154
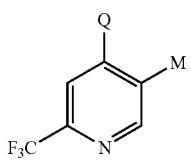 QB61CC-155
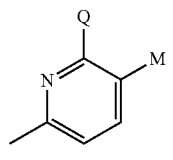 QB61CC-156
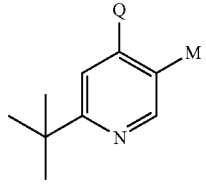 QB61CC-157
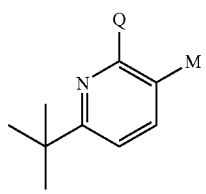 QB61CC-158
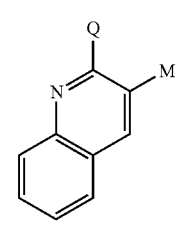 QB61CC-159
-continued
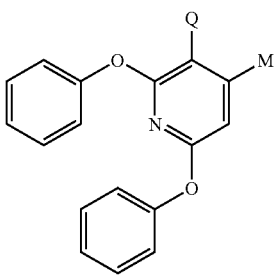 QB61CC-160
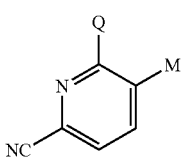 QB61CC-161
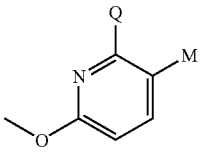 QB61CC-162
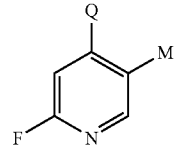 QB61CC-163
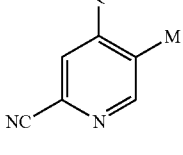 QB61CC-164
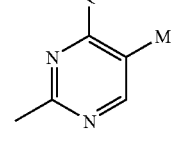 QB61CC-165
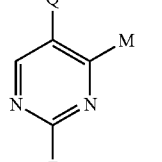 QB61CC-166
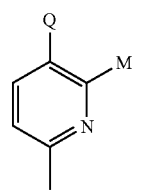 QB61CC-167

QB61CC-168
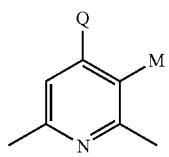
The partial structure group [QT60CN] is shown below.
QT60CN-1
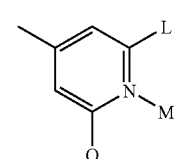
QT60CN-2
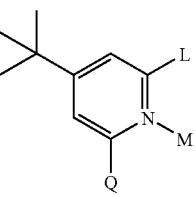
QT60CN-3
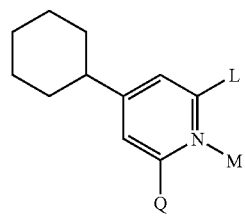
QT60CN-4
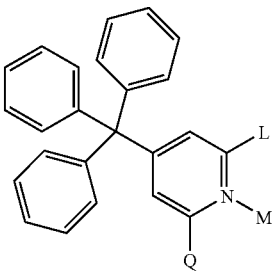
QT60CN-5
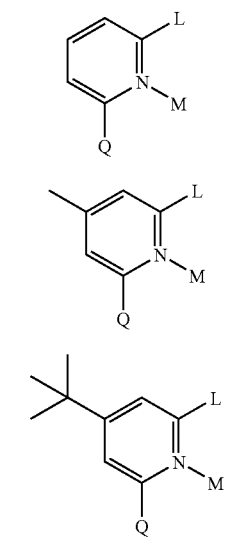
QT60CN-6
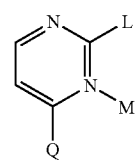
QT60CN-7
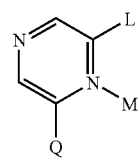
QT60CN-8
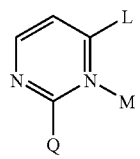
QT60CN-9
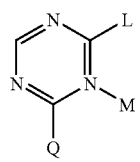
QT60CN-10
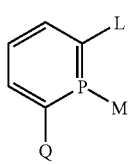
QT60CN-11
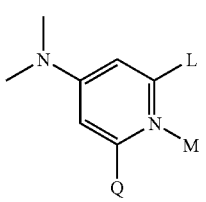
QT60CN-12
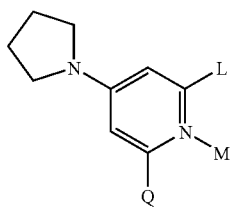
QT60CN-13
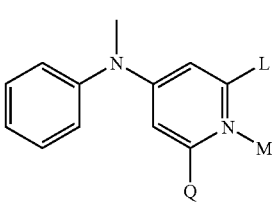
QT60CN-14
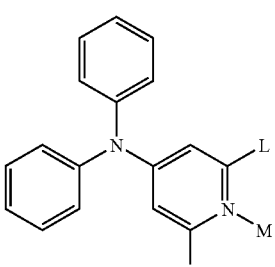
QT60CN-15
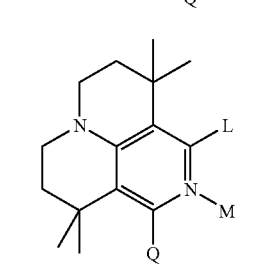

QT60CN-16
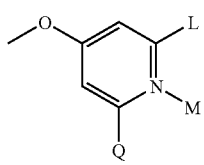
QT60CN-17
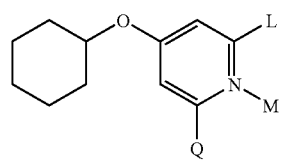
QT60CN-18
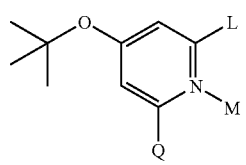
QT60CN-19
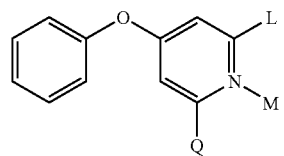
QT60CN-20
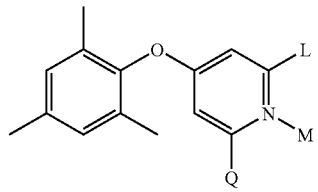
QT60CN-21
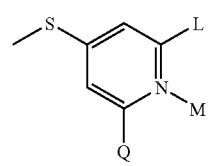
QT60CN-22
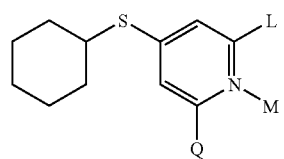
QT60CN-23
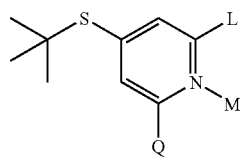
QT60CN-24
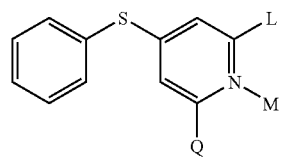
QT60CN-25
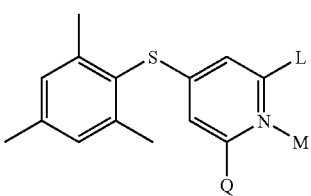
QT60CN-26
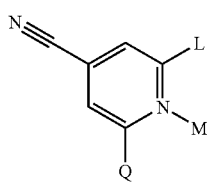
QT60CN-27
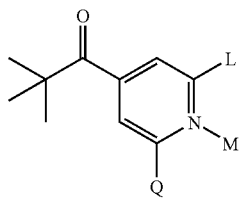
QT60CN-28
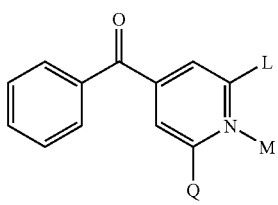
QT60CN-29
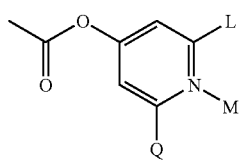
QT60CN-30
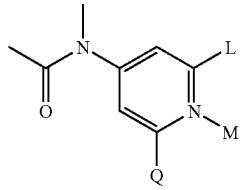
QT60CN-31
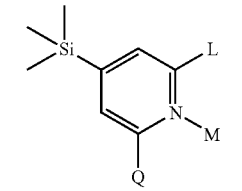
QT60CN-32
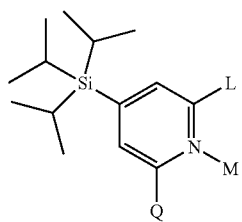

QT60CN-33
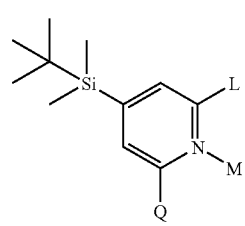
QT60CN-34
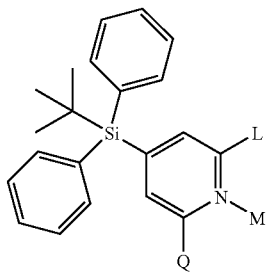
QT60CN-35
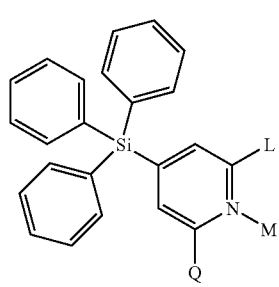
QT60CN-36
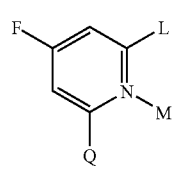
QT60CN-37
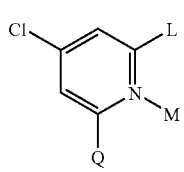
QT60CN-38
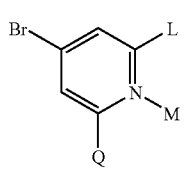
QT60CN-39
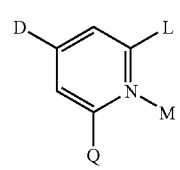
QT60CN-40
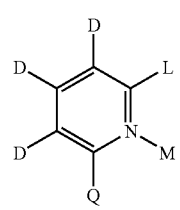
QT60CN-41
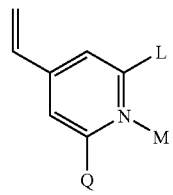
QT60CN-42
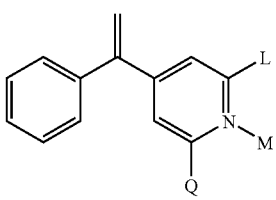
QT60CN-43
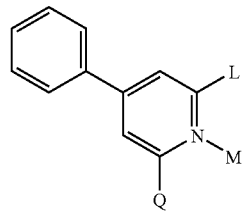
QT60CN-44
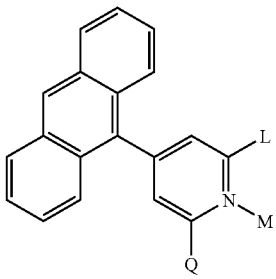
QT60CN-45
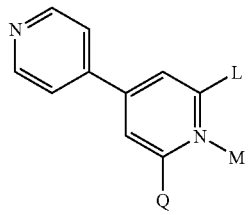
QT60CN-46
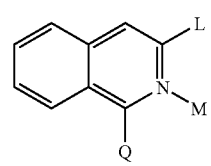
QT60CN-47
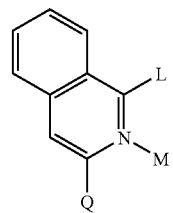

QT60CN-48
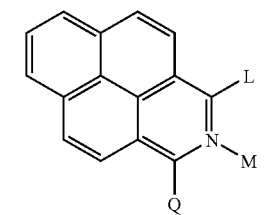
QT60CN-49
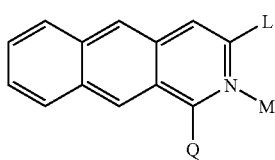
QT60CN-50
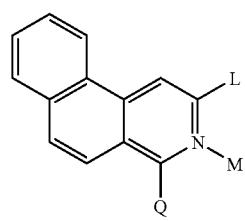
QT60CN-51
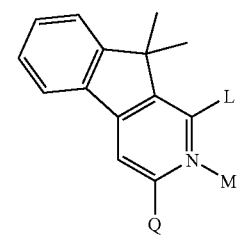
QT60CN-52
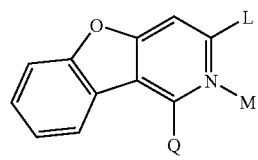
QT60CN-53
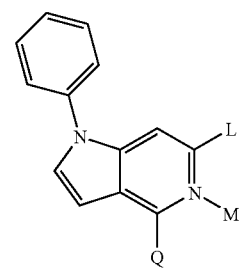
QT60CN-54
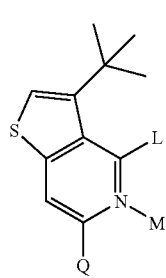
QT60CN-55
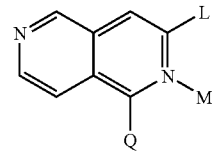
QT60CN-56
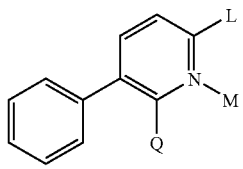
QT60CN-57
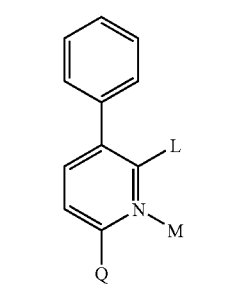
QT60CN-58
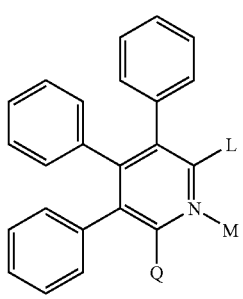
QT60CN-59
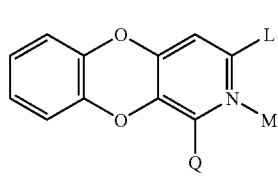
QT60CN-60
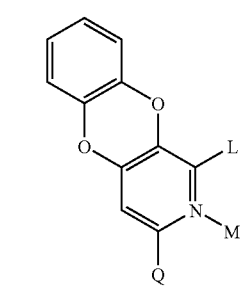
QT60CN-61
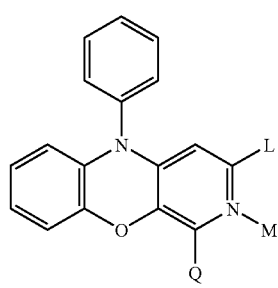

47
-continued
QT60CN-62
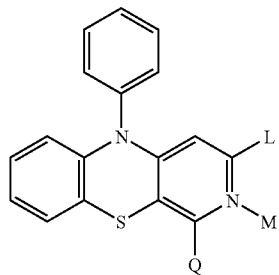
QT60CN-63
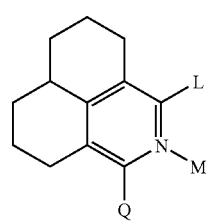
QT60CN-64
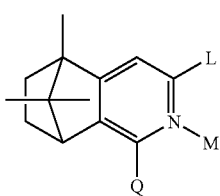
QT60CN-65
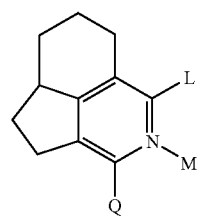
QT60CN-66
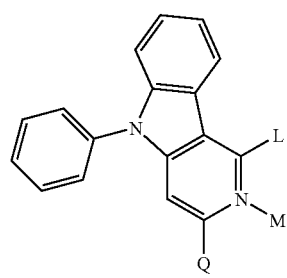
QT60CN-67
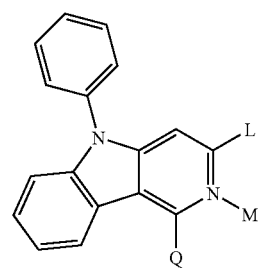
48
-continued
QT60CN-68
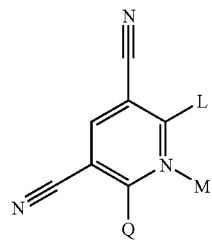
QT60CN-69
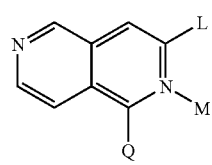
QT60CN-70
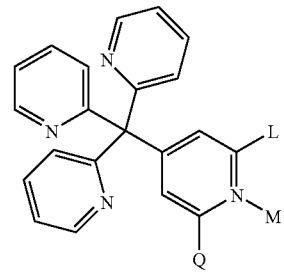
QT60CN-71
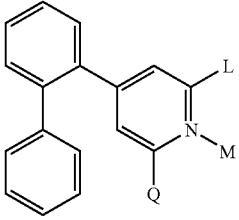
QT60CN-72
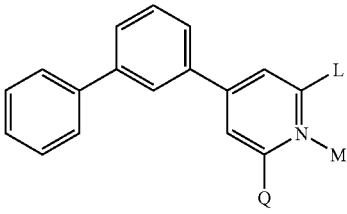
QT60CN-73
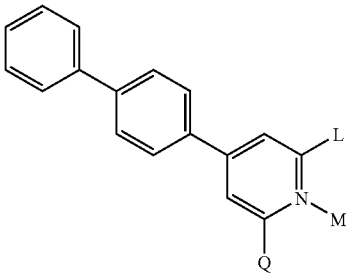

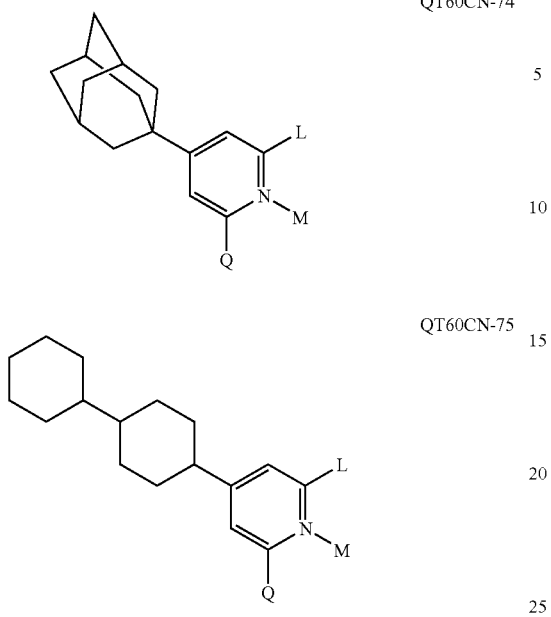
The partial structure group [QT50NN] is shown below.
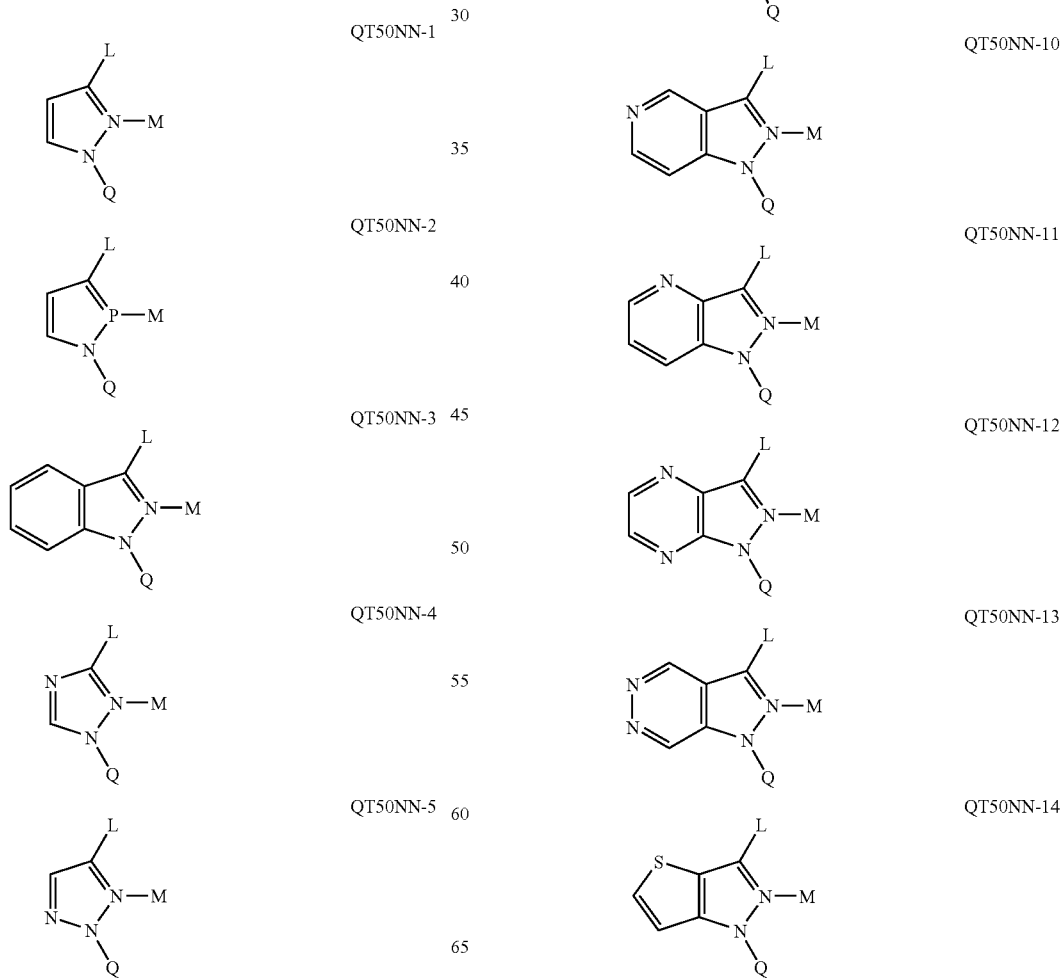
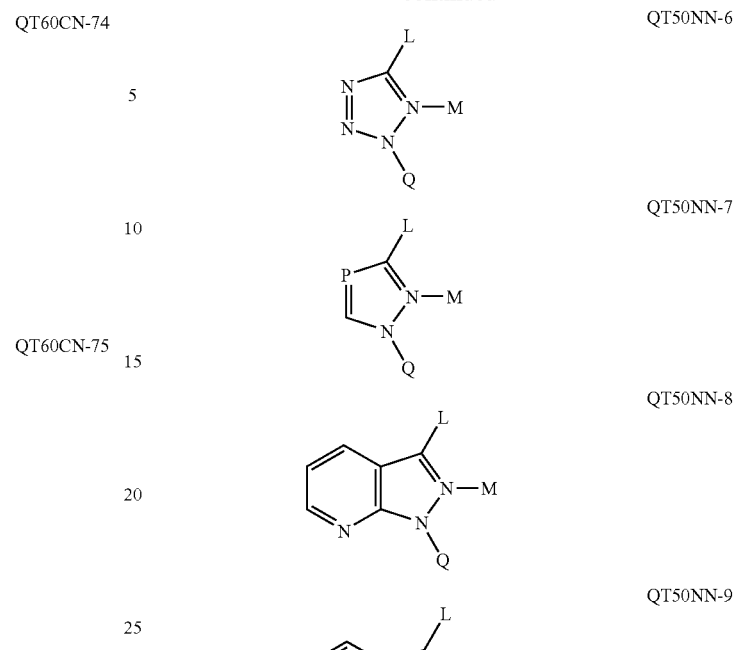

-continued
QT50NN-15
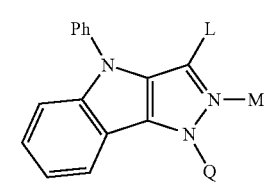
QT50NN-16
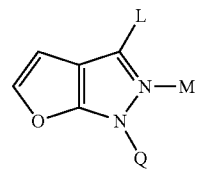
QT50NN-17
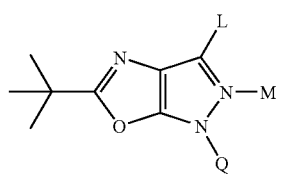
QT50NN-18
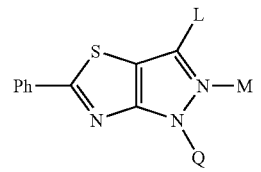
QT50NN-19
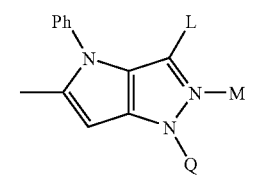
QT50NN-20
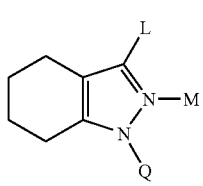
QT50NN-21
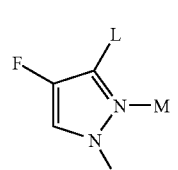
QT50NN-22
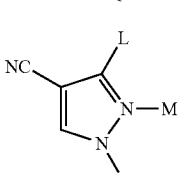
QT50NN-23
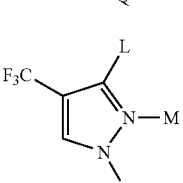
-continued
QT50NN-24
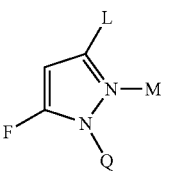
QT50NN-25
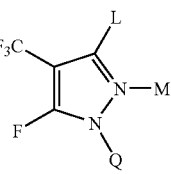
QT50NN-26
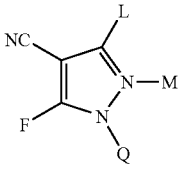
QT50NN-27
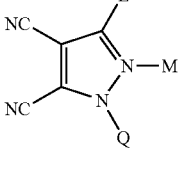
QT50NN-28
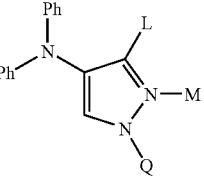
QT50NN-29
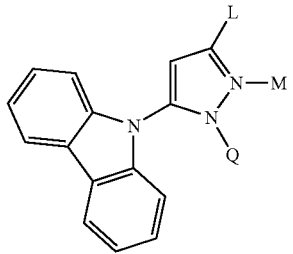
QT50NN-30
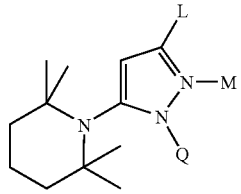
QT50NN-31
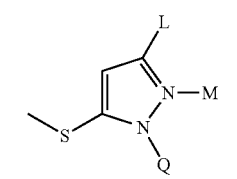

-continued
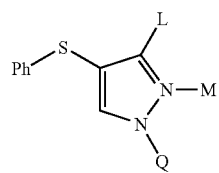
QT50NN-32
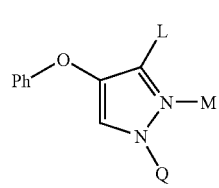
QT50NN-33
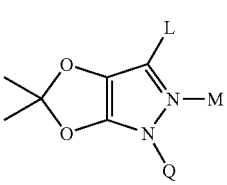
QT50NN-34
QT50NN-35
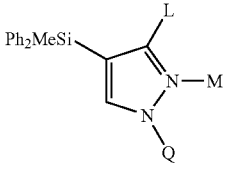
QT50NN-36
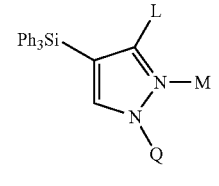
QT50NN-37
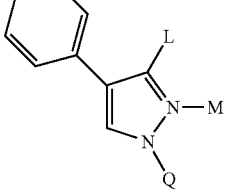
QT50NN-38
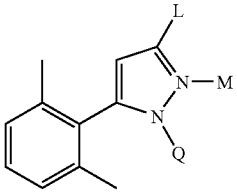
QT50NN-39
-continued
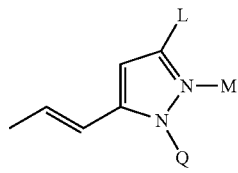
QT50NN-40
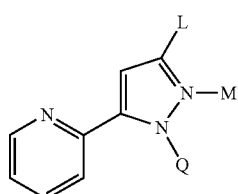
QT50NN-41
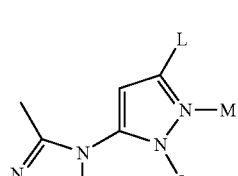
QT50NN-42
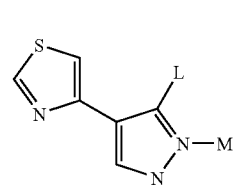
QT50NN-43
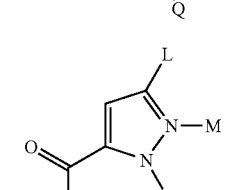
QT50NN-44
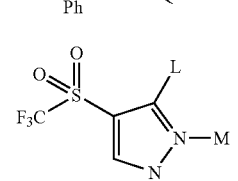
QT50NN-45
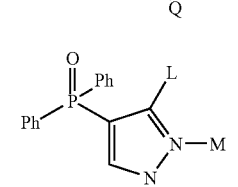
QT50NN-46
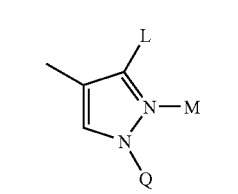
QT50NN-47

-continued
QT50NN-48
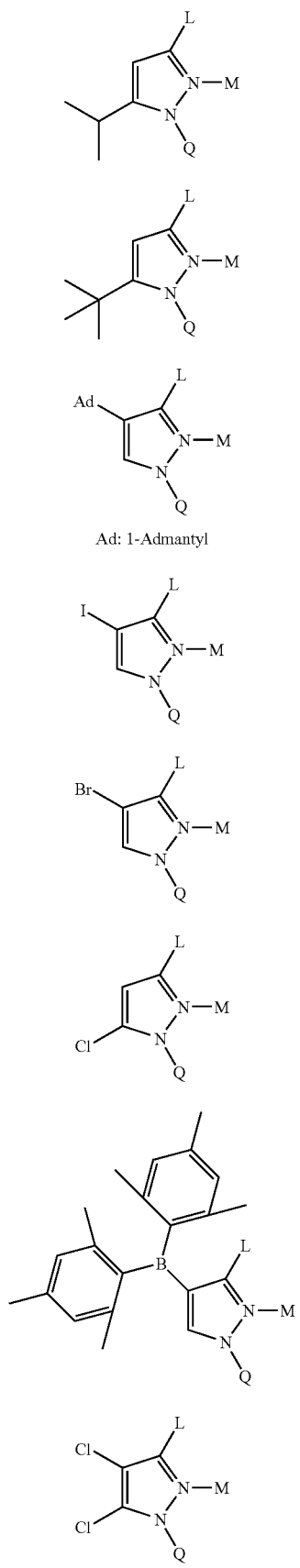
Ad: 1-Admantyl
-continued
QT50NN-56
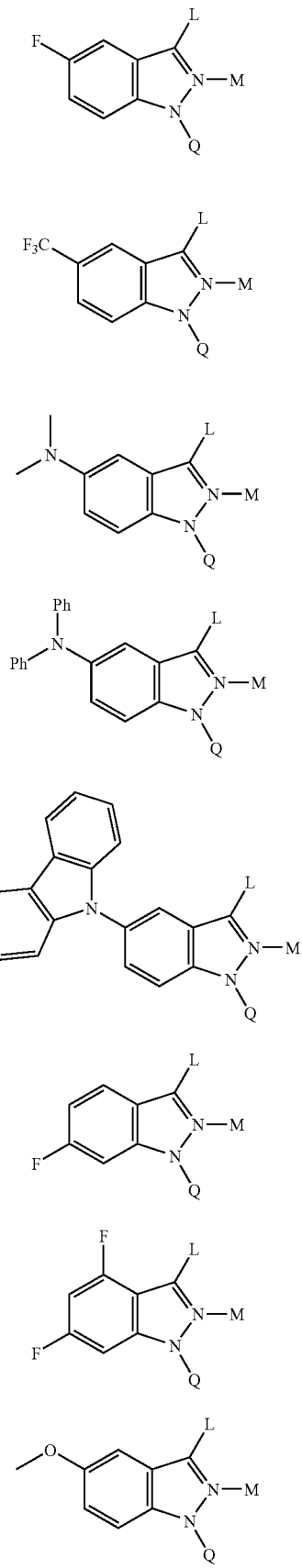
QT50NN-49
QT50NN-57
QT50NN-50
QT50NN-58
QT50NN-51
QT50NN-59
QT50NN-52
QT50NN-60
QT50NN-53
QT50NN-61
QT50NN-54
QT50NN-62
QT50NN-55
QT50NN-63

-continued
QT50NN-64
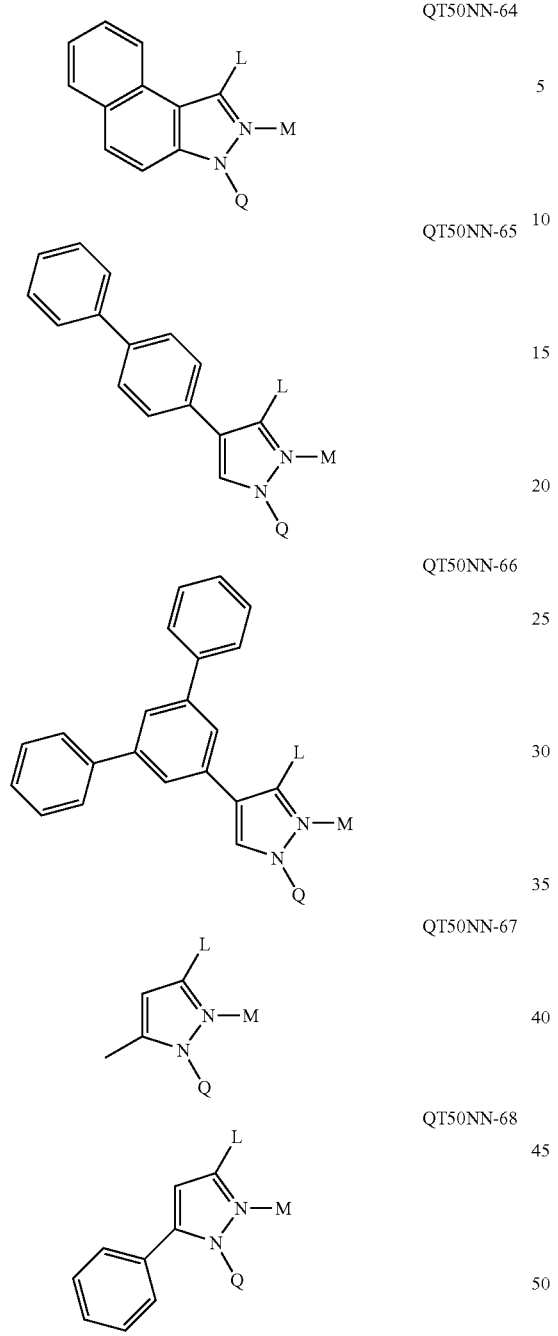
QT50NN-65
QT50NN-66
QT50NN-67
QT50NN-68
The partial structure group [L] is shown below.
L-1
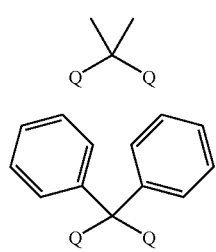
L-2
-continued
L-3
L-4
L-5
L-6
L-7
L-8
L-9
L-10
L-11
L-12
L-13
L-14
L-15
L-16

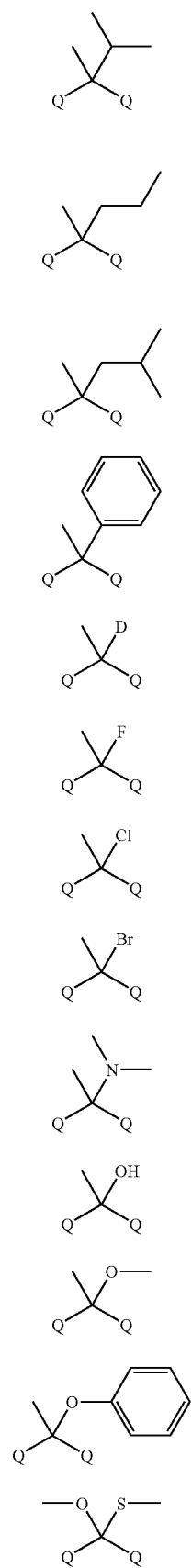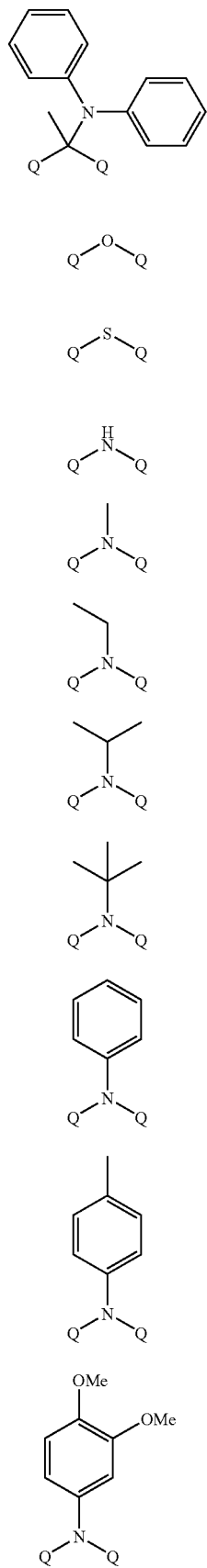

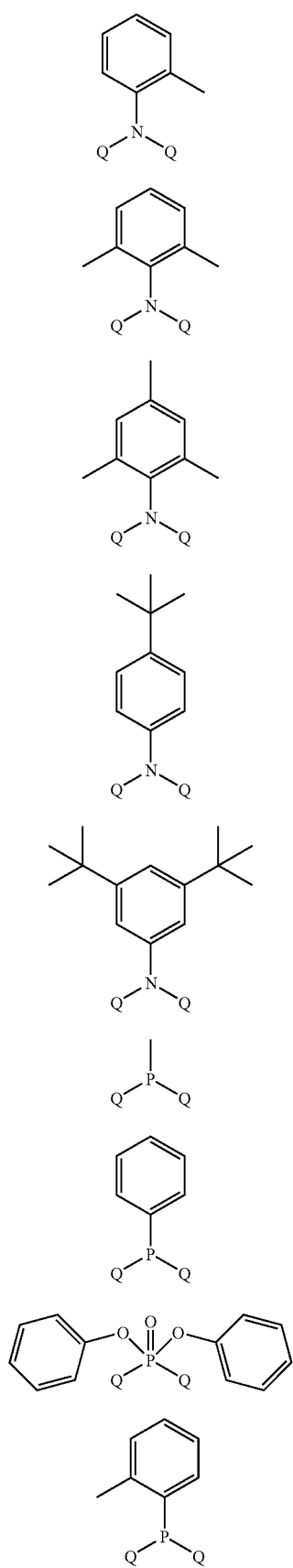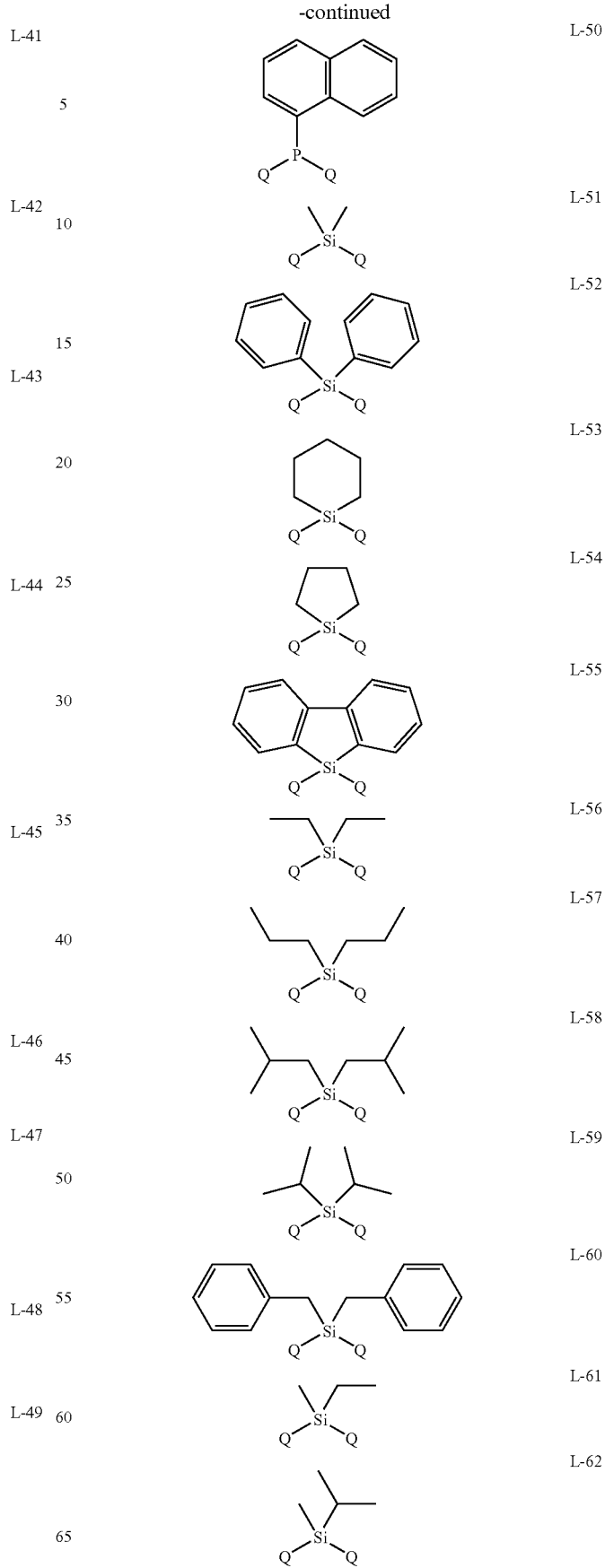

-continued
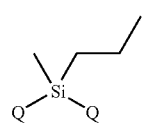 L-63
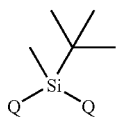 L-64
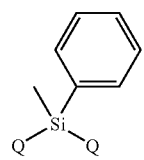 L-65
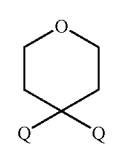 L-66
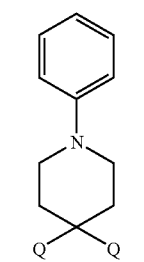 L-67
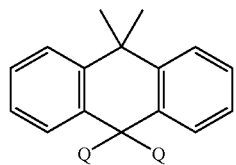 L-68
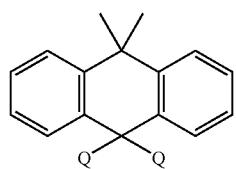 L-69
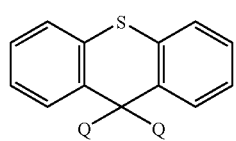 L-70
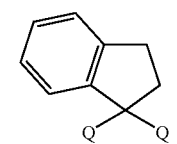 L-71
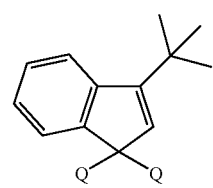 L-72
-continued
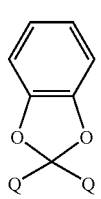 L-73
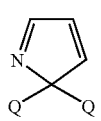 L-74
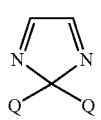 L-75
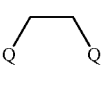 L-76
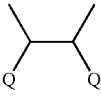 L-77
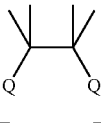 L-78
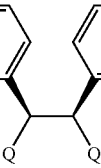 L-79
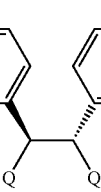 L-80
 L-81
 L-82
 L-83
 L-84

-continued
 L-85
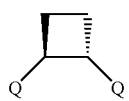 L-86
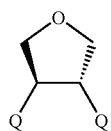 L-87
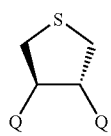 L-88
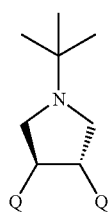 L-89
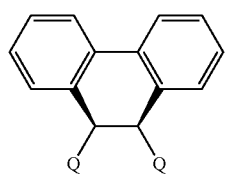 L-90
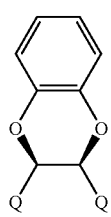 L-91
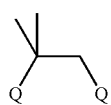 L-92
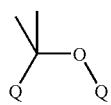 L-93
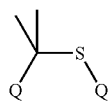 L-94
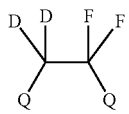 L-95
-continued
 L-96
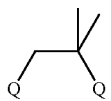 L-97
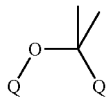 L-98
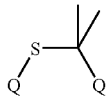 L-99
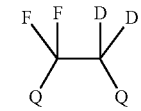 L-100
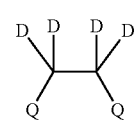 L-101
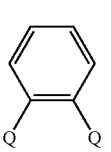 L-102
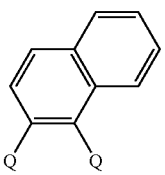 L-103
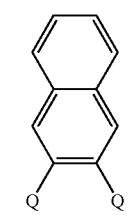 L-104
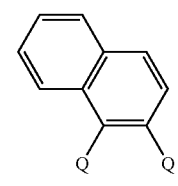 L-105
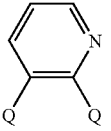 L-106

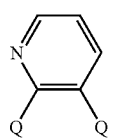 L-107
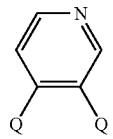 L-108
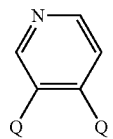 L-109
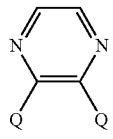 L-110
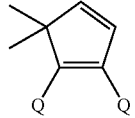 L-111
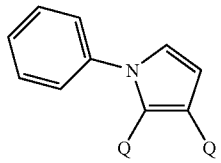 L-112
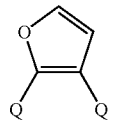 L-113
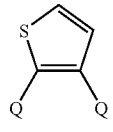 L-114
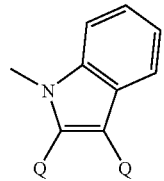 L-115
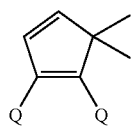 L-116
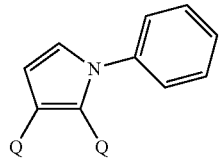 L-117
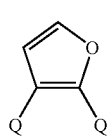 L-118
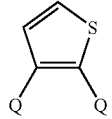 L-119
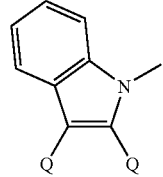 L-120
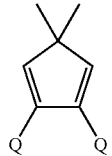 L-121
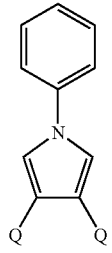 L-122
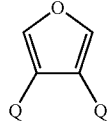 L-123
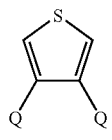 L-124
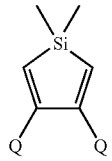 L-125
More specific examples of the compound will be given below, but it should not be construed that the invention is limited thereto.

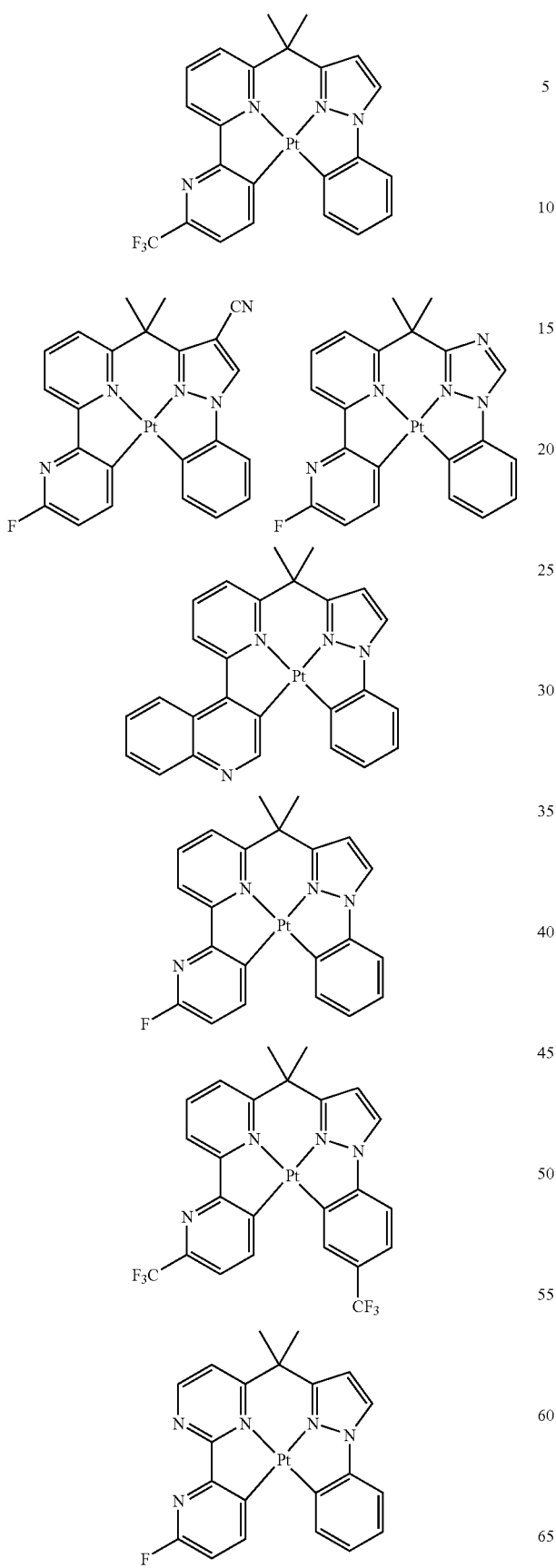
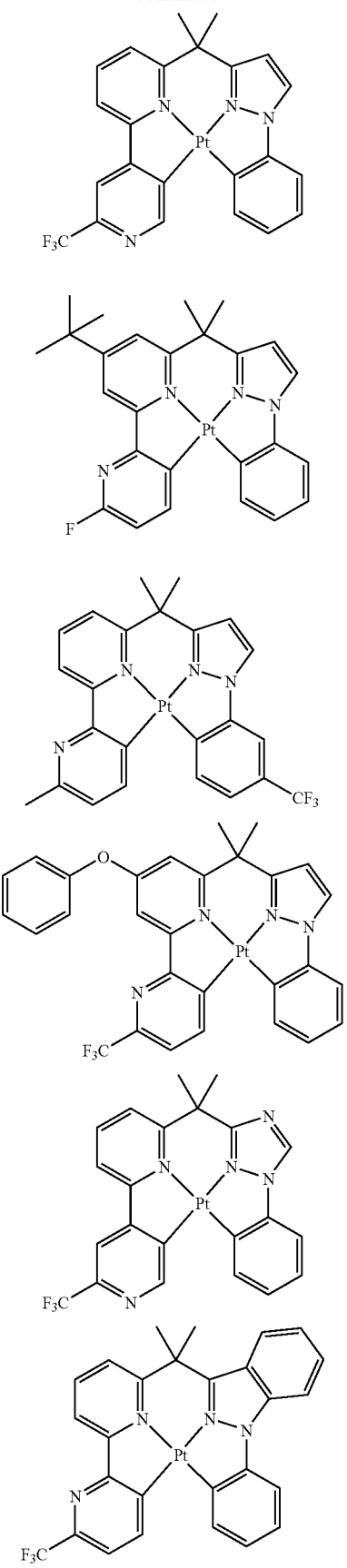

71
-continued
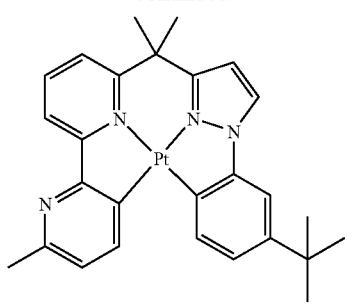
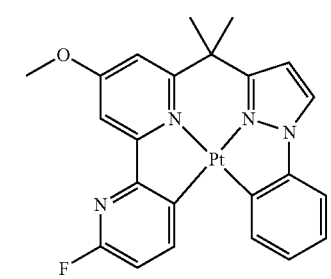
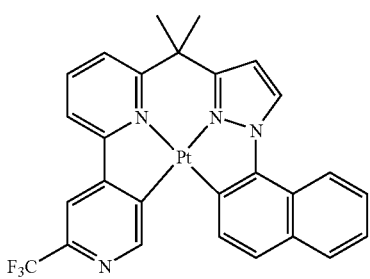
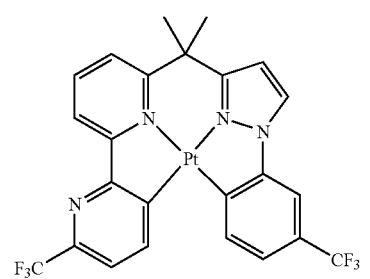
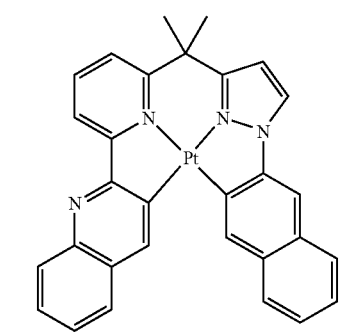
72
-continued
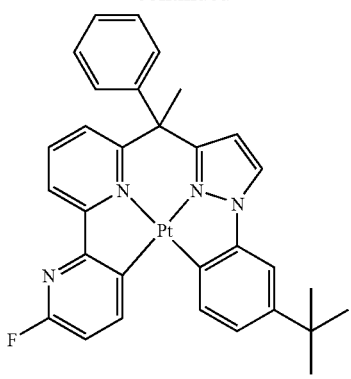
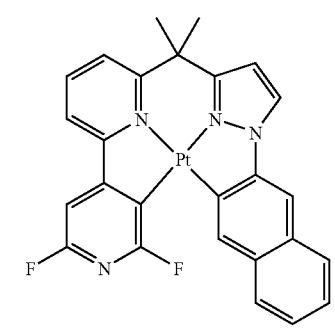
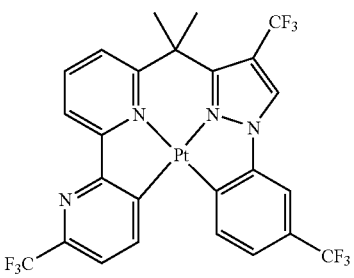
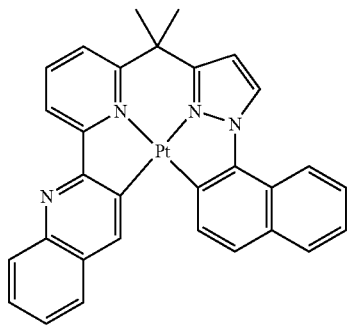
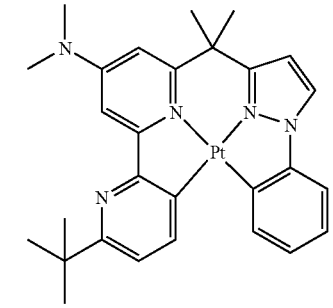

73
-continued
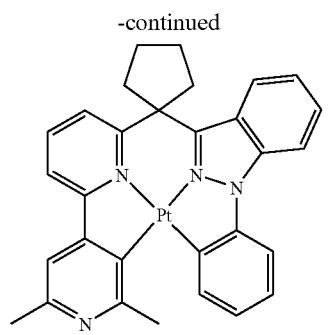
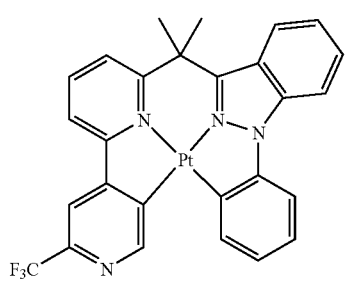
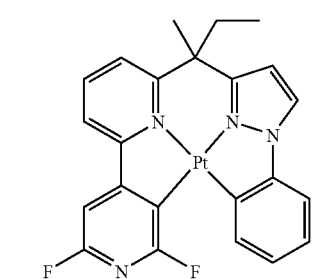
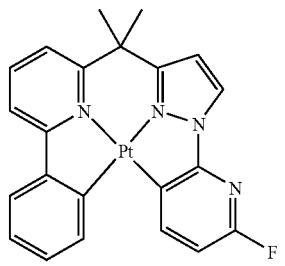
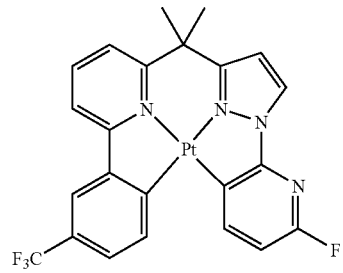
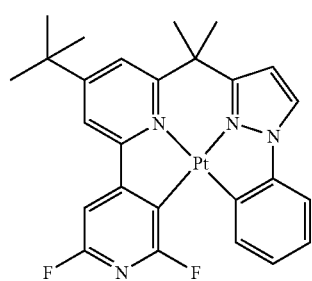
74
-continued
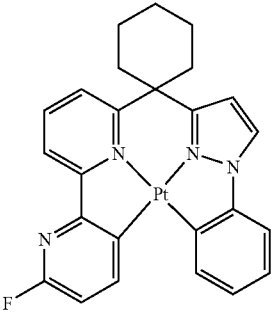
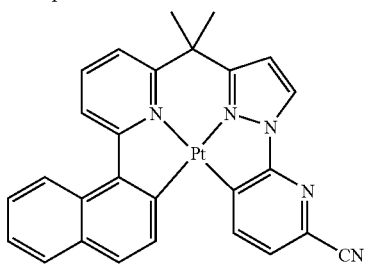
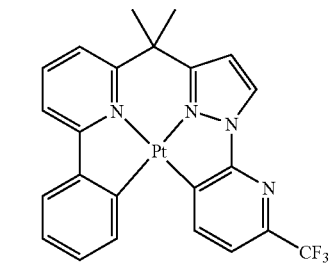
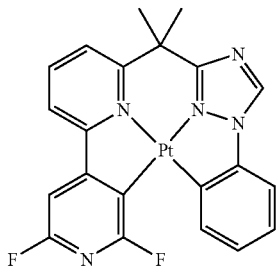
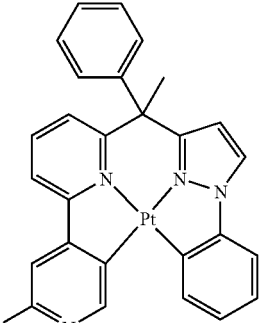
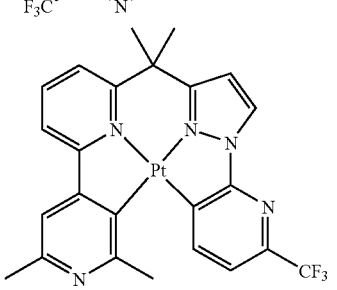

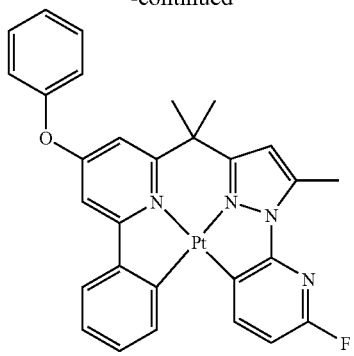
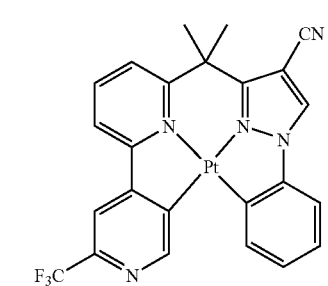
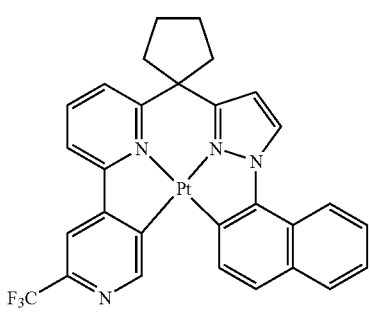
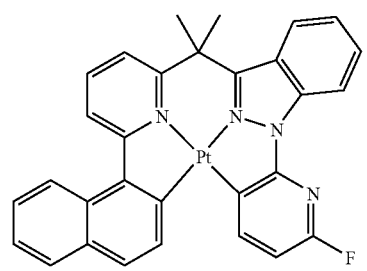
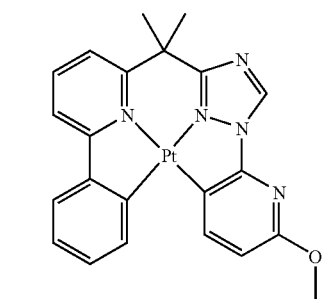
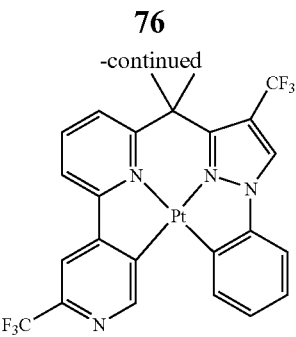
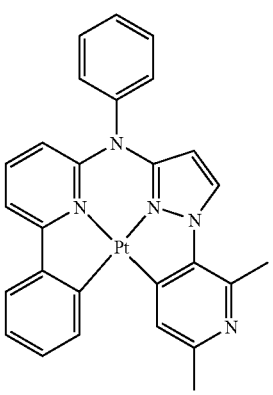
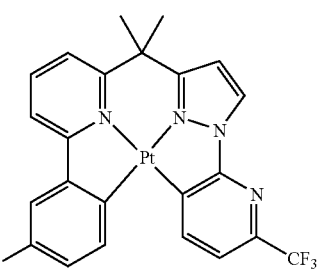
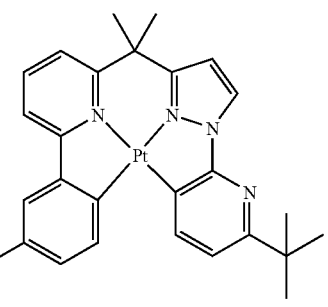
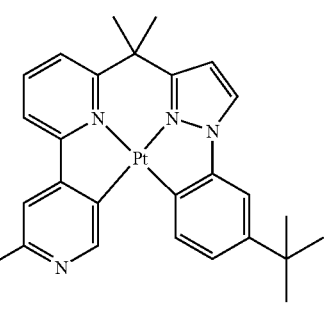

77
-continued
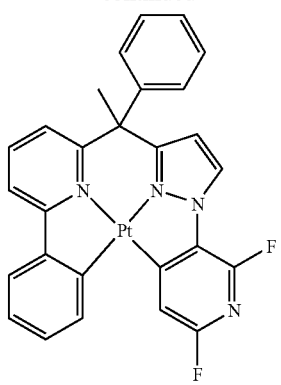
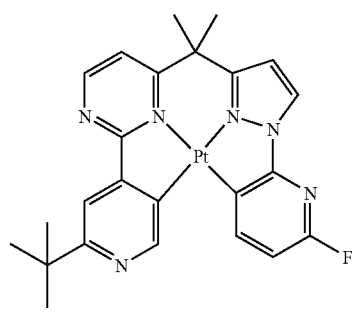
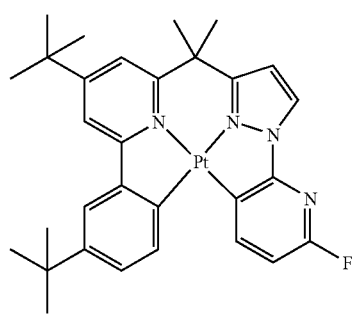
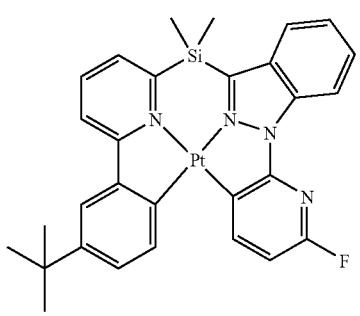
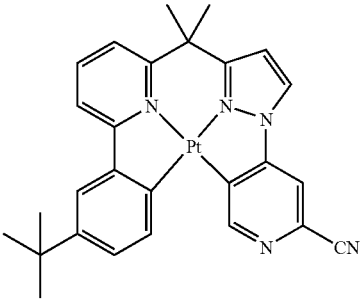
78
-continued
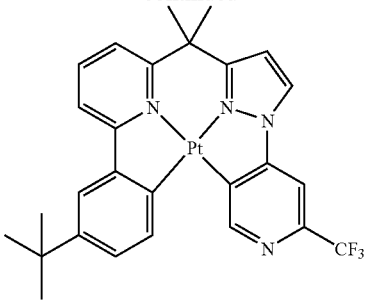
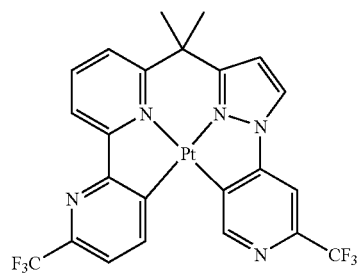
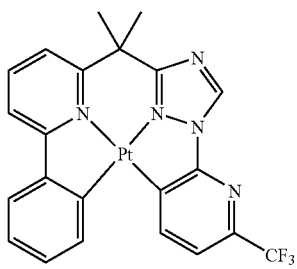
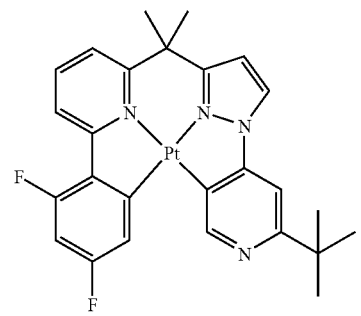
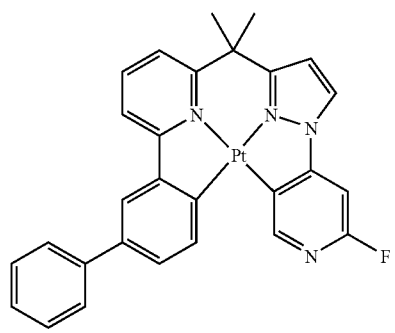

-continued
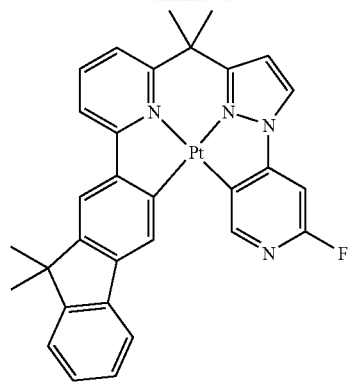
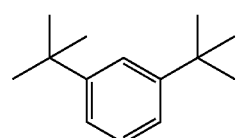
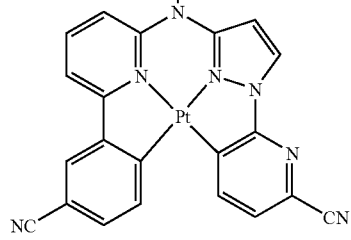
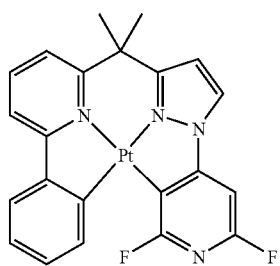
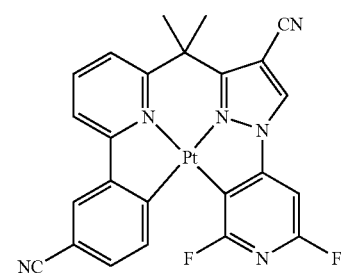
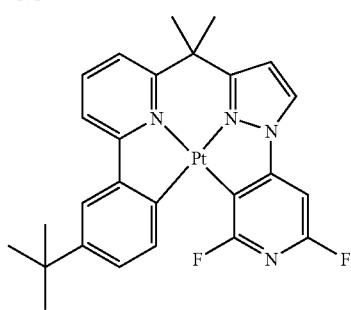
-continued
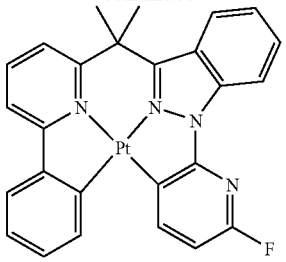
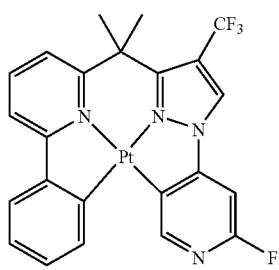
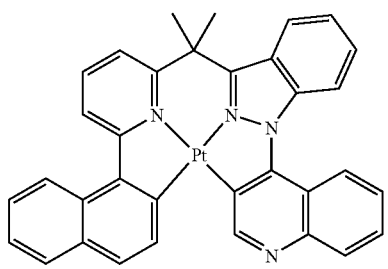
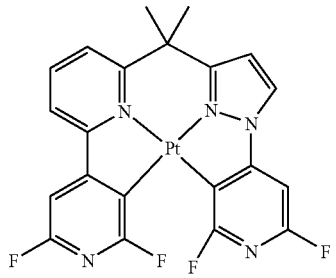
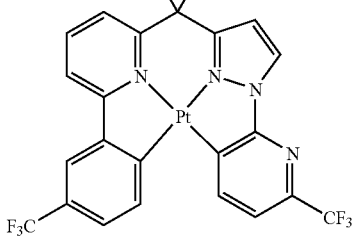
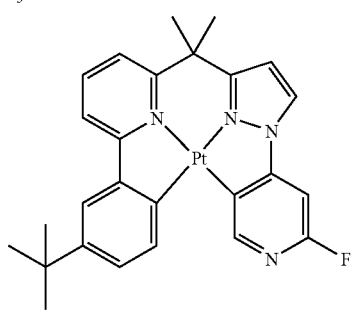

81
-continued
82
-continued
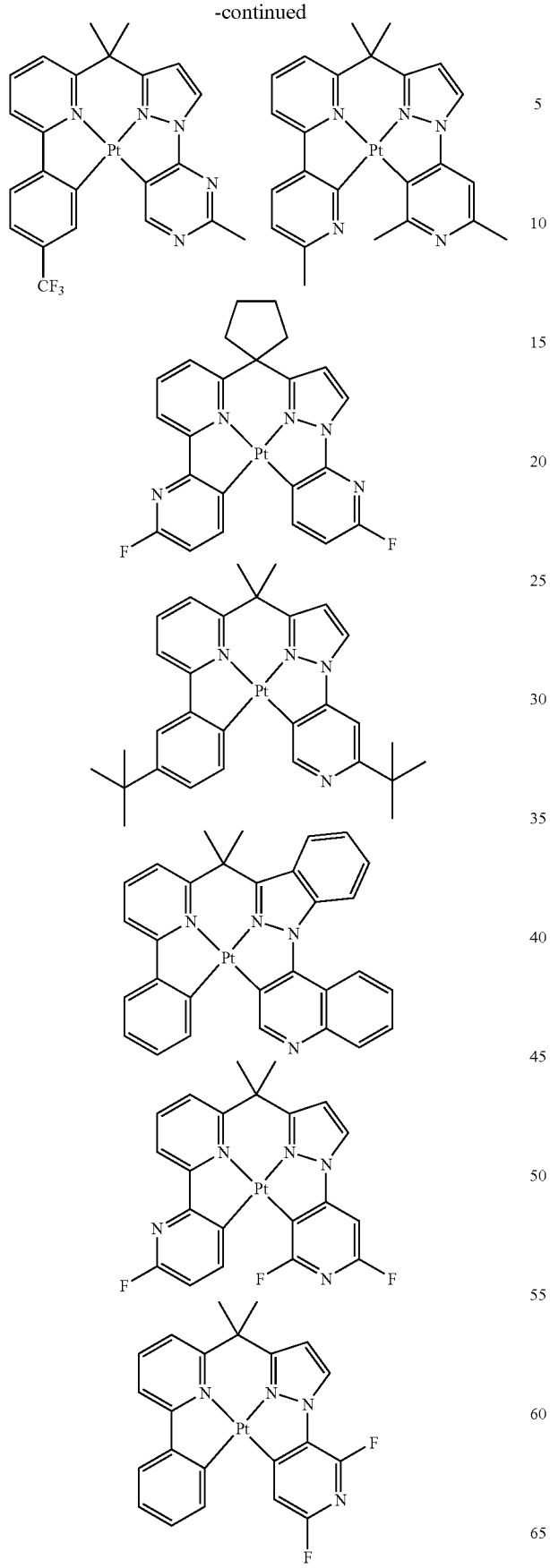

83
-continued
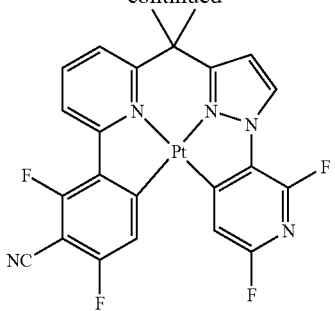
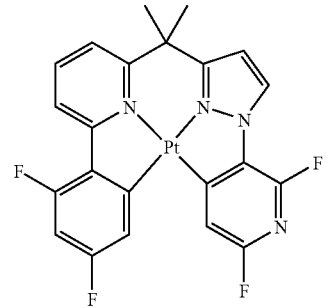
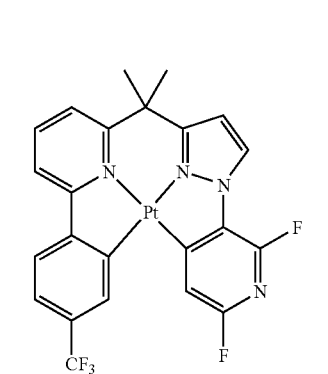
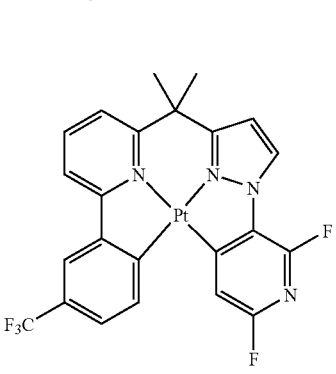
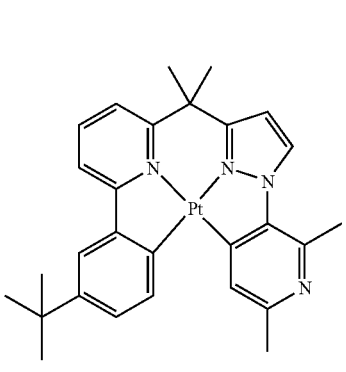
84
-continued
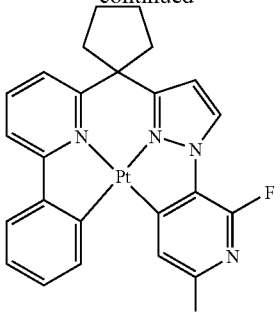
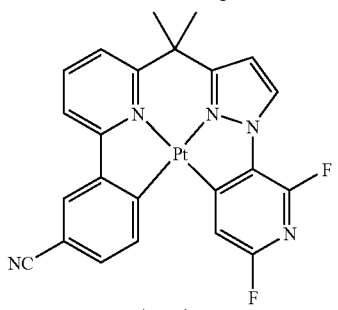
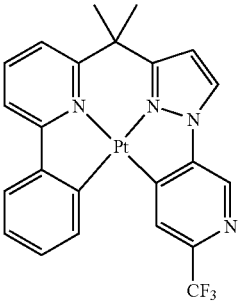
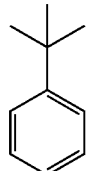
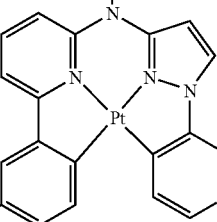
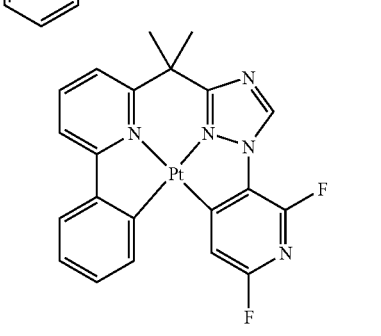

85
-continued
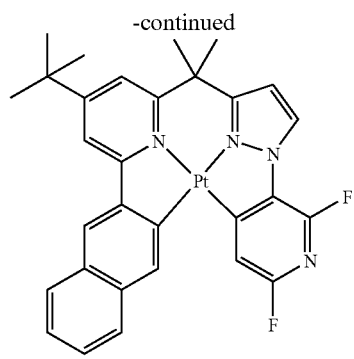
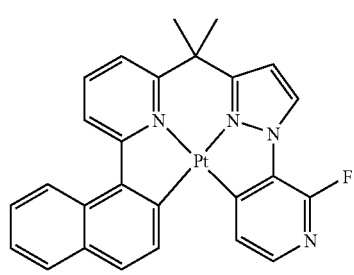
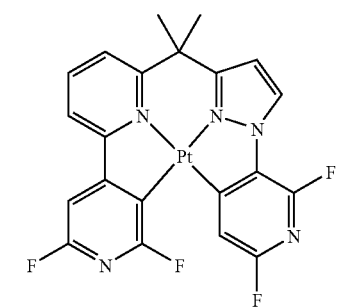
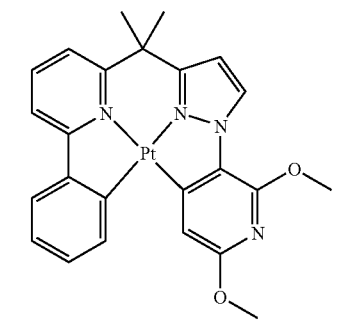
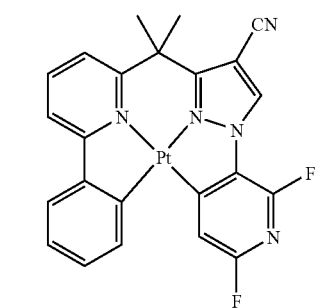
86
-continued
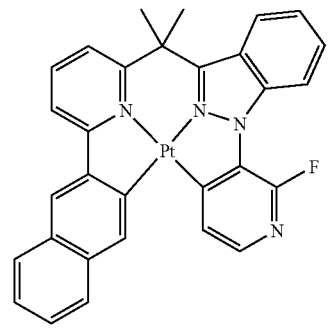
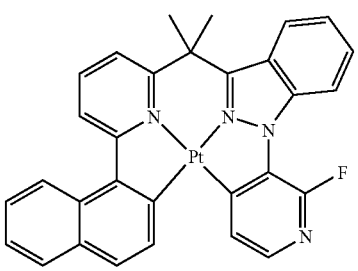
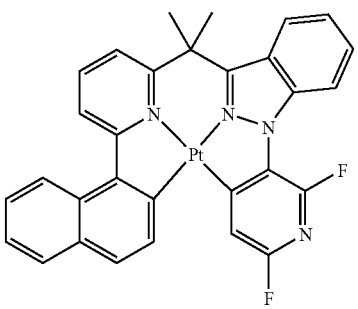
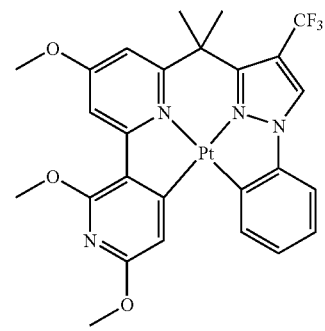
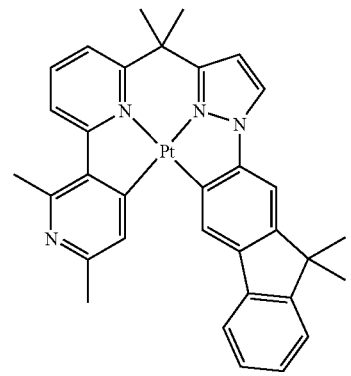

87
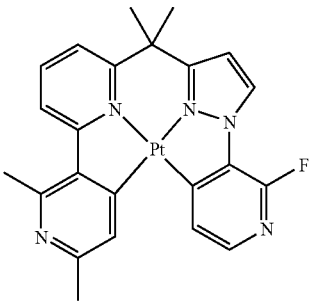
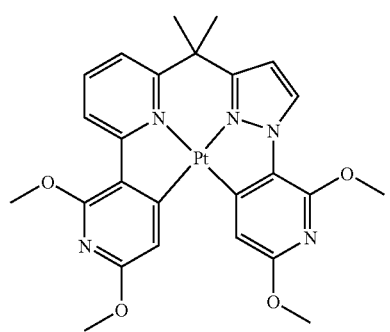
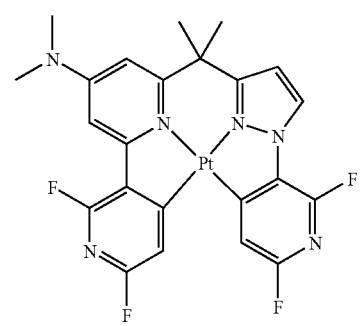
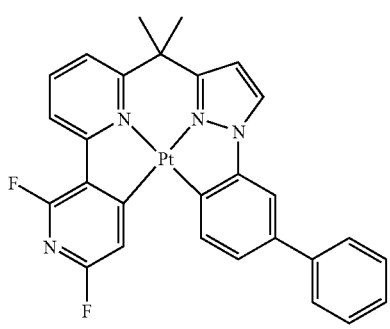
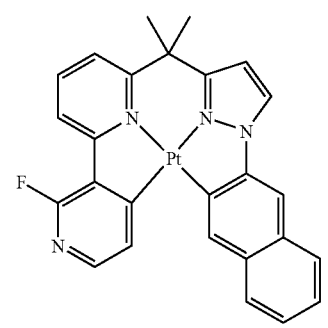
88
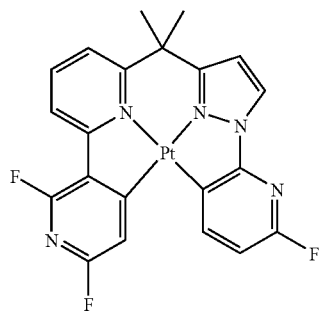
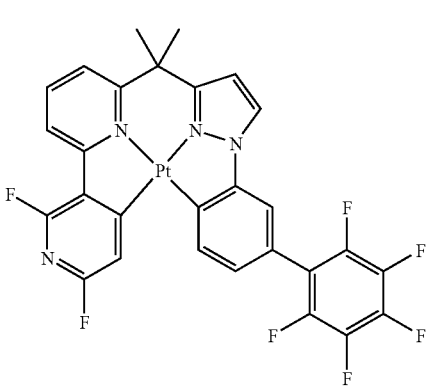
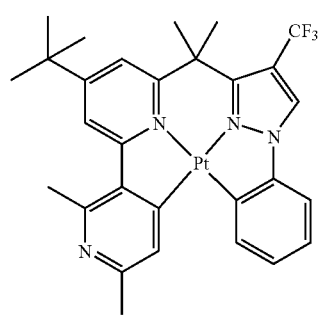
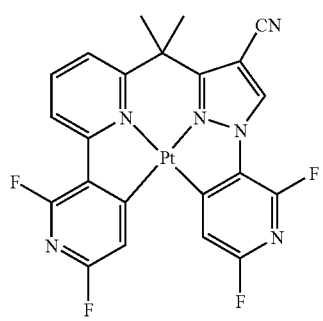
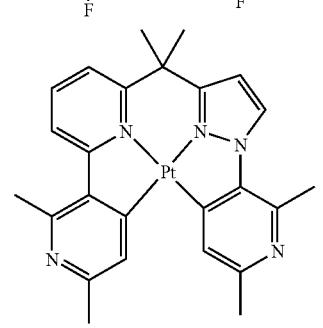

89
-continued
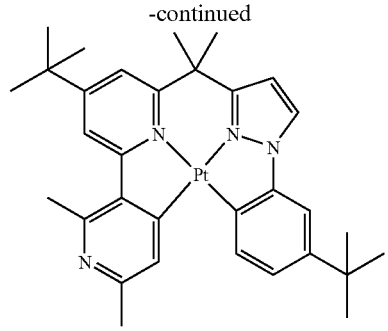
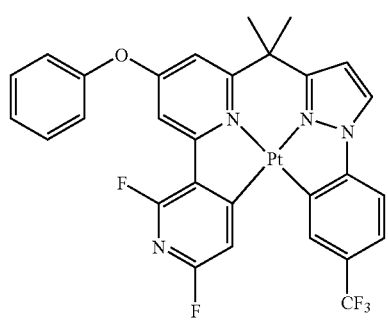
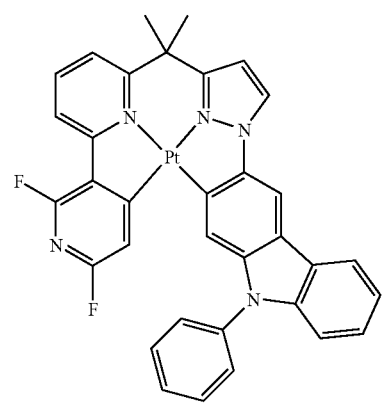
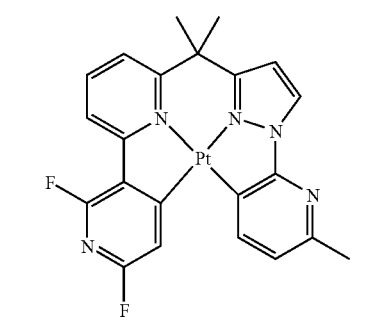
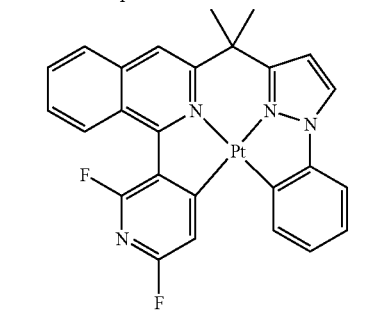
90
-continued
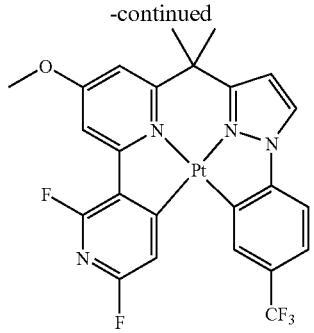
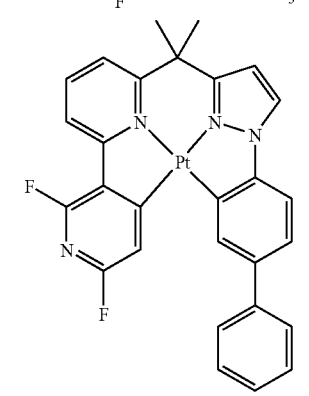
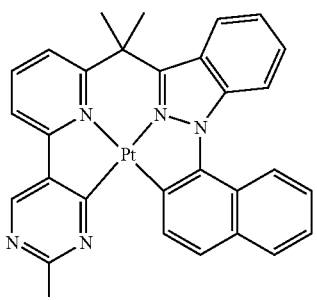
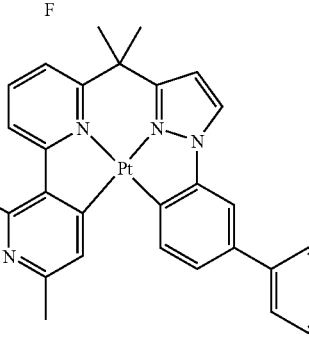
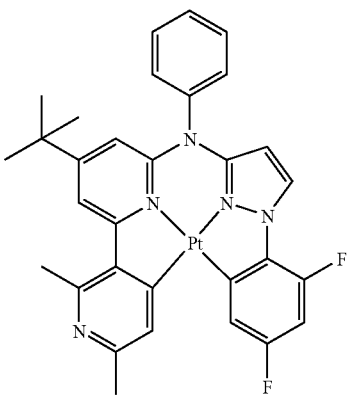

-continued
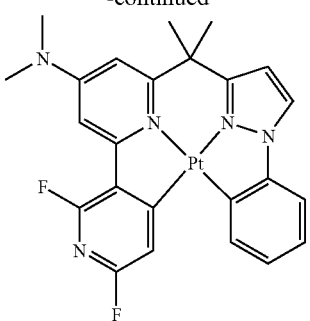
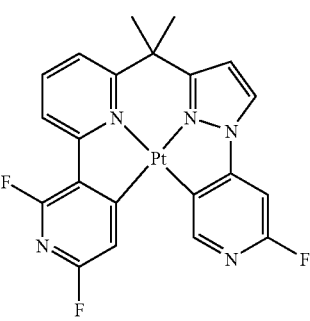
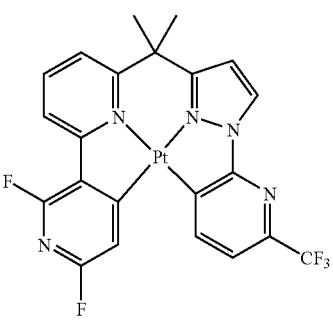
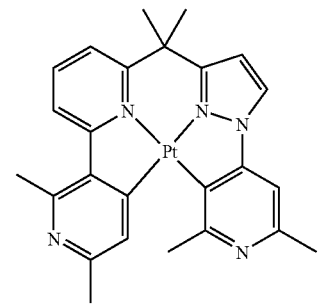
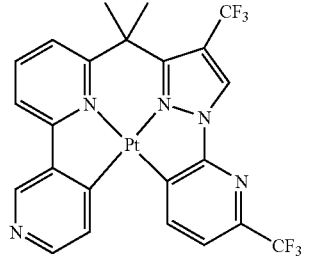
-continued
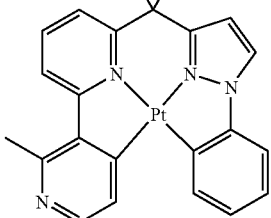
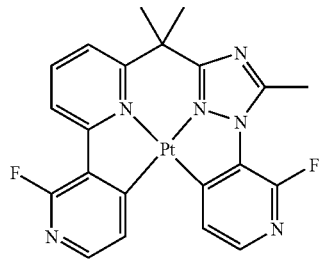
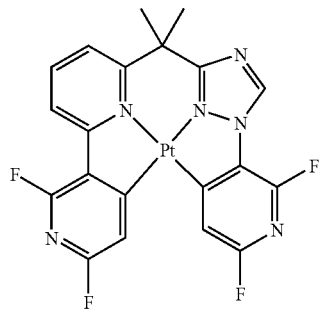
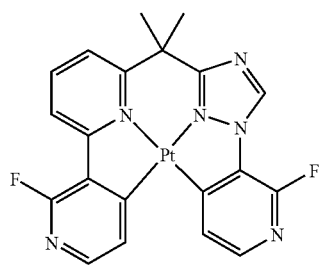
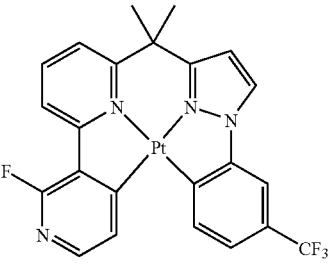
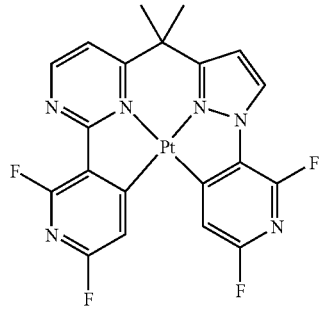

| 93 | 94 |
|---|---|
| -continued | -continued |
| 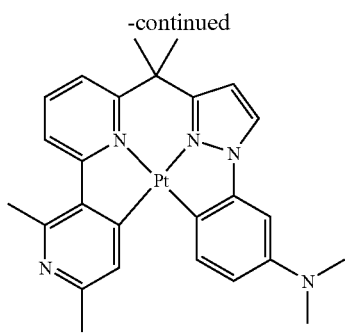 | 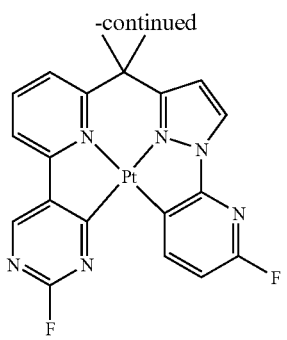 |
| 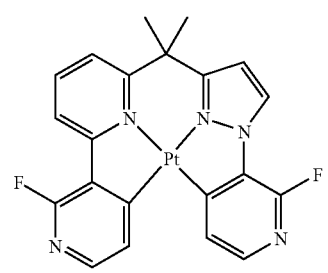 | 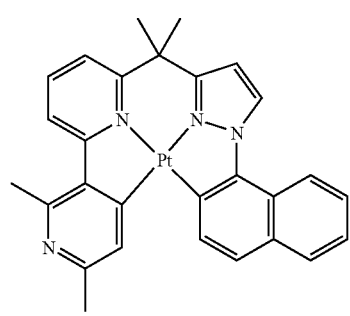 |
| 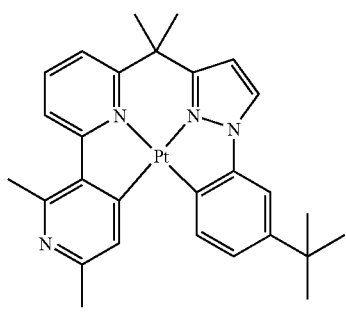 | 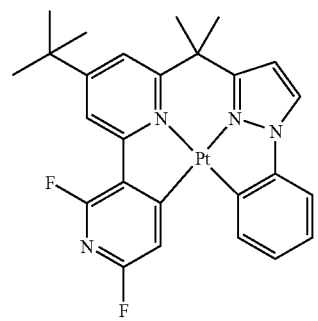 |
| 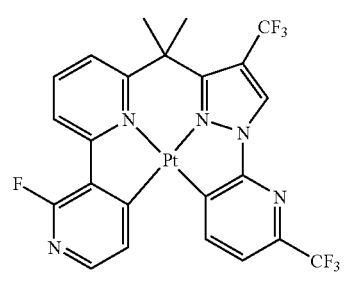 | 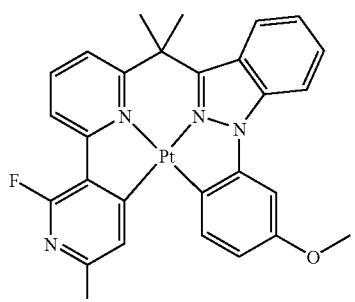 |
| 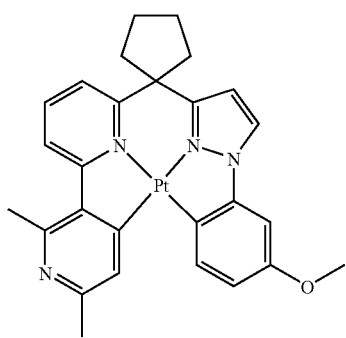 | 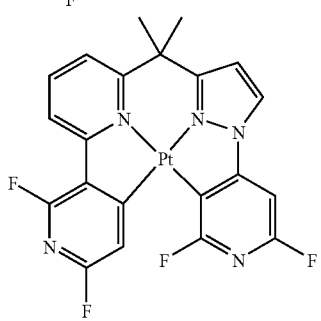 |

-continued
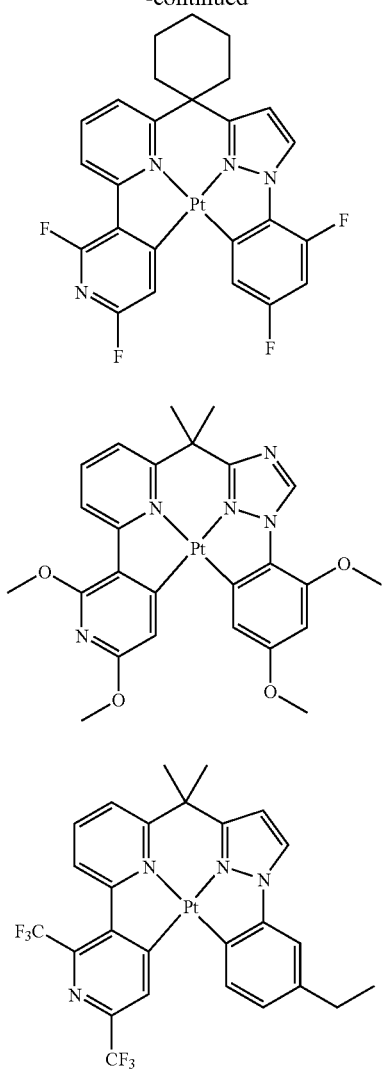
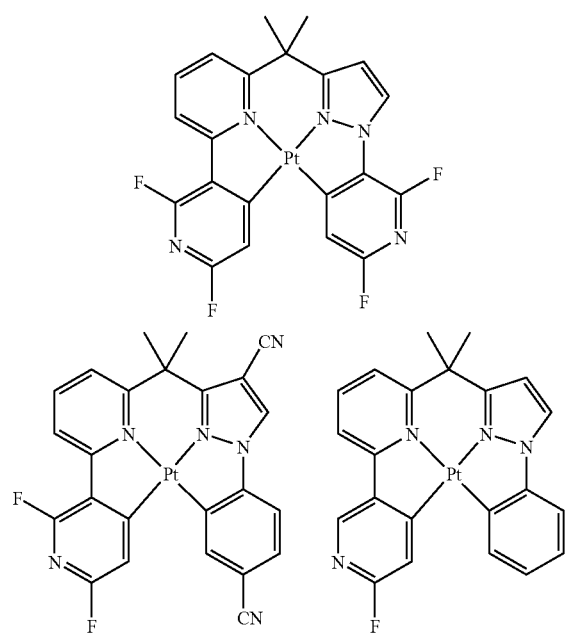
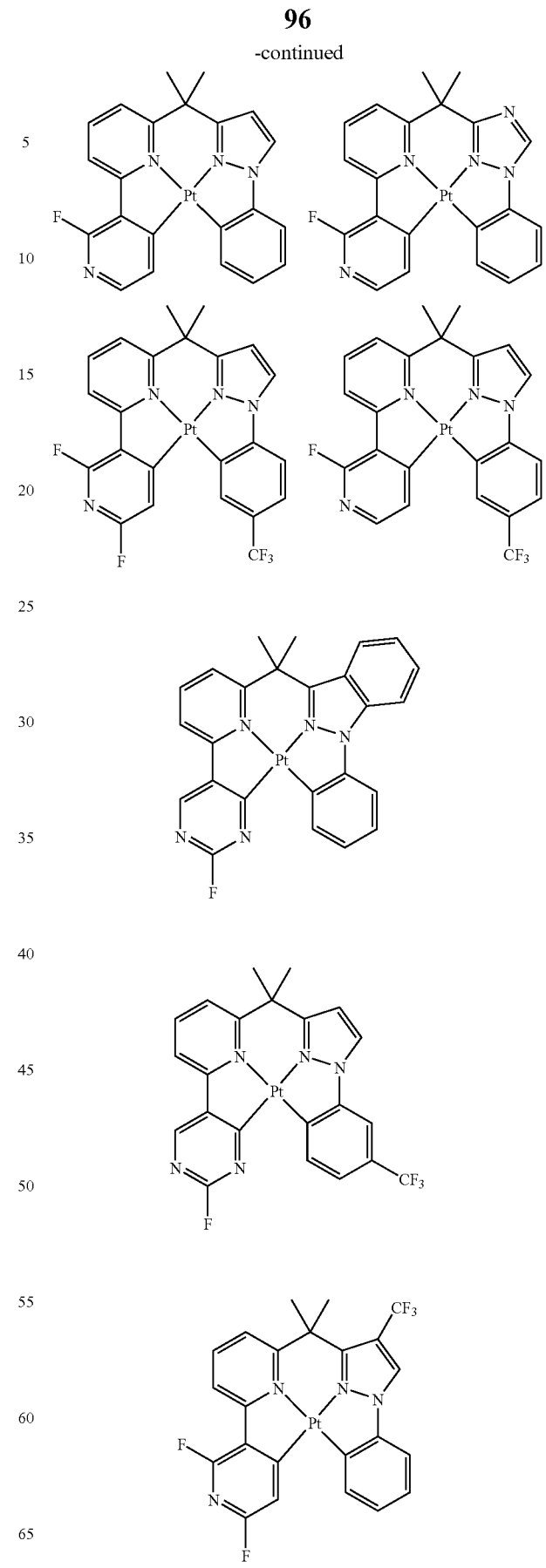

97
-continued
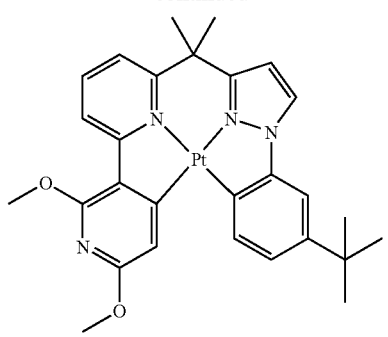
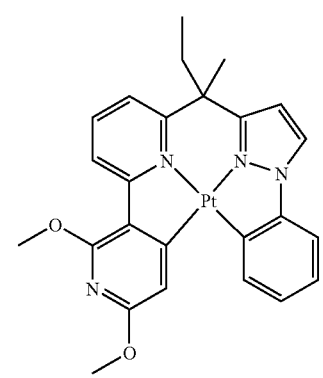
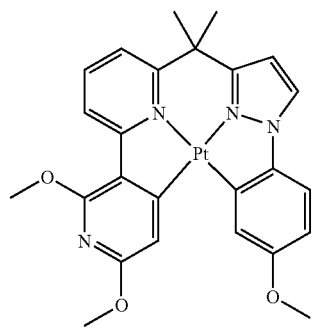
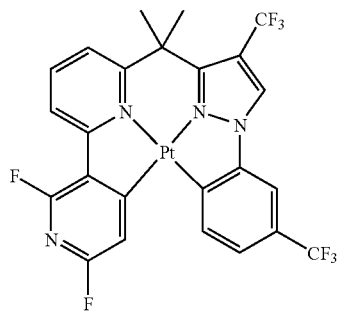
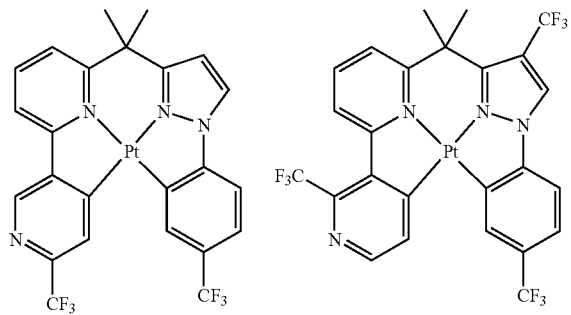
98
-continued
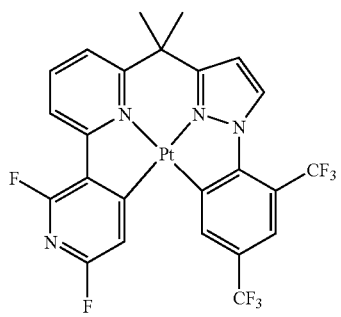
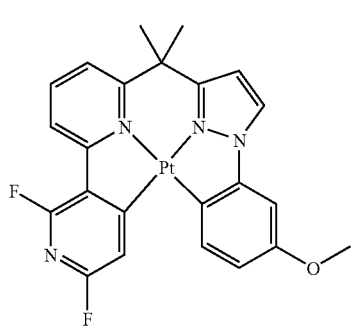
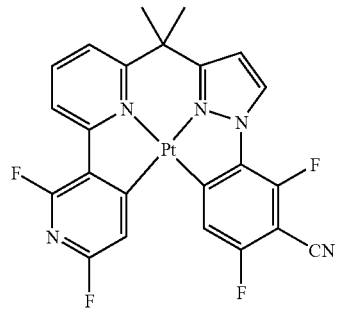
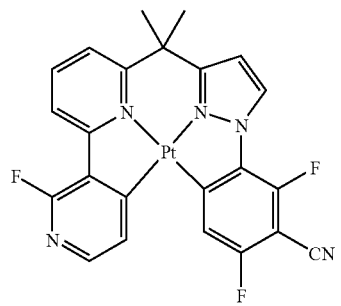
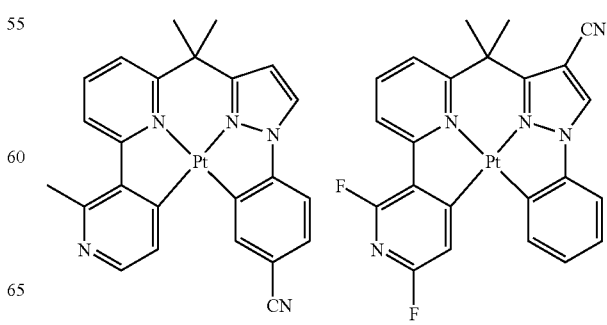

99
-continued
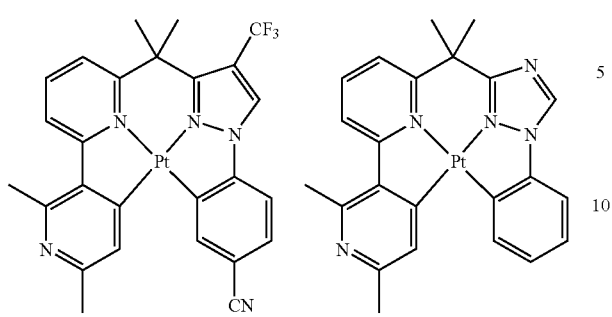
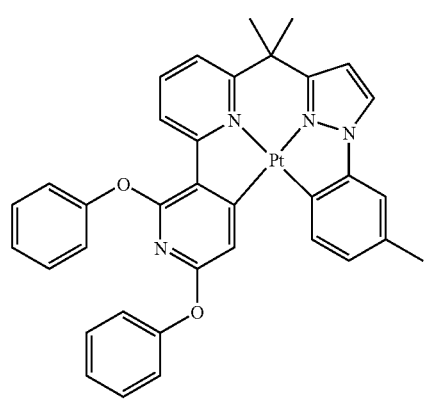
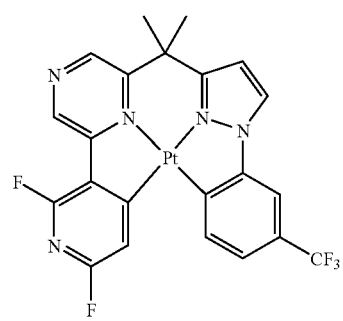
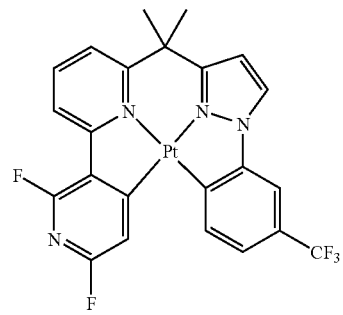
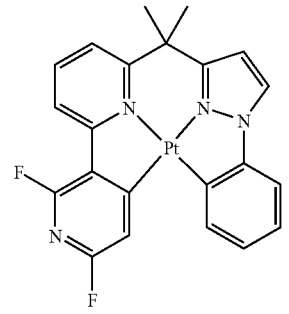
100
-continued
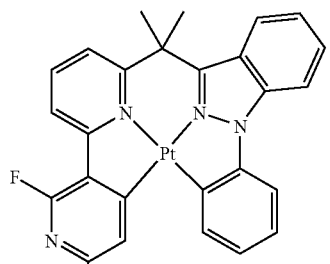
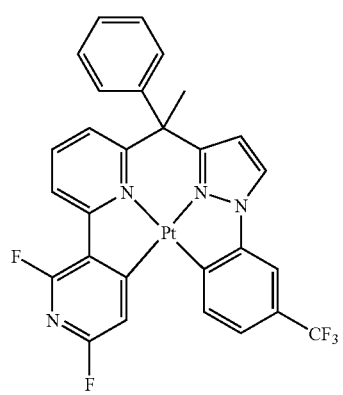
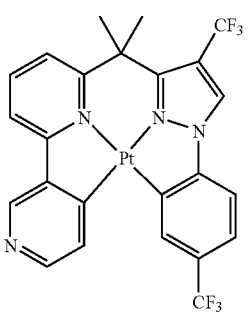
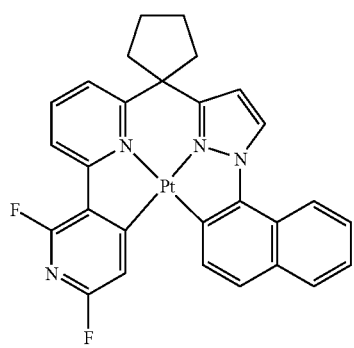
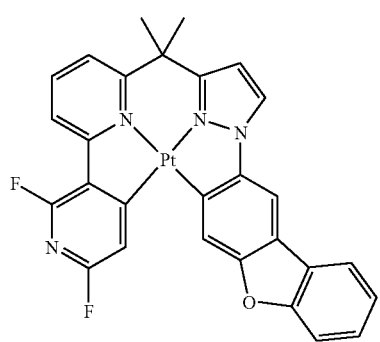

101
-continued
102
-continued
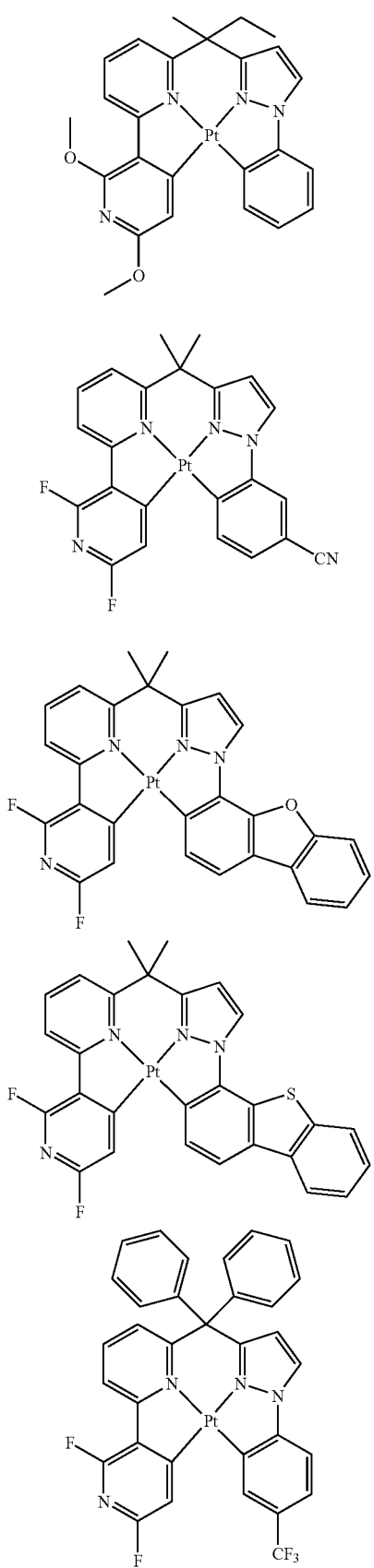
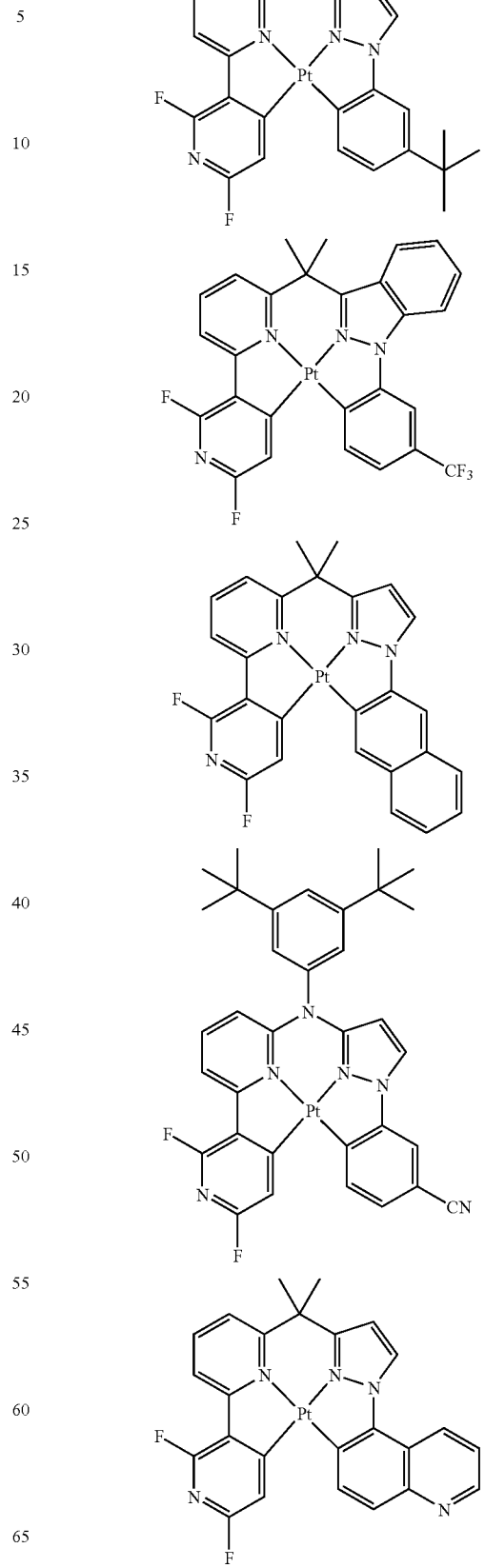

-continued

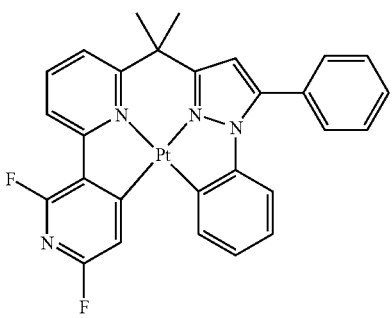

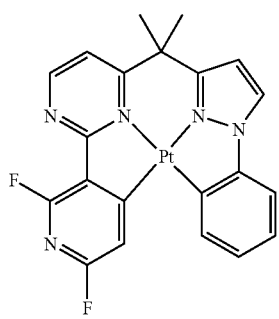

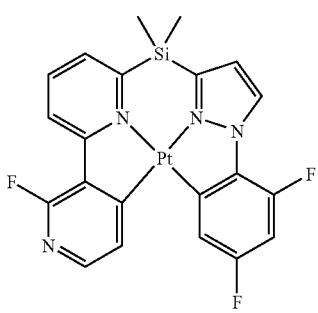

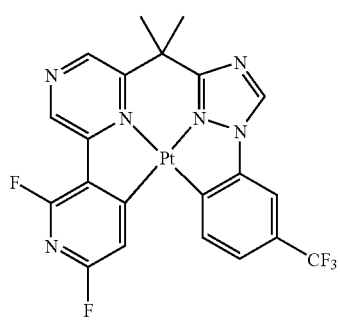

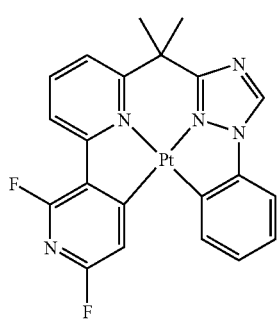

-continued

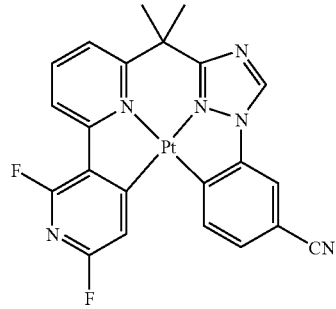

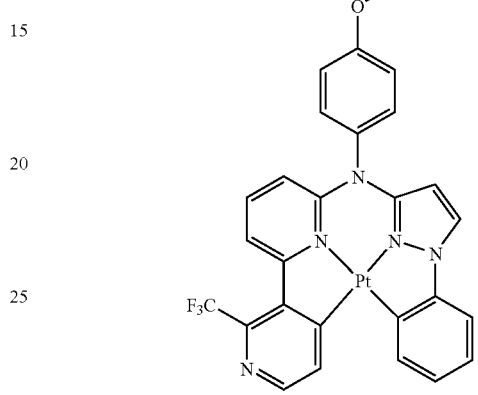

The compounds represented by the formulae (I) to (VII) according to the invention can be synthesized by various known synthesis methods. For example, the compounds represented by the formulae (I) to (VII) can be synthesized by employing methods described in Japanese Patent Applications Nos. 2007-96255 and 2007-19462.

For the purification of the synthesized compound, known measures, for example, a method described in *Separation and Purification Handbook* (edited by The Chemical Society of Japan, 1963); a method described in *High-Degree Separation of Minor Components and Hardly Purifiable Materials by Chemical Conversion Process* (published by IPC Ltd., 1988); and a method described in *The Fourth Series of Experimental Chemistry* (edited by The Chemical Society of Japan, 1990) can be utilized. Specific examples thereof include extraction, adsorption, intercalation, recrystallization, reprecipitation, distillation, sublimation, ion exchange, filtration, a zone melting process, electrophoresis, centrifugation, sedimentation, washing and chromatography of every sort.

The device of the invention is hereunder described in more detail.

The device of the invention has at least one organic layer including a light emitting layer between a pair of electrodes. When the organic layer is a single layer, a light emitting layer is provided as the organic layer. In view of the properties of the device, it is preferable that at least one electrode of the anode and the cathode is transparent or translucent.

The device of the invention is characterized in that the organic layer contains a complex having a tetradentate ligand with a specified structure. Though the organic layer is not particularly limited, the organic layers may include, in addition to the light emitting layer, a hole injection layer, a hole transport layer, an electron injection layer, an electron transport layer, a hole blocking layer, an electron blocking layer, an exciton blocking layer, a protective layer, etc. Also, each of these layers may work as other function.

In the invention, as to an embodiment of lamination of the organic layers, an embodiment in which the hole transport layer, the light emitting layer and the electron transport layer are laminated from the anode side is preferable. Furthermore, a charge blocking layer or the like may be provided between the hole transport layer and the light emitting layer, or between the light emitting layer and the electron transport layer. The hole injection layer may be provided between the anode and the hole transport layer; and the electron injection layer may be provided between the cathode and the electron transport layer. Each of the layers may be divided into plural secondary layers.

Each of the elements configuring the device of the invention is described in detail.

<Organic Layer>

The organic layer in the invention is described. The device of the invention has at least one organic layer including the light emitting layer. As described previously, examples of other organic layers than the organic light emitting layer include respective layers such as a hole transport layer, an electron transport layer, a hole blocking layer, an electron blocking layer, a hole injection layer and an electron injection layer.

—Formation of Organic Layer—

In the organic electroluminescence device of the invention, each of the layers configuring the organic layer can be suitably formed by any of dry fabrication processes such as vapor deposition and sputtering, a transfer process, a printing process, etc.

—Light Emitting Layer—

The light emitting layer is a layer having functions such that at the time of applying an electric field, it receives a hole from the anode, the hole injection layer or the hole transport layer, receives an electron from the cathode, the electron injection layer or the electron transport layer and provides a site of recombination of the hole and the electron, thereby emitting light.

In the invention, the light emitting layer may be configured of only a light emitting material or may be configured as a mixed layer of a host material and a light emitting material. The light emitting material may be a fluorescent material or a phosphorescent material. The light emitting material may be made of a single kind or two or more kinds. It is preferable that the host material is a charge transport material. The host material may be made of a single kind or two or more kinds. Examples thereof include a configuration in which an electron transporting host material and a hole transporting host material are mixed. Furthermore, the light emitting layer may contain a material which does not have charge transporting properties and which does not emit light. The light emitting layer is preferably one using the complex of the invention as the light emitting layer and the host material.

Also, the light emitting layer may be made of a single layer or two or more layers. The respective layers may emit light in a different luminescent color from each other.

Examples of the fluorescent material which can be used in the invention include compounds, for example, benzoxazole derivatives, benzimidazole derivatives, benzothiazole derivatives, styrylbenzene derivatives, polyphenyl derivatives, diphenylbutadiene derivatives, tetraphenylbutadiene derivatives, naphthalimide derivatives, coumarin derivatives, condensed aromatic compounds, perinone derivatives, oxadiazole derivatives, oxazine derivatives, aldazine derivatives, pyralizine derivatives, cyclopentadiene derivatives, bisstyrylanthracene derivatives, quinacridone deerivatives, pyrolopyridine derivatives, thiadiazolopyridine derivatives, cyclopentadiene derivatives, styrylamine derivatives, diketopyrrolopyrrole derivatives, aromatic dimethylidine compounds, various complexes represented by complexes of 8-quinolinol derivatives and complexes of pyrromethene derivatives, polymer compounds such as polythiophene, polyphenylene and polyphenylene vinylene, organic silane derivatives, etc.

Examples of the phosphorescent material which can be used in the invention include, in addition to the compound of the invention, phosphorescent compounds disclosed in patent documents, for example, U.S. Pat. Nos. 6,303,238 and 6,097,147, WO 00/57676, WO 00/70655, WO 01/08230, WO 01/39234, WO 01/41512, WO 02/02714, WO 02/15645, WO 02/44189, WO 05/19373, JP-A-2001-247859, JP-A-2002-302671, JP-A-2002-117978, JP-A-2003-133074, JP-A-2002-235076, JP-A-2003-123982, JP-A-2002-170684, EP-A-1211257, JP-A-2002-226495, JP-A-2002-234894, JP-A-2001-247859, JP-A-2001-298470, JP-A-2002-173674, JP-A-2002-203678, JP-A-2002-203679, JP-A-2004-357791, JP-A-2006-256999, JP-A-2007-19462, JP-A-2007-84635, JP-A-2007-96259, etc. Above all, more preferred examples of the light emitting material include Ir complexes, Pt complexes, Cu complexes, Re complexes, W complexes, Rh complexes, Ru complexes, Pd complexes, Os complexes, Eu complexes, Tb complexes, Gd complexes, Dy complexes and Ce complexes. In particular, Ir complexes, Pt complexes and Re complexes are preferable; and Ir complexes, Pt complexes and Re complexes containing at least one coordination mode of a metal-carbon bond, a metal-nitrogen bond, a metal-oxygen bond and a metal-sulfur bond are more preferable. Furthermore, from the viewpoints of luminous efficiency, driving durability, chromaticity, etc., Ir complexes, Pt complexes and Re complexes containing a tridentate or multidentate ligand are especially preferable.

When the organic layer is composed of plural layers, the compound represented by the formula (I) of the invention can be contained in any of the layers. The complex of the invention is contained preferably in the light emitting layer, more preferably as the light emitting material or host material in the light emitting layer, further preferably as the light emitting material in the light emitting layer, and especially preferably together with at least one host material in the light emitting layer.

The content of the phosphorescent material which can be used (the complex of the invention and/or the phosphorescent material to be jointly used) is preferably in the range of 0.1% by mass or more and not more than 60% by mass, more preferably in the range of 0.2% by mass or more and not more than 50% by mass, further preferably in the range of 0.3% by mass or more and not more than 40% by mass, and most preferably in the range of 0.5% by mass or more and not more than 30% by mass relative to the total mass of the light emitting layer. (In this specification, mass ratio is equal to weight ratio.)

When other phosphorescent material is used jointly with the compound represented by the formula (I) of the invention, the content of the compound represented by the formula (I) of the invention is preferably in the range of 0.1% by mass or more and not more than 60% by mass, more preferably in the range of 0.2% by mass or more and not more than 50% by mass, further preferably in the range of 0.3% by mass or more and not more than 40% by mass, and most preferably in the range of 0.5% by mass or more and not more than 35% by mass relative to the mass of the whole of the phosphorescent materials.

When the compound represented by the formula (I) of the invention is introduced into other layer than the light emitting layer (for example, an electron transport layer, etc.), it is contained in an amount of preferably from 10% by mass to 100% by mass, and more preferably from 30% by mass to 100% by mass in the subject layer.

In the organic electroluminescence device of the invention, it is preferable that a material having at least one deuterium atom is further contained in any one of the organic layers. When each of the compounds represented by the formulae (I) to (VII) of the invention is used jointly with the material having at least one deuterium atom, the durability is more enhanced.

The material having at least one deuterium atom as referred to herein may be either one or both of an organic material and an inorganic material and is preferably an organic material.

It is meant by the terms "organic material having at least one deuterium atom" that a deuterium atom and a hydrogen atom are contained in a ratio ((the atomic number of deuterium atom)/(the atomic number of hydrogen atom)) in the range of from 100/0 to 1/99 at a position at which the hydrogen atom or deuterium atom can be bound in the organic material. Here, the position at which the hydrogen atom or deuterium atom can be bound may be any position in the range of from at least one specified place to the whole within one molecule. In other words, the foregoing ratio is synonymous with the fact that a proportion occupied by the deuterium atom (deuteration ratio) is from 1 to 100% in the total sum of positions at which the hydrogen atom or deuterium atom can be bound.

Accordingly, the state of the foregoing ratio can be realized by simultaneously using a compound containing deuterium at the subject position and a compound not containing deuterium at the subject position in an appropriate ratio.

As to the composition of the deuterium atom relative to the hydrogen atom, its ratio is preferably in the range of from 100/0 to 5/95, more preferably in the range of from 100/0 to 50/50, and especially preferably in the range of from 100/0 to 80/20.

Though the material having at least one deuterium atom may be contained in any of the layers of the organic electroluminescence device, it is preferably contained in any one or a plurality of a hole injection layer, a hole transport layer, a light emitting layer, an electron transport layer, an electron injection layer, an exciton blocking layer and a charge blocking layer; more preferably contained in any one or a plurality of a light emitting layer, an exciton blocking layer and a charge blocking layer; further preferably contained in a light emitting layer; and especially preferably contained as a host material in a light emitting layer.

Examples of the material having at least one deuterium atom include compounds disclosed in WO 02/47440, but it should not be construed that the invention is limited thereto.

In particular, preferred examples of the material having at least one deuterium atom include materials containing a nitrogen atom. Of these, materials having a tertiary amine structure, a carbazole structure or an indole structure are preferable; materials having a carbazole structure or an indole structure are more preferable; and materials having a carbazole structure are especially preferable.

Examples of the material having a carbazole structure or an indole structure each having at least one deuterium atom are those described below.

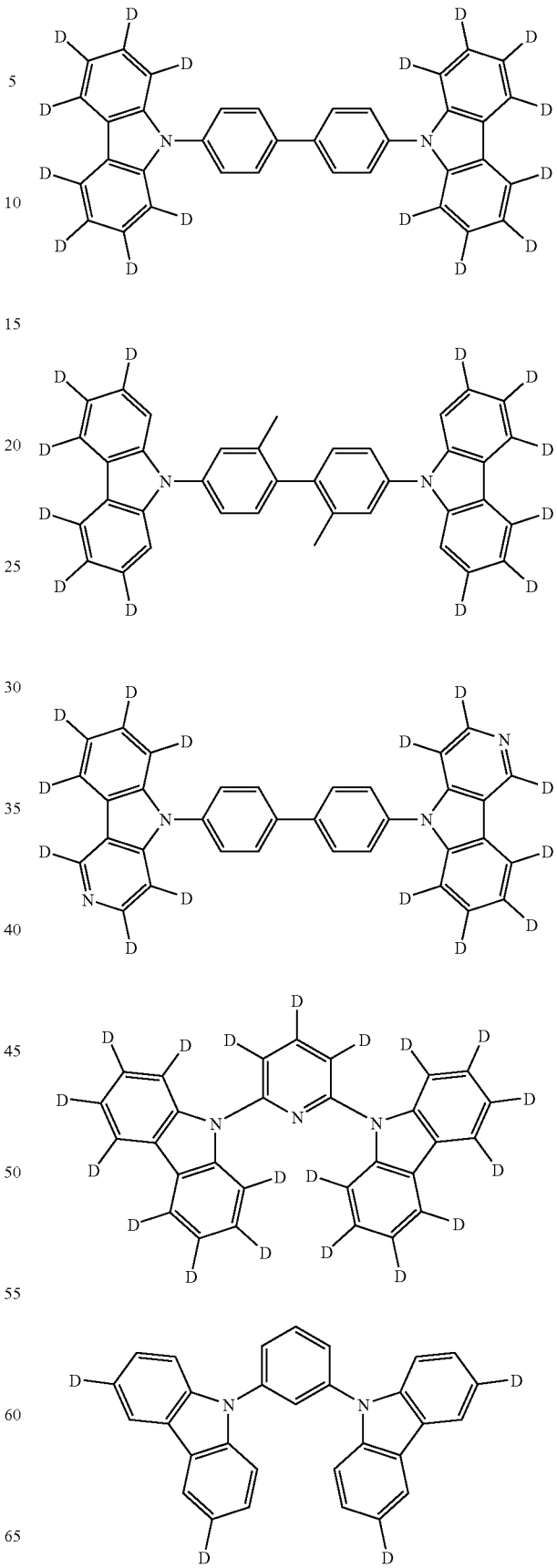

109
-continued
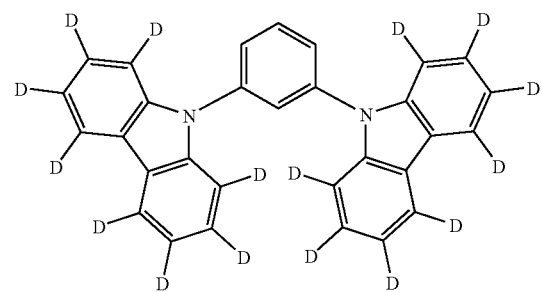
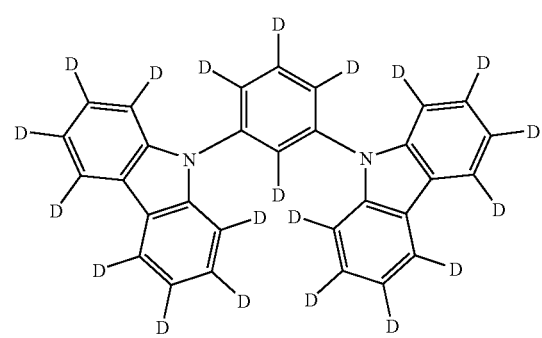
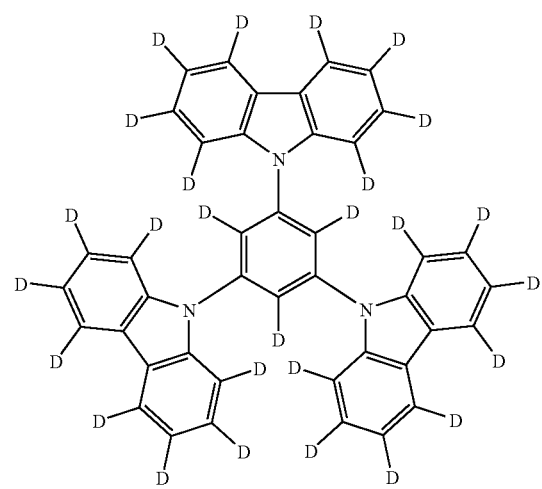
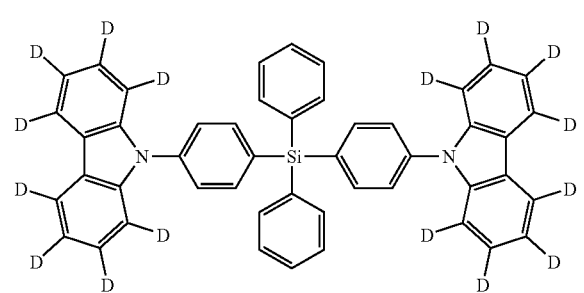
110
-continued
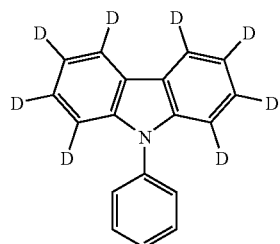
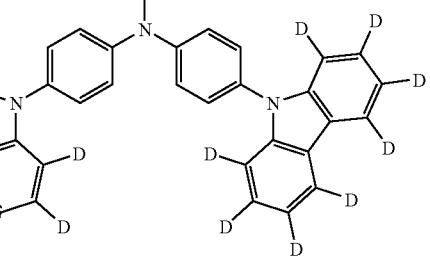
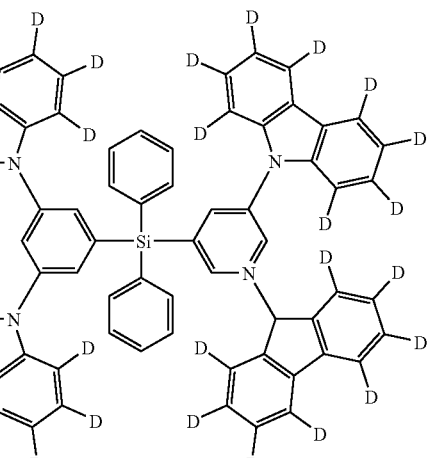
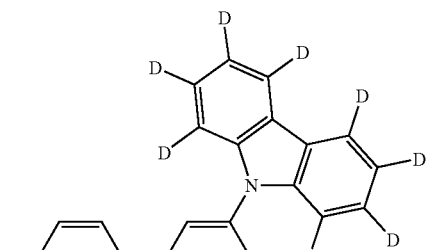
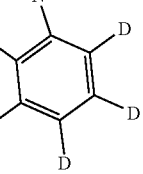

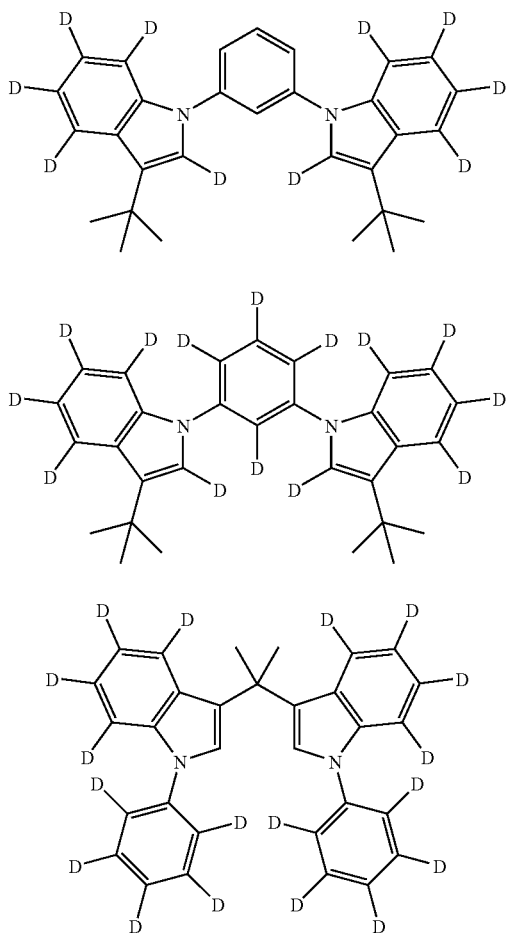

Also, as the host material which is contained in the light emitting layer in the invention, in addition to the foregoing materials, materials which do not have a deuterium atom can be used. Examples thereof include not only materials having a carbazole structure, materials having a diarylamine structure, materials having a pyridine structure, materials having a pyrazine structure, materials having a triazine structure and materials having an arylsilane structure but also materials exemplified in the sections of hole injection layer, hole transport layer, electron injection layer and electron transport layer as described later.

The host material as referred to herein is a compound which chiefly bears the injection or transport of charges in the light emitting layer and is also a compound which does not substantially emit light in itself. In this specification, it is meant by the terms "which does not substantially emit light" that the amount of light emission from the compound which does not substantially emit light is preferably not more than 5%, more preferably not more than 3%, and further preferably not more than 1% of the total amount of light emission in the whole of the device.

Though the concentration of the host material in the light emitting layer is not particularly limited, it is preferable that the host material is a major component (component whose content is the highest) in the light emitting layer. The concentration of the host material is more preferably 50% by mass or more and not more than 99.9% by mass, further preferably 70% by mass or more and not more than 99.8% by mass, especially preferably 80% by mass or more and not more than 99.7% by mass, and most preferably 90% by mass or more and not more.than 99.5% by mass.

A glass transition temperature of the host material is preferably 100° C. or higher and not higher than 500° C., more preferably 110° C. or higher and not higher than 300° C., and further preferably 120° C. or higher and not higher than 250° C.

A fluorescence wavelength of the host material in a film state, which is contained in the light emitting layer of the invention, is preferably in the range of 400 nm or more and not more than 650 nm, more preferably in the range of 420 nm or more and not more than 600 nm, and further preferably in the range of 440 nm or more and not more than 550 nm.

As the host material which is used in the invention, compounds disclosed in paragraphs [0113] to [0161] of JP-A-2002-100476 and compounds disclosed in paragraphs [0087] to [0098] of JP-A-2004-214179 can be suitably used, but it should not be construed that the invention is limited to these compounds.

The thickness of the light emitting layer is not particularly limited. In general, the thickness of the light emitting layer is preferably from 1 nm to 500 nm, more preferably from 5 nm to 200 nm, and further preferably from 10 nm to 100 nm.

In the organic electroluminescence device, it is preferable that a compound represented by the following formula (a) is contained in the light emitting layer.

In general, in the injection of charges (electron/hole) at the interface between organic thin films of a laminated organic electronic device, it is known that when a difference in ionization potential (Ip) or electron affinity (Ea) between the adjacent two materials is small, the injection barrier of charges is small so that the driving voltage of the organic electroluminescence device can be reduced. In addition to Ip and Ea of the material, an energy level derived from an interaction between molecules of the material or the like plays an important role. Also, as to the charge transfer within the organic layer, by adequately controlling an interaction between molecules of the material, the degree of charge transfer can be increased, and the driving voltage of the device can be decreased. By adequately using the compound represented by the formula (a) together with the light emitting material, there is a possibility for controlling the interaction between molecules of the material. As a result, it becomes possible to decrease the driving voltage.

Also, a change in the interaction state between molecules of the material at the time of driving the device (for example, an association state) brings about a change in characteristics of the device. As a result, there is a possibility that a lowering of brightness of the device (namely, life of the device) is caused. However, by using the compound represented by the formula (a), this problem can be avoided by previously forming a stable interaction state. The compound represented by the formula (a), which is used in the organic electroluminescence device of the invention, is excellent in chemical stability, is small in a change in properties, such as decomposition of the material during driving of the device and is able to prevent a lowering of efficiency of the organic electroluminescence device or a lowering of life of the device.

Next, the compound represented by the formula (a), which is used in the organic electroluminescence device of the invention, is described in detail.

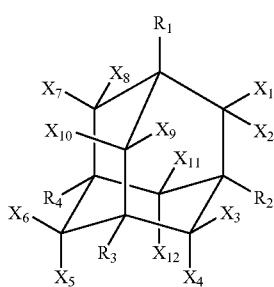

(a)

In the formula (a), each of $R_1$ to $R_4$ independently represents a hydrogen atom, an alkyl group, an alkenyl group, an alkynyl group, an aryl group, a heteroaryl group, an alkoxy group, an acyl group, an acyloxy group, an amino group, a nitro group, a cyano group, an ester group, an amide group, a halogen group, a perfluoroalkyl group or a silyl group; at least one of $R_1$ to $R_4$ is a group having a double bond or a triple bond; and each of $X_1$ to $X_{12}$ independently represents a hydrogen atom, an alkyl group, an alkenyl group, an alkynyl group, an aryl group, a heteroaryl group, an alkoxy group, an acyl group, an acyloxy group, an amino group, a nitro group, a cyano group, an ester group, an amide group, a halogen group, a perfluoroalkyl group or a silyl group.

Examples of the alkyl group represented by $R_1$ to $R_4$ and $X_1$ to $X_{12}$ include methyl, ethyl, n-propyl, isopropyl, n-butyl, sec-butyl (namely, 2-butyl), isobutyl, tert-butyl, n-propyl, isopentyl, n-hexyl, cyclopropyl, cyclobutyl, cyclopentyl and cyclohexyl.

Examples of the alkenyl group represented by $R_1$ to $R_4$ and $X_1$ to $X_{12}$ include vinyl, allyl (namely, 1-(2-propenyl)), 1-(1-propenyl), 2-propenyl, 1-(1-butenyl), 1-(2-butenyl), 1-(3-butenyl), 1-(1,3-butadienyl), 2-(2-butenyl), 1-(1-pentenyl), 5-(cyclopentadienyl) and 1-(1-cyclohexenyl).

Examples of the alkynyl group represented by $R_1$ to $R_4$ and $X_1$ to $X_{12}$ include ethynyl, propargyl (namely, 1-(2-propynyl)), 1-(1-propynyl), 1-butadienyl and 1-(1,3-pentadienyl).

Examples of the aryl group represented by $R_1$ to $R_4$ and $X_1$ to $X_{12}$ include phenyl, o-tolyl (namely, 1-(2-methylphenyl)), m-tolyl, p-tolyl, 1-(2,3-dimethylphenyl), 1-(3,4-dimethylphenyl), 2-(1,3-dimethylphenyl), 1-(3,5-dimethylphenyl), 1-(2,5-dimethylphenyl), p-cumene, mesityl, 1-naphthyl, 2-naphthyl, 1-anthranyl, 2-anthranyl, 9-anthranyl; biphenylyls, for example, 4-biphenylyl (namely, 1-(4-phenyl)phenyl), 3-biphenylyl, 2-biphenylyl, etc.; and terphenylyls, for example, 4-p-terphenylyl (namely, 1-(4-biphenylyl)phenyl), 4-m-terphenylyl (namely, 1-4-(3-biphenylyl)phenyl), etc.

As to the heteroaryl group represented by $R_1$ to $R_4$ and $X_1$ to $X_{12}$, examples of the hetero atom to be contained include a nitrogen atom, an oxygen atom and a sulfur atom. Specific examples thereof include imidazolyl, pyrazolyl, pyridyl, pyrazyl, pyrimidyl, triazinyl, quinolyl, isoquinolyl, pyrrolyl, indolyl, furyl, thienyl, benzoxazolyl, benzimidazolyl, benzthiazolyl, carbazolyl and azepinyl.

Examples of the alkoxy group represented by $R_1$ to $R_4$ and $X_1$ to $X_{12}$ include methoxy, ethoxy, isopropoxy, cyclopropoxy, n-butoxy, tert-butoxy, cyclohexyloxy and phenoxy.

Examples of the acyl group represented by $R_1$ to $R_4$ and $X_1$ to $X_{12}$ include acetyl, benzoyl, formyl and pivaloyl.

Examples of the acyloxy group represented by $R_1$ to $R_4$ and $X_1$ to $X_{12}$ include acetoxy and benzoyloxy.

Examples of the amino group represented by $R_1$ to $R_4$ and $X_1$ to $X_{12}$ include amino, methylamino, dimethylamino, diethylamino, dibenzylamino, diphenylamino, ditolylamino, pyrrolidino, piperidino and morpholino.

Examples of the ester group represented by $R_1$ to $R_4$ and $X_1$ to $X_{12}$ include methyl ester (namely, methoxycarbonyl), ethyl ester, isopropyl ester, phenyl ester and benzyl ester.

Examples of the amide group represented by $R_1$ to $R_4$ and $X_1$ to $X_{12}$ include N,N-dimethylamide (namely, dimethylaminocarbonyl), N-phenylamide and N,N-diphenylamide, each of which is connected at the carbon atom of the amide; and N-methylacetamide (namely, acetylmethylamino), N-phenylacetamide and N-phenylbenzamide, each of which is connected at the nitrogen atom of the amide.

Examples of the halogen represented by $R_1$ to $R_4$ and $X_1$ to $X_{12}$ include a fluorine atom, a chlorine atom, a bromine atom and an iodine atom.

Examples of the perfluoroalkyl group represented by $R_1$ to $R_4$ and $X_1$ to $X_{12}$ include trifluoromethyl, pentafluoroethyl, 1-perfluoropropyl, 2-perfluoropropyl and perfluoropentyl.

Examples of the silyl group represented by $R_1$ to $R_4$ and $X_1$ to $X_{12}$ include trimethylsilyl, triethylsilyl, triisopropylsilyl, triphenylsilyl, methyldiphenylsilyl, dimethylphenylsilyl, tert-butyldimethylsilyl and tert-butylsilyl.

Each of the foregoing $R_1$ to $R_4$ and $X_1$ to $X_{12}$ may be one further substituted with other substituent. Examples of a group in which an aryl group is substituted on an alkyl group include benzyl, 9-fluorenyl, 1-(2-phenylethyl) and 1-(4-phenyl)cyclohexyl; and examples of a group in which a heteroaryl group is substituted on an aryl group include 1-(4-N-carbazolyl)phenyl, 1-(3,5-di(N-carbazolyl))phenyl and 1-(4-(2-pyridyl)phenyl).

As the foregoing $R_1$ to $R_4$, a hydrogen atom, an alkyl group, an alkenyl group, an alkynyl group, an aryl group, a heteroaryl group, an alkoxy group, an amino group, an ester group and a silyl group are preferable; a hydrogen atom, an alkyl group, an aryl group, a heteroaryl group, an alkoxy group, an amino group and a silyl group are more preferable; and a hydrogen atom, an alkyl group and an aryl group are especially preferable.

As the foregoing $X_1$ to $X_{12}$, a hydrogen atom, an alkyl group, an alkenyl group, an alkynyl group, an aryl group, a heteroaryl group, an alkoxy group, an amino group, an ester group and a silyl group are preferable; a hydrogen atom, an alkyl group and an aryl group are more preferable; and a hydrogen atom is especially preferable.

As the alkyl group represented by $R_1$ to $R_4$ and $X_1$ to $X_{12}$, methyl, ethyl, n-propyl, isopropyl, n-butyl, isobutyl, tert-butyl, n-pentyl, n-hexyl, cyclopentyl and cyclohexyl are preferable; methyl, ethyl, tert-butyl, n-hexyl and cyclohexyl are more preferable; and methyl and ethyl are especially preferable.

As the aryl group represented by $R_1$ to $R_4$ and $X_1$ to $X_{12}$, phenyl, o-tolyl, 1-(3,4-dimethylphenyl), 1-(3,5-dimethylphenyl), 1-naphthyl, 2-naphthyl, 9-anthranyl, biphenylyls and terphenylyls are preferable; phenyl, biphenylyls and terphenylyls are more preferable; and phenyl is especially preferable.

The hydrogen atom represented by $R_1$ to $R_4$ and $X_1$ to $X_{12}$ may be a deuterium atom, and the hydrogen atom is preferably a deuterium atom.

A part or all of the hydrogen atoms contained in the compound represented by the formula (a) may be substituted with a deuterium atom.

At least one of $R_1$ to $R_4$ is a group having a double bond or a triple bond. Examples of the double bond include C=C, C=O, C=S, C=N, N=N, S=O and P=O. Of these, C=C, C=O, C=N, S=O and P=O are preferable; C=C, C=O and C═N are more preferable; and C═C is especially preferable. Examples of the triple bond include C≡C and C≡N. Of these, C≡C is preferable.

As the group having a double bond or a triple bond, an aryl group is preferable. Above all, a phenyl group, a biphenylyl group and a terphenylyl group as described below are preferable; and a phenyl group is especially preferable.

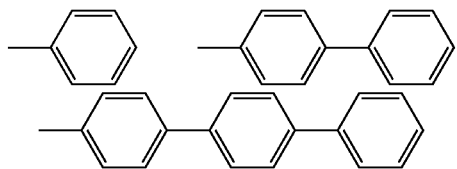

While at least one of $R_1$ to $R_4$ is a group having a double bond or a triple bond, the number of the group having a double bond or a triple bond in $R_1$ to $R_4$ is preferably from 2 to 4, more preferably from 3 to 4, and especially preferable 4.

When the number of the group having a double bond or a triple bond in $R_1$ to $R_4$ is from 1 to 3, the remaining $R_1$ to $R_4$ composed of only a single bond are preferably a hydrogen atom, an alkyl group, an alkoxy group or a silyl group, more preferably a hydrogen atom, an alkyl group or a silyl group, and especially preferably a hydrogen atom or an alkyl group.

$R_1$ to $R_4$ or $X_1$ to $X_{12}$ may be connected to each other to form a cyclic structure. For example, $X_2$, $X_3$ and $X_9$ may be connected to each other to form a diamantane structure as described below; and furthermore, $X_4$, $X_5$ and $X_{12}$ may be connected to each other to form a triamantane structure as described below. Each of these diamantane structure and triamantane structure may be further substituted with a substituent.

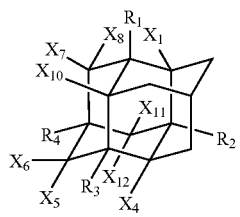

Diamantane structure

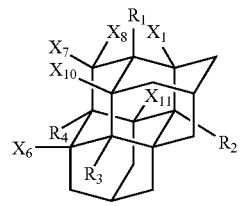

Triamantane structure

In the invention, it is preferred to use a mixture of a plurality of the compound represented by the formula (a). Preferably, a mixture of compounds which are different from each other with respect to the group having a double bond, or a mixture of compounds which are different from each other with respect to a substitution number, can be used. For example, examples of the group having a double bond include the foregoing phenyl group, biphenylyl group and terphenylyl group. Also, a mixture of compounds having a substitution number of from 1 to 4 is exemplified. For example, a mixture of a mono-substitution product in which the substitution number of the group having a double bond is 1 and a tetra-substitution product in which the substitution number of the group having a double bond is 4 can be used.

Specific examples of the compound represented by the formula (a), which is used in the invention, will be given below, but it should not be construed that the compound of the invention is limited thereto.

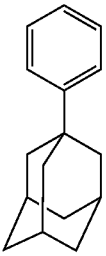

(1-1)

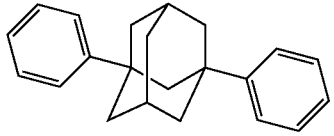

(1-2)

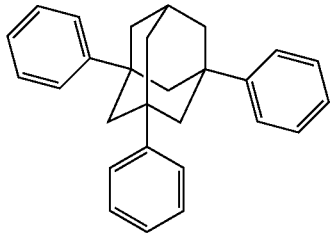

(1-3)

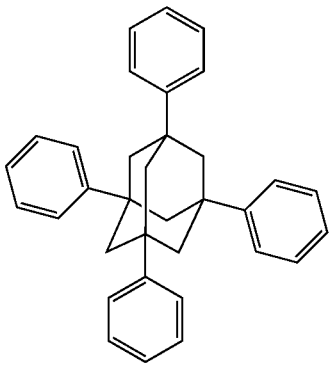

(1-4)

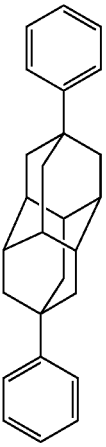

(1-5)

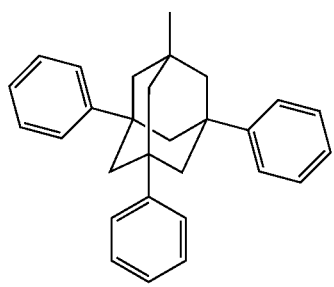
(1-6)
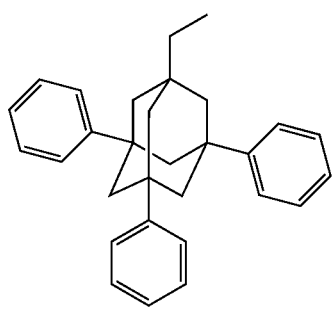
(1-7)
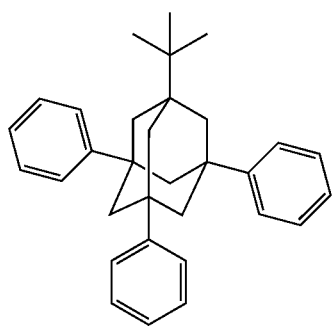
(1-8)
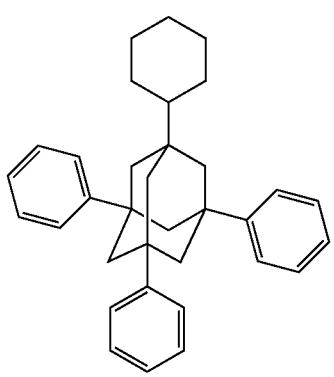
(1-9)
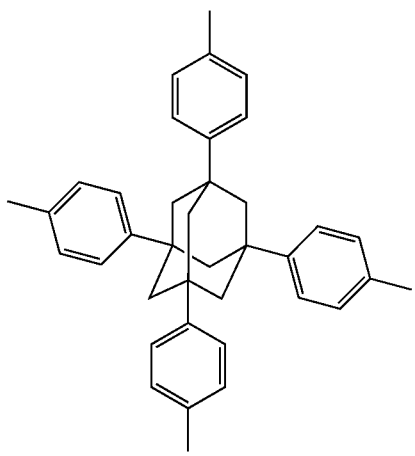
(1-10)
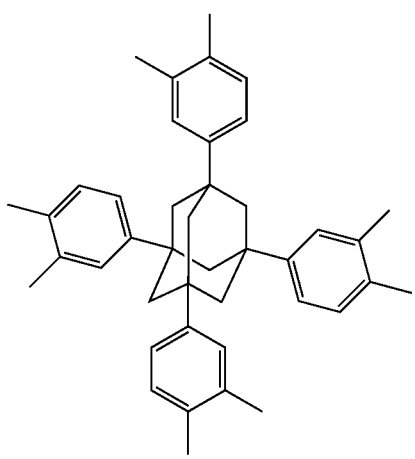
(1-11)
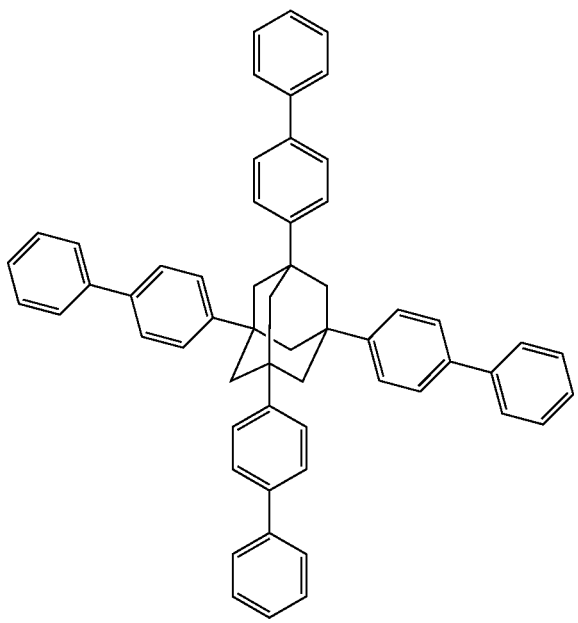
(1-12)

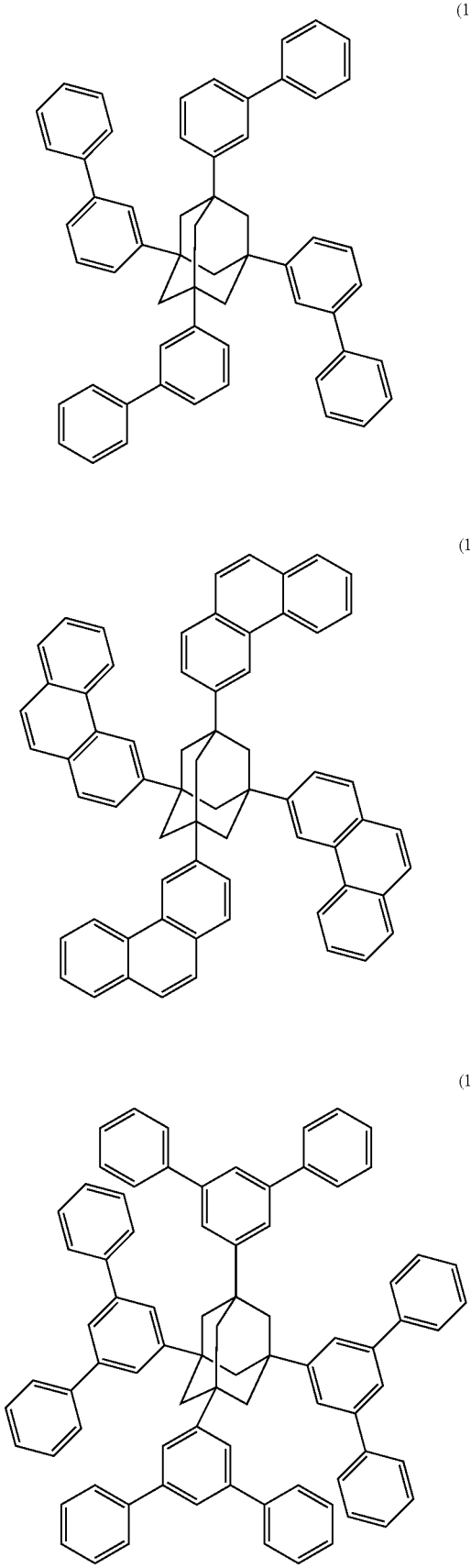
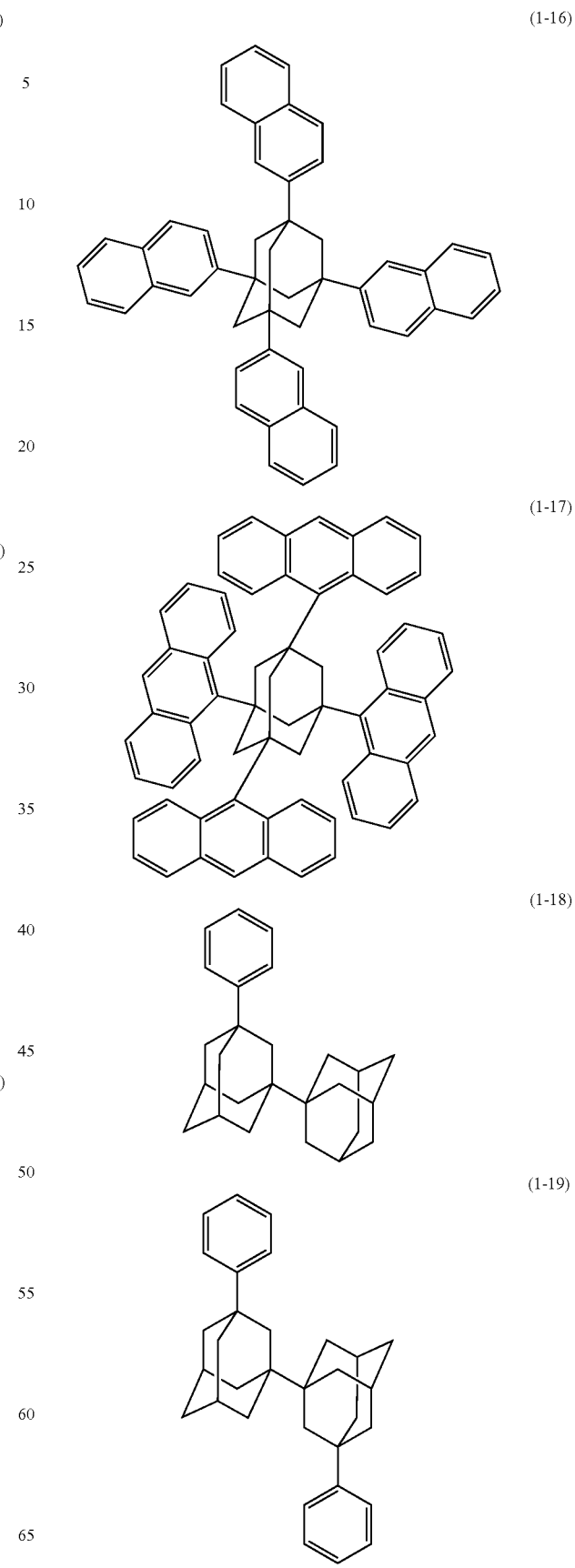

(1-20)
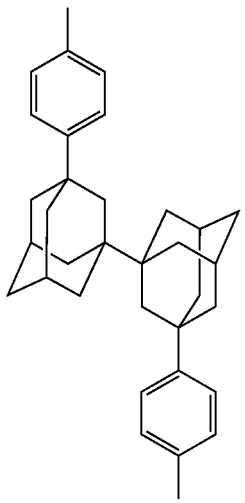
(1-21)
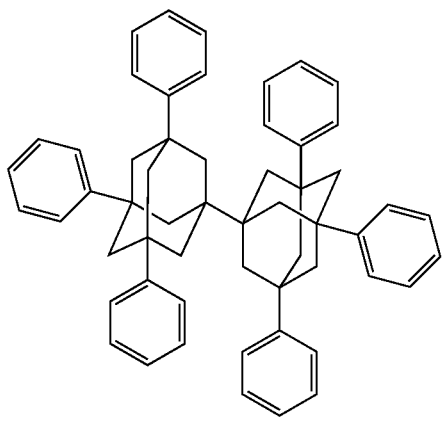
(1-22)
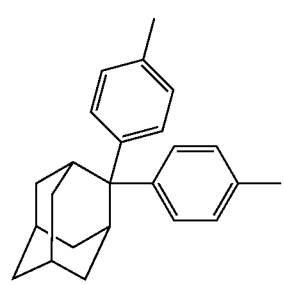
(1-23)
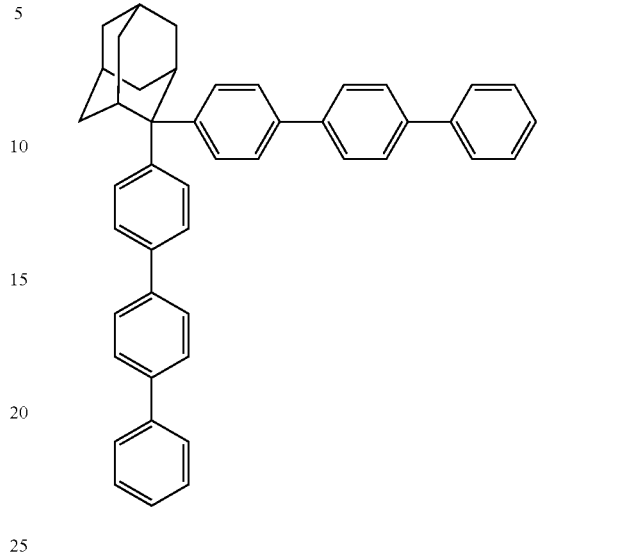
(1-24)
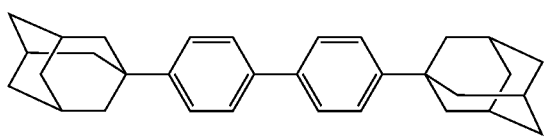
(1-25)
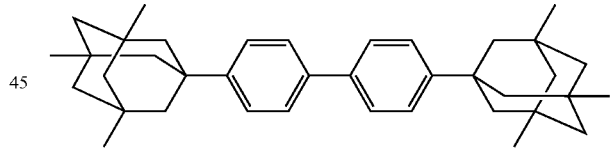
(1-26)
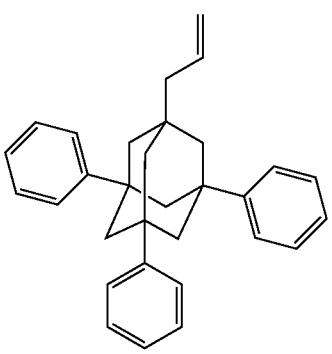

(1-27)
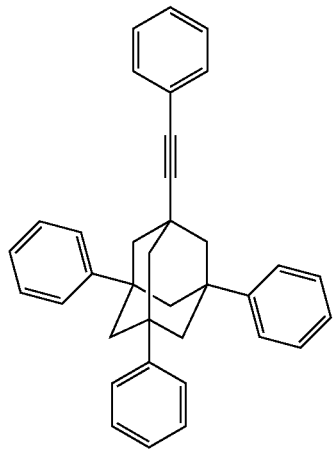
(1-28)
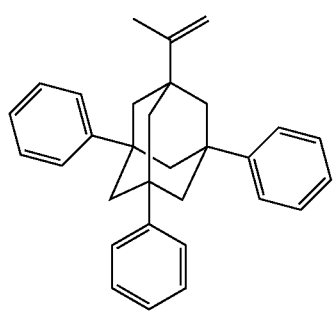
(1-29)
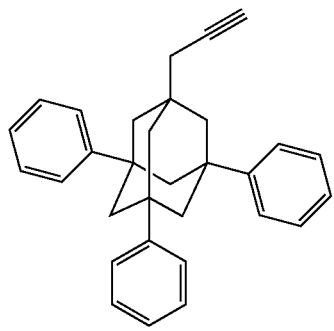
(1-30)
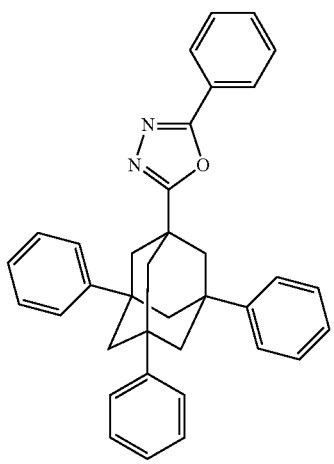
(1-31)
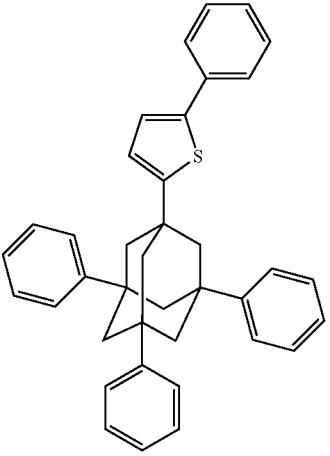
(1-32)
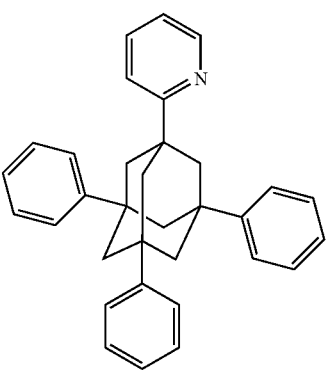
(1-33)
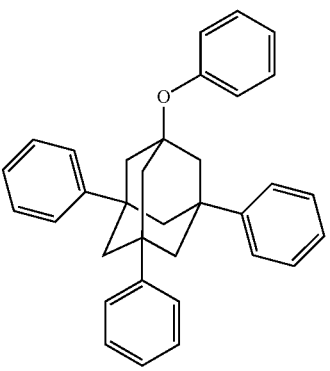
(1-34)
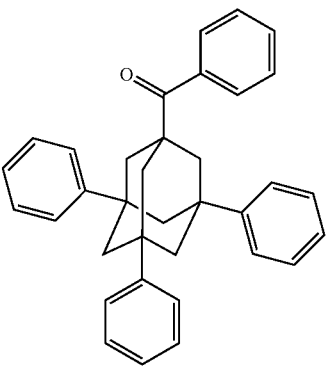

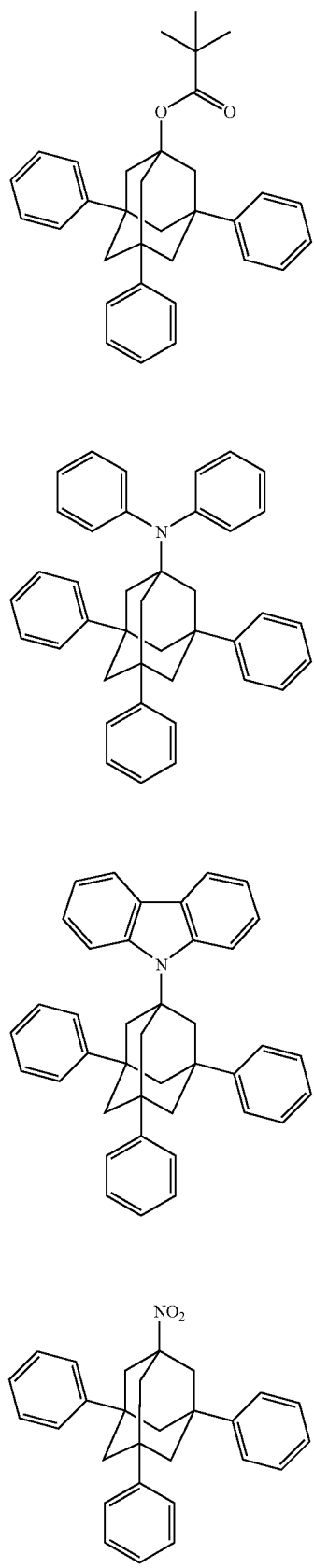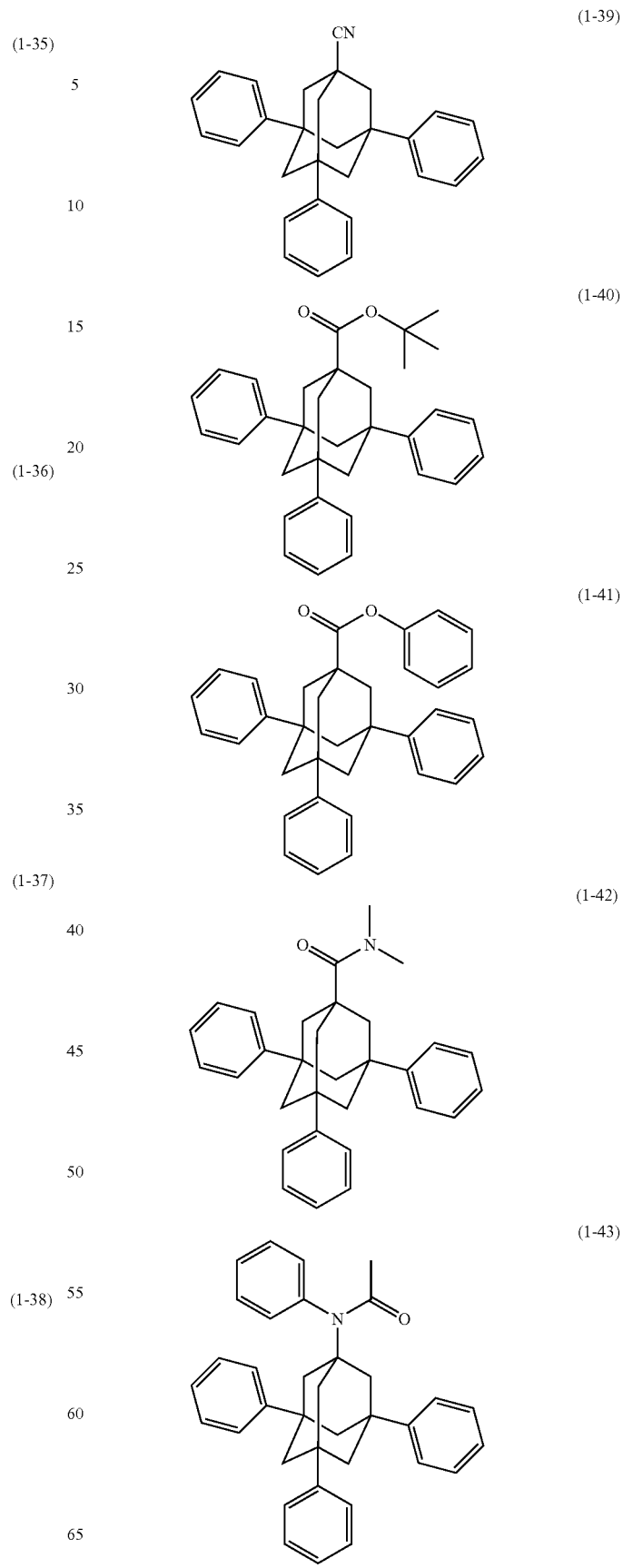

-continued (1-44)
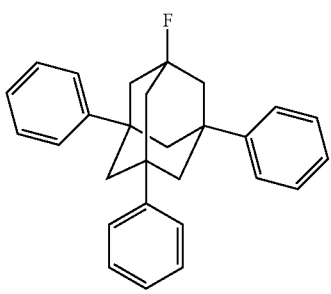

(1-45)
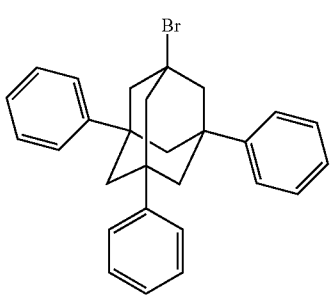

(1-46)
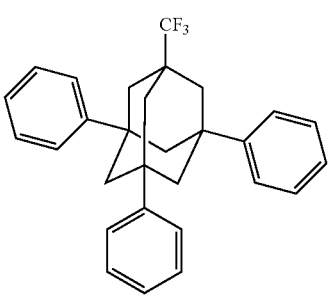

(1-47)
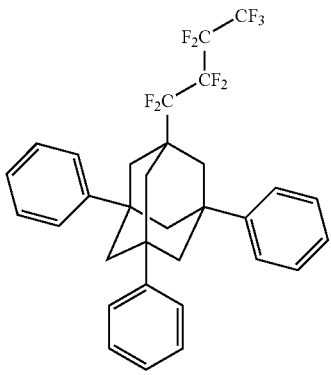

(1-48)
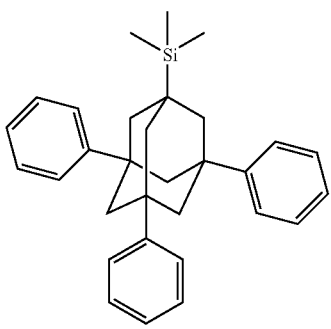

-continued (1-49)
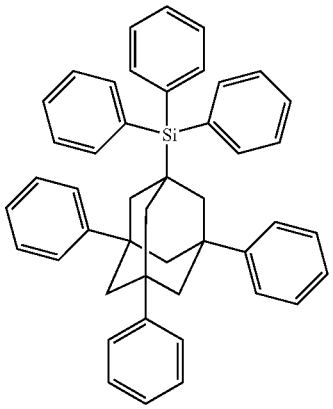

The compound represented by the formula (a) can be synthesized by properly combining adamantane or a halogenated adamantane with an alkyl halide or an alkyl magnesium halide (Grignard reagent). For example, a halogenated adamantane can be coupled with an alkyl halide using indium (see Document 1). Also, an alkyl halide can be converted into an alkyl copper reagent and then coupled with a Grignard reagent of an aromatic compound (see Document 2). Also, an alkyl halide can be coupled using an appropriate aryl boronic acid using a palladium catalyst (see Document 3).

Document 1: *Tetrahedron Lett.*, 39, 9557 to 9558 (1998)
Document 2: *Tetrahedron Lett.*, 39, 2095 to 2096 (1998)
Document 3: *J. Am. Chem. Soc.*, 124, 13662 to 13663 (2002)

The adamantane structure having an aryl group can be synthesized by properly combining adamantane or a halogenated adamantane with a corresponding arene or aryl halide.

In the foregoing manufacturing method, in the case where the defined substituents are changed under a condition of a certain synthesis method or are inadequate for carrying out the subject method, the manufacture can be easily made by means of, for example, protection, deprotection, etc. of a functional group (see, for example, *Protective Groups in Organic Synthesis*, written by T. W. Greene, John Wiley & Sons Inc. (1981), etc.). Also, the order of the reaction steps such as introduction of a substituent can be properly changed, if desired.

Since the organic electroluminescence device is prepared using a vacuum vapor deposition process or a solution coating process, from the viewpoints of vapor deposition adaptability and solubility, the molecular weight of the compound represented by the formula (a) is preferably not more than 2,000, more preferably not more than 1,200, and especially preferably not more than 1,000. Also, from the viewpoint of vapor deposition adaptability, when the molecular weight is too low, the vapor pressure is low, and the change from a vapor phase to a solid phase does not occur, whereby the formation of an organic layer becomes difficult. Thus, the molecular weight of the compound represented by the formula (a) is preferably 250 or more, more preferably 350 or more, and especially preferably 400 or more.

It is preferable that the compound represented by the formula (a) is used in combination with the compound represented by the formula (I); and it is more preferable that the compound represented by the formula (a) is used in combination with the compound represented by the formula (I) and a platinum complex having a tetradentate ligand.

In the invention, the compound represented by the formula (a) is not limited with respect to its application and may be contained in any layer within the organic layers. As to the layer into which the compound represented by the formula (a) is introduced, the compound represented by the formula (a) is preferably contained in any one or a plurality of a light emitting layer, a hole injection layer, a hole transport layer, an electron transport layer, an electron injection layer, an exciton blocking layer and a charge blocking layer; more preferably contained in any one or a plurality of a light emitting layer, a hole injection layer, a hole transport layer, an electron transport layer and an electron injection layer; especially contained in any one or a plurality of a light emitting layer, a hole injection layer and a hole transport layer; and most preferably contained in a light emitting layer, as described later.

As to the content of the compound represented by the formula (a) in the light emitting layer, it is necessary to use the compound represented by the formula (a) in an amount limited to such an extent that the charge transporting properties of a charge transporting material is not inhibited. The compound represented by the formula (a) is preferably contained in an amount of from 0.1 to 70% by mass, more preferably contained in an amount of from 0.1 to 30% by mass, and especially preferably in an amount of from 0.1 to 25% by mass.

Also, when the compound represented by the formula (a) is used in the plural organic layers, it is preferable that the compound represented by the formula (a) is contained within the foregoing range in each of the layers.

—Hole Injection Layer and Hole Transport Layer—

Each of the hole injection layer and the hole transport layer is a layer having a function to accept a hole from the anode or the anode side to transport it into the cathode side.

—Electron Injection Layer and Electron Transport Layer—

Each of the electron injection layer and the electron transport layer is a layer having a function to accept an electron from the-cathode or the cathode side and to transport it into the anode side.

As to the hole injection layer, hole transport layer, electron injection layer and electron transport layer, the matters disclosed in paragraphs [0165] to [0167] of JP-A-2008-270736 can be adopted in the invention.

—Hole Blocking Layer—

The hole blocking layer is a layer having a function to prevent permeation of the hole having been transported from the anode side to the light emitting layer into the cathode side. In the invention, the hole blocking layer can be provided as an organic layer adjacent to the light emitting layer on the cathode side.

Examples of an organic compound which constitutes the hole blocking layer include aluminum complexes such as aluminum(III) bis(2-methyl-8-quinolinato)4-phenylphenolate (abbreviated as "BAlq"); triazole derivatives; and phenanthroline derivatives such as 2,9-dimethyl-4,7-diphenyl-1,10-phenanthroline (abbreviated as "BCP").

The thickness of the hole blocking layer is preferably from 1 nm to 500 nm, more preferably from 5 nm to 200 nm, and further preferably from 10 nm to 100 nm.

The hole blocking layer may be of a single layer structure composed of one or two or more kinds of the foregoing materials or may be of a multilayer structure composed of a plurality of layers of the same or different compositions.

<Protective Layer>

In the invention, the whole of the organic EL device may be protected by a protective layer.

As to the protective layer, the matters disclosed in paragraphs [0169] to [0170] of JP-A-2008-270736 can be adopted in the invention.

<Substrate>

As the substrate used in the invention, a substrate which does not scatter or decay light emitted from the organic layer is preferred.

<Anode>

In general, the anode may have a function as an electrode for feeding a hole into the organic layer. The anode is not particularly limited with respect to its shape, structure and size and so on and can be properly chosen among known electrode materials depending upon the application and purpose of the luminescence device. As described above, the anode is usually provided as a transparent anode.

<Cathode>

In general, the cathode may have a function as an electrode for injecting an electron into the organic layer. The cathode is not particularly limited with respect to its shape, structure and size and so on and can be properly chosen among known electrode materials depending upon the application and purpose of the luminescence device.

As to the substrate, anode and cathode, the matters disclosed in paragraphs [0070] to [0089] of JP-A-2008-270736 can be adopted in the invention.

<Sealing Vessel>

In the device of the invention, the whole of the device may be sealed using a sealing vessel.

As to the sealing vessel, the matters disclosed in paragraph [0171] of JP-A-2008-270736 can be adopted in the invention.

Also, as to the driving method of the device of the invention, the matters disclosed in paragraph [0172] of JP-A-2008-270736 can be adopted in the invention.

<Others>

An external quantum efficiency of the luminescence device of the invention is preferably 5% or more, and more preferably 7% or more. As to the numerical value of the external quantum efficiency, a maximum value of the external quantum efficiency obtained when the device is driven at 20° C., or a value of the external quantum efficiency in the vicinity of from 100 to 300 cd/m$^2$ obtained when the device is driven at 20° C. can be employed.

An internal quantum efficiency of the luminescence device of the invention is preferably 30% or more, more preferably 50% or more, and further preferably 70% or more. The internal quantum efficiency of the device is calculated by dividing the external quantum efficiency by a light extraction efficiency. Though in usual organic EL devices, the light extraction efficiency is about 20%, by devising the shape of substrate, the shape of electrode, the thickness of organic layer, the thickness of inorganic layer, the refractive index of organic layer, the refractive index of inorganic layer, etc., it is possible to increase the light extraction efficiency to 20% or more.

The luminescence device of the invention has a maximum intensity wavelength of emission spectrum preferably at from 350 nm to 700 nm, more preferably at from 350 nm to 600 nm, further preferably at from 400 to 550 nm, and especially preferably at from 430 to 500 nm.

The device of the invention can be suitably utilized for display devices, displays, backlights, electrophotography (xerography), illumination light sources, recording light sources, exposure light sources, read light sources, markers, signboards, interiors, optical communications and so on.

EXAMPLES

The invention is hereunder described in detail with reference to the following Examples, but it should not be construed that embodiments of the invention are limited thereto.

Compound (1) of the invention
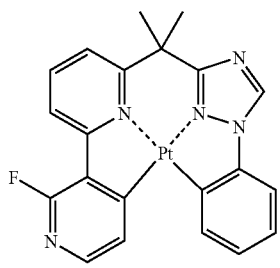
Compound (2) of the invention
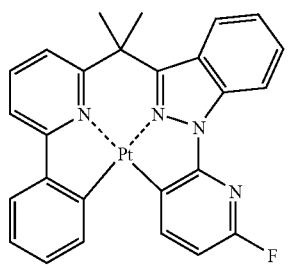
Compound (3) of the invention
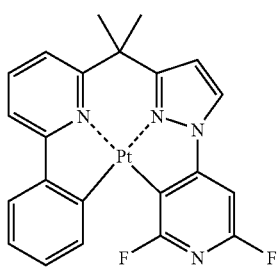
Compound (4) of the invention
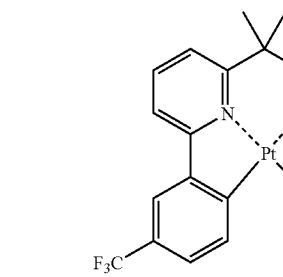
Compound (5) of the invention
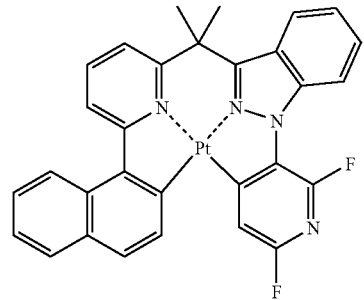
-continued
Compound (6) of the invention
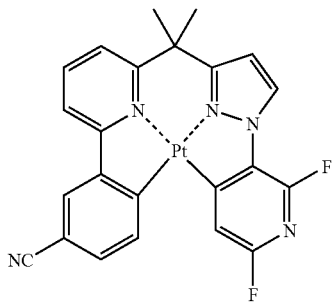
Compound (7) of the invention
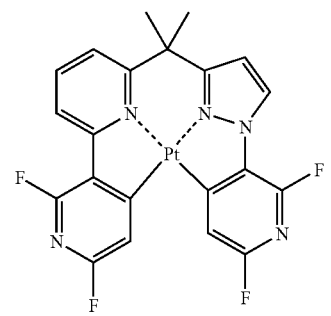
Compound (8) of the invention
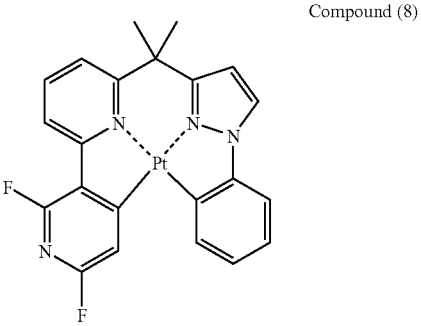
Compound (9) of the invention
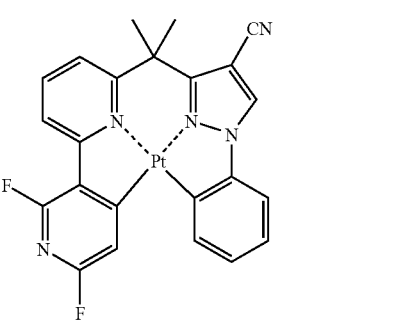
Compound (10) of the invention
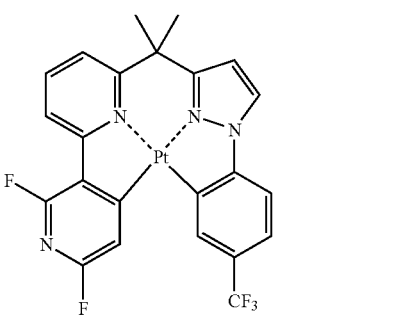

Compound (11) of the invention
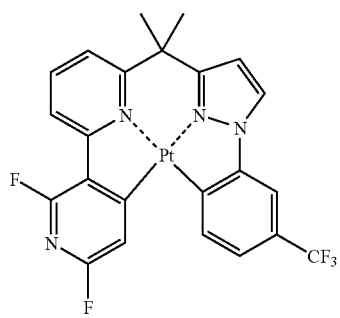
Compound (12) of the invention
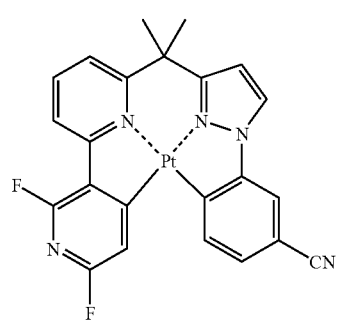
Compound (13) of the invention
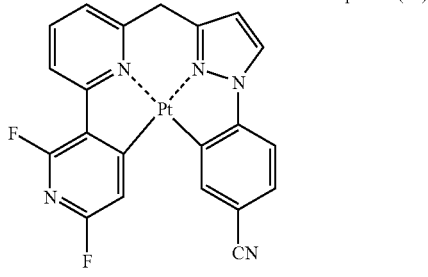
Compound (14) of the invention
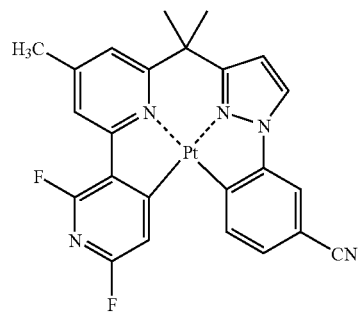
Compound (15) of the invention
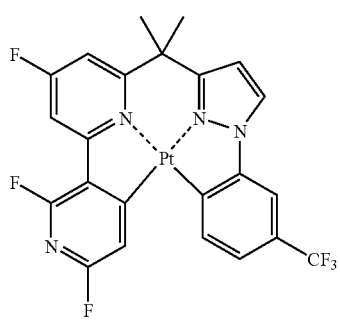
Compound (16) of the invention
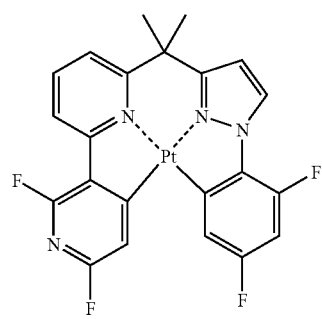
Compound disclosed in JP-A-2006-261623
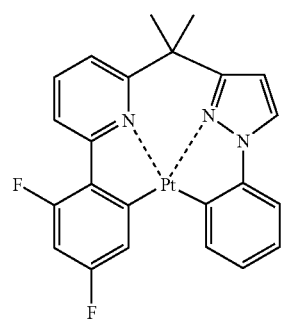
Compound disclosed in JP-A-2008-37848
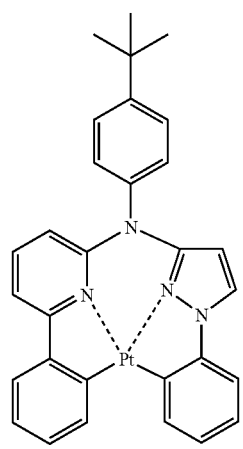
Copper phthalocyanine
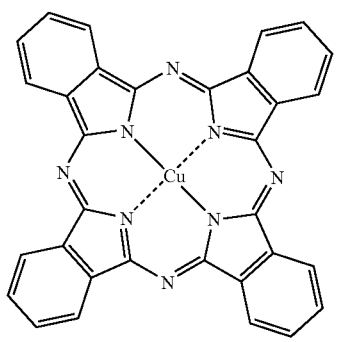

HT-1
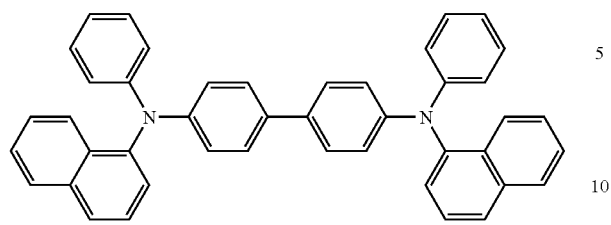
HT-2
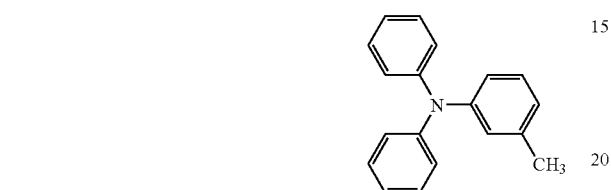
H-1
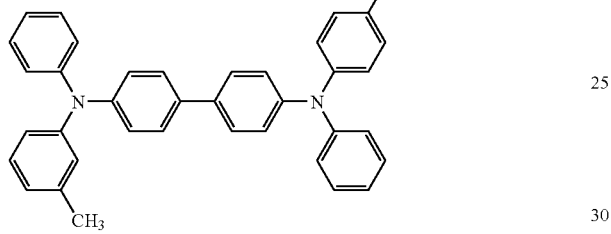
H-2
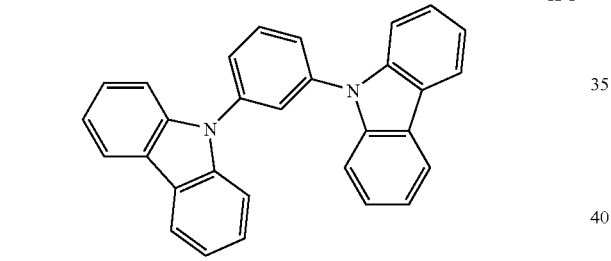
H-3
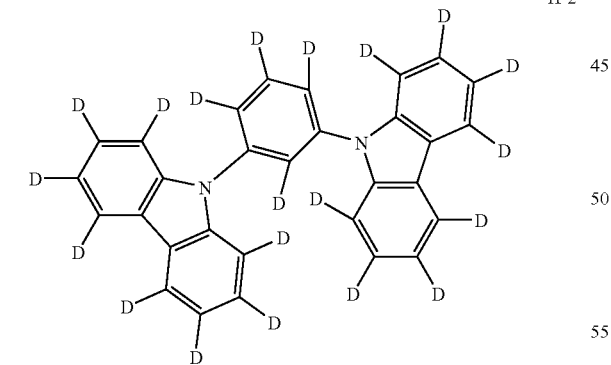
H-4
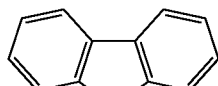
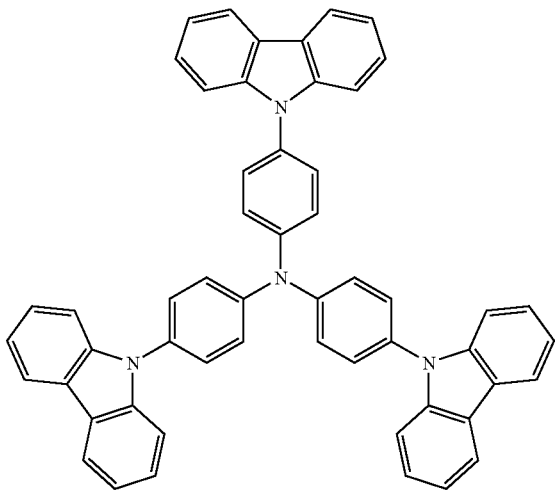
H-5
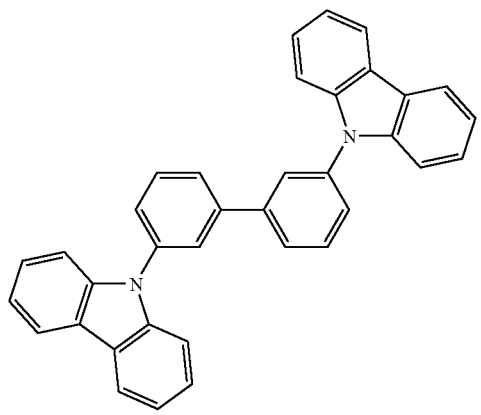
H-6
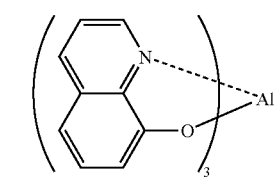
H-7
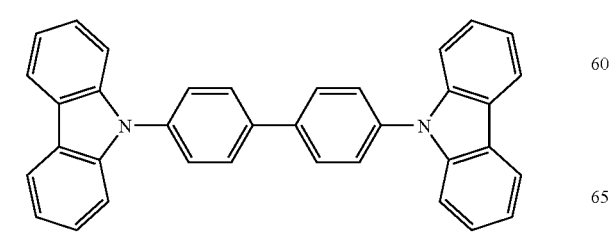

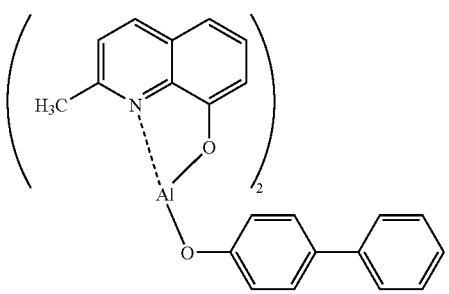

ET-1

Example 1-1

An ITO film-provided glass substrate having a thickness of 0.5 mm and a size of 2.5 cm in square (manufactured by Geomatec Co., Ltd., surface resistance: 10 Ω/□) was put in a washing vessel, ultrasonically washed in 2-propanol and then subjected to a UV-ozone treatment for 30 minutes. The following organic layers (organic compound layers) were successively vapor deposited on this transparent anode (ITO film) by means of vacuum vapor deposition.

In the Examples of the invention, the vapor deposition rate is 0.2 nm/sec unless otherwise indicated. The vapor deposition rate was measured using a quartz oscillator. The film thicknesses as described below were also measured using a quartz oscillator.

The washed ITO substrate was put in a vapor deposition apparatus; copper phthalocyanine was vapor deposited thereon in a thickness of 10 nm (first layer); and HT-1 was further vapor deposited thereon in a thickness of 40 nm (second layer). H-1 and Compound (1) of the invention were vapor deposited thereon in a ratio of 95/5 (mass ratio) in a thickness of 50 nm (third layer/light emitting layer); and ET-1 was further vapor deposited thereon in a thickness of 40 nm (fourth layer). Lithium fluoride was vapor deposited thereon in a thickness of 3 nm, and aluminum was then vapor deposited thereon in a thickness of 60 nm. This was put in a glove box having been purged with an argon gas without being brought into contact with the air and sealed using a sealing can made of stainless steel and a UV-curable adhesive (XNR5516HV, manufactured by Nagase-CIBA Ltd.), thereby preparing an organic EL device of Example 1-1. The organic EL device was subjected to light emission upon application of a direct current constant voltage using a source measure unit MODEL 2400, manufactured by Toyo Corporation. As a result, bluish white light emission derived from Compound (1) of the invention was obtained.

Examples 1-2 to 1-24 and Comparative Examples 1-1 and 1-2

Devices of Examples 1-2 to 1-24 and Comparative Examples 1-1 and 1-2 were prepared in the same manner as in Example 1-1, except for changing the materials used in Example 1-1 to those as shown in Table 1. Each of the organic EL devices was subjected to light emission upon application of a direct current constant voltage using a source measure unit MODEL 2400, manufactured by Toyo Corporation. As a result, a luminescent color derived from each of the used light emitting materials was obtained.

(Measurement of Driving Voltage)

Each of the organic electroluminescence devices of Examples 1-1 to 1-24 and Comparative Examples 1-1 and 1-2 was set on an emission spectrum measurement system (ELS 1500), manufactured by Shimadzu Corporation, and an applied voltage at the time when the brightness was 100 cd/m$^2$ was measured.

(Evaluation of Driving Durability)

Each of the organic electroluminescence devices of Examples 1-1 to 1-24 and Comparative Examples 1-1 and 1-2 was set on an OLED test system, MODEL ST-D, manufactured by TSK Co and driven in a constant current mode under a condition at an initial brightness of 1,000 cd/cm$^2$, thereby measuring a half-brightness time.

(Evaluation of External Quantum Efficiency)

Each of the organic electroluminescence devices of Examples 1-1 to 1-24 and Comparative Examples 1-1 and 1-2 was subjected to light emission upon application of a direct current constant voltage using a source measure unit MODEL 2400, manufactured by Toyo Corporation. An external quantum efficiency (%) was calculated from the front brightness at the time of 100 cd/m$^2$.

TABLE 1

| | | Third layer | | | | External quantum efficiency at 100 cd/m$^2$ (%) | Half-brightness time at 1,000 cd/m$^2$ (h) |
|---|---|---|---|---|---|---|---|
| | Second layer | Light emitting material | Host material | Luminescent color | Driving voltage at 100 cd/m$^2$ (V) | | |
| Example 1-1 | HT-1 | Compound (1) | H-1 | Bluish white | 8.1 | 7.4 | 115 |
| Example 1-2 | HT-1 | Compound (2) | H-4 | Green | 8.0 | 6.2 | 88 |
| Example 1-3 | HT-1 | Compound (3) | H-3 | Green | 8.0 | 6.6 | 60 |
| Example 1-4 | HT-2 | Compound (4) | H-3 | Green | 8.1 | 6.3 | 84 |
| Example 1-5 | HT-1 | Compound (5) | H-6 | Red | 7.4 | 7.1 | 70 |
| Example 1-6 | HT-1 | Compound (5) | H-7 | Red | 7.6 | 7.2 | 141 |
| Example 1-7 | HT-1 | Compound (5) | H-2 | Red | 7.9 | 7.7 | 183 |
| Example 1-8 | HT-2 | Compound (6) | H-1 | Green | 8.0 | 8.1 | 101 |
| Example 1-9 | HT-1 | Compound (7) | H-5 | Bluish white | 8.2 | 6.6 | 109 |
| Example 1-10 | HT-1 | Compound (8) | H-1 | Bluish white | 8.1 | 7.2 | 112 |
| Example 1-11 | HT-2 | Compound (9) | H-5 | Bluish white | 8.0 | 7.2 | 78 |
| Example 1-12 | HT-1 | Compound (10) | H-1 | Bluish white | 7.8 | 7.5 | 120 |
| Example 1-13 | HT-1 | Compound (11) | H-1 | Bluish white | 8.1 | 7.8 | 111 |
| Example 1-14 | HT-1 | Compound (1) | H-2 | Bluish white | 7.9 | 7.2 | 180 |
| Example 1-15 | HT-1 | Compound (7) | H-2 | Bluish white | 8.0 | 6.6 | 154 |
| Example 1-16 | HT-1 | Compound (10) | H-2 | Bluish white | 7.7 | 7.6 | 193 |
| Example 1-17 | HT-1 | Compound (12) | H-1 | Bluish white | 7.8 | 7.9 | 136 |
| Example 1-18 | HT-1 | Compound (13) | H-5 | Bluish white | 8.0 | 7.7 | 129 |

TABLE 1-continued

|  | | Third layer | | Luminescent color | Driving voltage at 100 cd/m$^2$ (V) | External quantum efficiency at 100 cd/m$^2$ (%) | Half-brightness time at 1,000 cd/m$^2$ (h) |
|---|---|---|---|---|---|---|---|
|  | Second layer | Light emitting material | Host material |  |  |  |  |
| Example 1-19 | HT-1 | Compound (14) | H-1 | Bluish white | 7.9 | 7.8 | 131 |
| Example 1-20 | HT-1 | Compound (15) | H-1 | Bluish white | 7.9 | 7.8 | 109 |
| Example 1-21 | HT-1 | Compound (16) | H-5 | Bluish white | 7.8 | 7.8 | 122 |
| Example 1-22 | HT-1 | Compound (12) | H-2 | Bluish white | 7.6 | 8.2 | 211 |
| Example 1-23 | HT-1 | Compound (13) | H-2 | Bluish white | 7.9 | 7.9 | 193 |
| Example 1-24 | HT-1 | Compound (14) | H-2 | Bluish white | 7.8 | 8.0 | 189 |
| Comparative Example 1-1 | HT-1 | Compound disclosed in JP-A-2006-261623 | H-1 | Green | 8.3 | 6.0 | 56 |
| Comparative Example 1-2 | HT-1 | Compound disclosed in JP-A-2008-37848 | H-1 | Green | 9.1 | 3.2 | 25 |

It is noted that by using the compound represented by the formula (I) as a light emitting material, Examples 1-1 to 1-24 reveal a long half-brightness time and excellent durability as compared with Comparative Examples 1 and 2.

Also, it is noted that Examples 1-6 to 1-7, 1-14 to 1-16 and 1-22 to 1-24 using a material having at least one deuterium atom reveal a longer half-brightness time and more excellent durability. Similarly, even by using other compounds of the invention, luminescence devices with excellent luminescence performance can be prepared.

Example 2-1

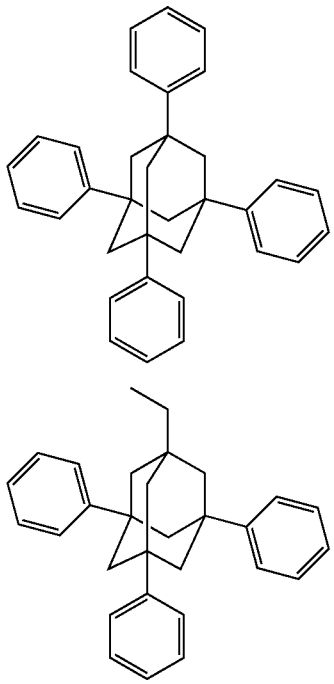

An organic EL device of Example 2-1 was prepared in the same manner as in Example 1-1, except that in Example 1-1, vapor deposition was carried out by changing the composition ratio of the film of the third layer (light emitting layer) from 95/5 (mass ratio) of H-1 to Compound (1) of the invention to 80/15/5 (mass ratio) of H-1 to A-1 to Compound (1) of the invention. The organic EL device was subjected to light emission upon application of a direct current constant voltage using a source measure unit MODEL 2400, manufactured by Toyo Corporation. As a result, bluish white light emission derived from Compound (1) of the invention was obtained.

Examples 2-2 to 2-12 and Comparative Examples 2-1 and 2-2

Devices of Examples 2-2 to 2-12 and Comparative Examples 2-1 and 2-2 were prepared in the same manner as in Example 2-1, except for changing the materials used in Example 2-1 to those as shown in Table 2. Each of the organic EL devices was subjected to light emission upon application of a direct current constant voltage using a source measure unit MODEL 2400, manufactured by Toyo Corporation. As a result, a luminescent color derived from each of the used light emitting materials was obtained.

(Measurement of Driving Voltage)

Each of the organic electroluminescence devices of Examples 2-1 to 2-12 and Comparative Examples 2-1 and 2-2 was set on an emission spectrum measurement system (ELS1500), manufactured by Shimadzu Corporation, and an applied voltage at the time when the brightness was 100 cd/m$^2$ was measured.

(Evaluation of Driving Durability)

Each of the organic electroluminescence devices of Examples 2-1 to 2-12 and Comparative Examples 2-1 and 2-2 was set on an OLED test system, MODEL ST-D, manufactured by TSK Co and driven in a constant current mode under a condition at an initial brightness of 1,000 cd/cm$^2$, thereby measuring a half-brightness time.

(Evaluation of External Quantum Efficiency)

Each of the organic electroluminescence devices of Examples 2-1 to 2-12 and Comparative Examples 2-1 and 2-2 was subjected to light emission upon application of a direct current constant voltage using a source measure unit MODEL 2400, manufactured by Toyo Corporation. An external quantum efficiency (%) was calculated from the front brightness at the time of 100 cd/m$^2$.

TABLE 2

| | Second layer | Third layer Light emitting material | Third layer Host material | Luminescent color | Driving voltage at 100 cd/m² (V) | External quantum efficiency at 100 cd/m² (%) | Half-brightness time at 1,000 cd/m² (h) |
|---|---|---|---|---|---|---|---|
| Example 2-1 | HT-1 | Compound (1) | H-1/A-1 | Bluish white | 8.0 | 7.6 | 131 |
| Example 2-2 | HT-1 | Compound (7) | H-5/A-2 | Bluish white | 8.4 | 6.7 | 122 |
| Example 2-3 | HT-1 | Compound (10) | H-1/A-2 | Bluish white | 7.9 | 7.6 | 135 |
| Example 2-4 | HT-1 | Compound (12) | H-1/A-2 | Bluish white | 8.0 | 7.9 | 149 |
| Example 2-5 | HT-1 | Compound (13) | H-5/A-1 | Bluish white | 8.1 | 7.8 | 141 |
| Example 2-6 | HT-1 | Compound (14) | H-1/A-2 | Bluish white | 7.9 | 7.9 | 146 |
| Example 2-7 | HT-1 | Compound (1) | H-2/A-1 | Bluish white | 8.0 | 7.4 | 202 |
| Example 2-8 | HT-1 | Compound (7) | H-2/A-2 | Bluish white | 8.1 | 6.9 | 172 |
| Example 2-9 | HT-1 | Compound (10) | H-2/A-2 | Bluish white | 7.8 | 7.7 | 215 |
| Example 2-10 | HT-1 | Compound (12) | H-2/A-2 | Bluish white | 7.7 | 8.4 | 238 |
| Example 2-11 | HT-2 | Compound (13) | H-2/A-1 | Bluish white | 7.9 | 8.0 | 214 |
| Example 2-12 | HT-1 | Compound (14) | H-2/A-2 | Bluish white | 7.9 | 8.0 | 211 |
| Comparative Example 2-1 | HT-1 | Compound disclosed in JP-A-2006-261623 | H-1/A-1 | Green | 8.1 | 6.1 | 58 |
| Comparative Example 2-2 | HT-1 | Compound disclosed in JP-A-2008-37848 | H-1/A-2 | Green | 9.0 | 3.1 | 28 |

By comparing Examples 2-1 to 2-12 with Example 1-1, Example 1-9, Example 1-12, Examples 1-17 to 1-19, Examples 1-22 to 1-24 and Comparative Examples 2-1 and 2-2, it is noted that the devices combining the compound represented by the formula (I) with the compound represented by the formula (a) reveal a long half-brightness time and excellent durability. Similarly, even by using other compounds of the invention, luminescence devices with excellent luminescence performance can be prepared.

The organic electroluminescence device of the invention has a high external quantum efficiency and is excellent in driving voltage and durability.

The entire disclosure of each and every foreign patent application from which the benefit of foreign priority has been claimed in the present application is incorporated herein by reference, as if fully set forth.

What is claimed is:

1. An organic electroluminescence device, comprising:
a pair of electrodes; and
at least one organic layer including a light emitting layer, the light emitting layer being provided between the pair of electrodes,
wherein at least one layer of the at least one organic layer contains a compound represented by formula (V):

Formula (V)

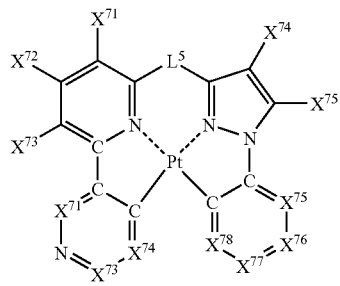

wherein each of $X^{71}$, $X^{73}$, $X^{74}$, $X^{75}$, $X^{76}$, $X^{77}$ and $X^{78}$ represents carbon;
each of $X^{71}$ and $X^{73}$ is substituted with a fluorine atom;
each of $X^{74}$, $X^{75}$, $X^{76}$, $X^{77}$ and $X^{78}$ may independently have a substituent;

each of $R^{71}$, $R^{72}$, $R^{73}$, $R^{74}$ and $R^{75}$ independently represents a hydrogen atom or a substituent;
$L^5$ represents a divalent connecting group;
a broken line expressing a bond between the platinum atom and a nitrogen atom represents a coordinate bond; and
a solid line expressing a bond between the platinum atom and a carbon atom represents a covalent bond.

2. The organic electroluminescence device according to claim 1,
wherein at least one layer of the at least one organic layer contains a material having at least one deuterium atom.

3. The organic electroluminescence device according to claim 2,
wherein the material having at least one deuterium atom is a material containing any one of a carbazole structure and an indole structure each having at least one deuterium atom.

4. The organic electroluminescence device according to claim 1,
wherein the light emitting layer contains a material having at least one deuterium atom.

5. The organic electroluminescence device according to claim 1,
wherein the light emitting layer contains at least one compound represented by formula (a):

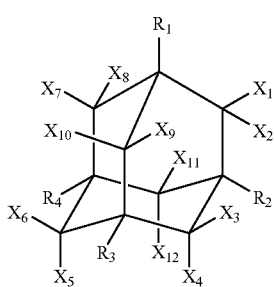

wherein each of $R_1$ to $R_4$ independently represents a hydrogen atom, an alkyl group, an alkenyl group, an alkynyl group, an aryl group, a heteroaryl group, an alkoxy group, an acyl group, an acyloxy group, an amino group, a nitro group, a cyano group, an ester group, an amide group, a halogen atom, a perfluoroalkyl group or a silyl group;

at least one of $R_1$ to $R_4$ is a group having a double bond or a triple bond; and each of $X_1$ to $X_{12}$ independently represents a hydrogen atom, an alkyl group, an alkenyl group, an alkynyl group, an aryl group, a heteroaryl group, an alkoxy group, an acyl group, an acyloxy group, an amino group, a nitro group, a cyano group, an ester group, an amide group, a halogen atom, a perfluoroalkyl group or a silyl group.

* * * * *